(12) United States Patent
Suzuki

(10) Patent No.: US 9,495,800 B2
(45) Date of Patent: Nov. 15, 2016

(54) STORAGE MEDIUM HAVING STORED THEREON IMAGE PROCESSING PROGRAM, IMAGE PROCESSING APPARATUS, IMAGE PROCESSING SYSTEM, AND IMAGE PROCESSING METHOD

(75) Inventor: Toshiaki Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1357 days.

(21) Appl. No.: 13/045,806

(22) Filed: Mar. 11, 2011

(65) Prior Publication Data

US 2011/0304611 A1     Dec. 15, 2011

(30) Foreign Application Priority Data

Jun. 10, 2010 (JP) ................................ 2010-133436
Dec. 28, 2010 (JP) ................................ 2010-293069

(51) Int. Cl.
*G06T 11/60* (2006.01)
*G06T 19/00* (2011.01)
*G06T 15/04* (2011.01)

(52) U.S. Cl.
CPC ............. *G06T 19/006* (2013.01); *G06T 15/04* (2013.01)

(58) Field of Classification Search
CPC ..................... A63F 13/25; G06T 11/60; G06T 2207/20212; G06T 2207/20221; G06T 19/006; G06T 15/04; G09G 2340/12
USPC .............. 345/632, 633, 156; 382/162; 463/1
See application file for complete search history.

(56) References Cited

U.S. PATENT DOCUMENTS

| | | | |
|---|---|---|---|
| 2010/0202682 A1* | 8/2010 | Lieckfeldt | 382/162 |
| 2011/0183732 A1* | 7/2011 | Block et al. | 463/1 |
| 2012/0242807 A1* | 9/2012 | Umezu et al. | 348/47 |
| 2012/0281677 A1* | 11/2012 | Lee | 370/331 |
| 2012/0293549 A1* | 11/2012 | Osako | 345/633 |
| 2013/0169682 A1* | 7/2013 | Novak et al. | 345/633 |
| 2013/0234934 A1* | 9/2013 | Champion et al. | 345/156 |

FOREIGN PATENT DOCUMENTS

JP          2006-72669          3/2006

* cited by examiner

*Primary Examiner* — Chante Harrison
(74) *Attorney, Agent, or Firm* — Nixon & Vanderhye P.C.

(57) ABSTRACT

Using as a texture of an image to be placed in a virtual world an image included in a predetermined area in a captured image captured by a real camera, a virtual world image is generated, in which the object placed in the virtual world is viewed from a virtual camera. Then, the captured image captured by the real camera is combined with the virtual world image, and the combined image is displayed on a display device.

29 Claims, 25 Drawing Sheets

F I G. 4
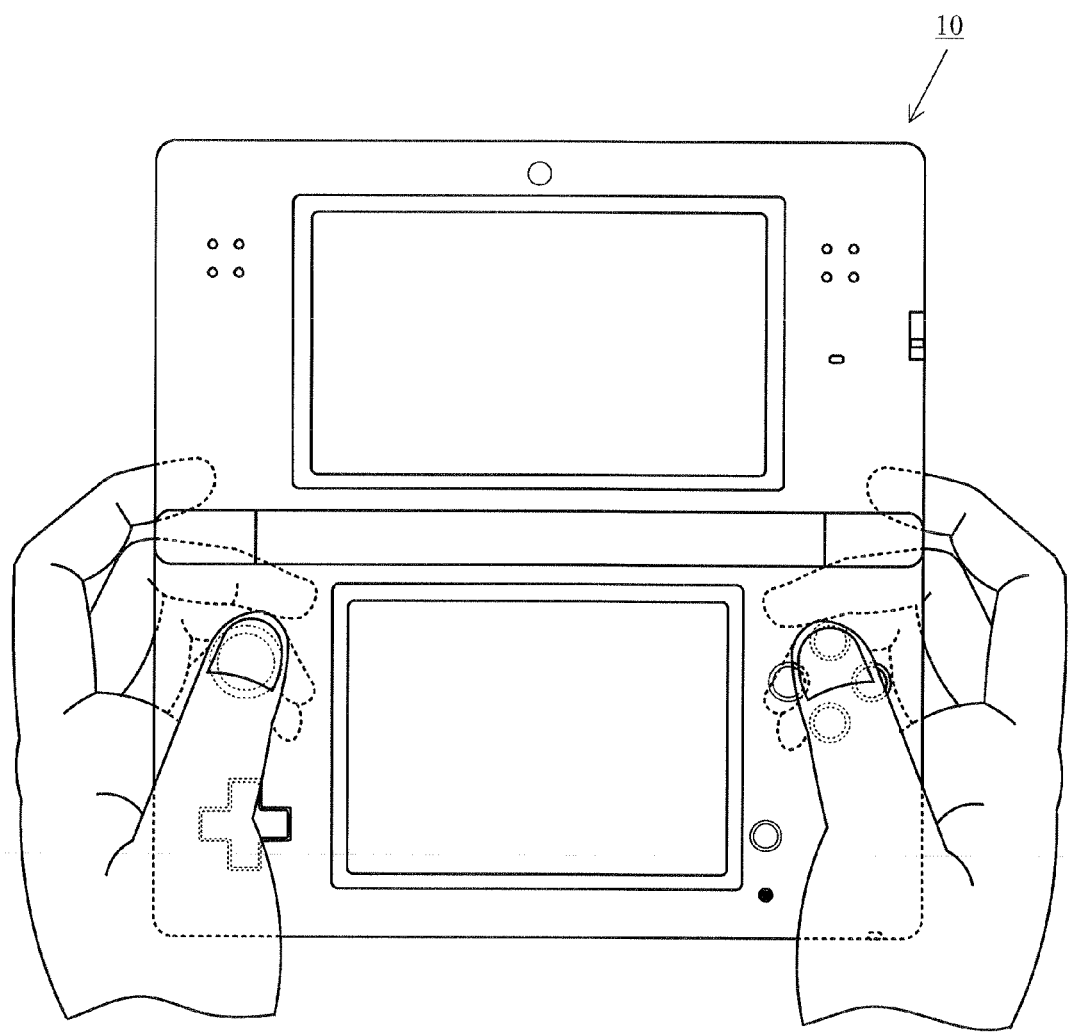

RENDERING WITH
PERSPECTIVE PROJECTION

F I G. 2 4
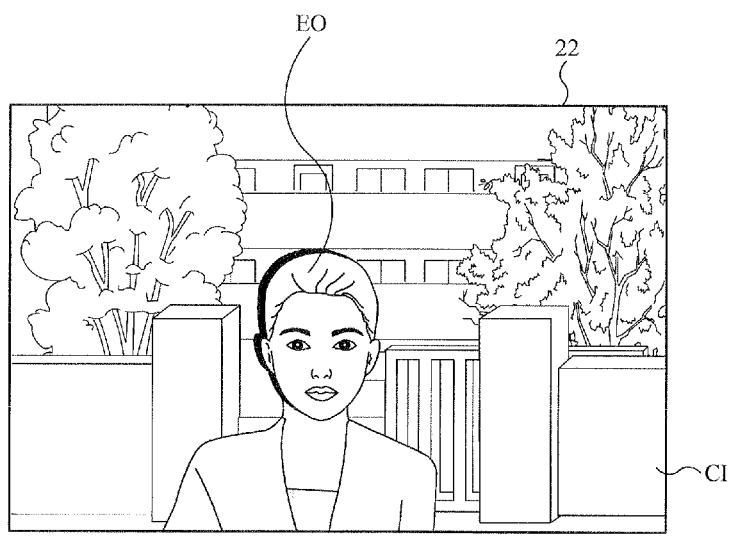

STORAGE MEDIUM HAVING STORED THEREON IMAGE PROCESSING PROGRAM, IMAGE PROCESSING APPARATUS, IMAGE PROCESSING SYSTEM, AND IMAGE PROCESSING METHOD

CROSS REFERENCE TO RELATED APPLICATION

The disclosures of Japanese Patent Application No. 2010-133436, filed on Jun. 10, 2010, and Japanese Patent Application No. 2010-293069, filed on Dec. 28, 2010, are incorporated herein by reference.

BACKGROUND OF THE INVENTION

Field of the Invention

The present invention relates to a storage medium having stored thereon an image processing program, an image processing apparatus, an image processing system, and an image processing method, and in particular, relates to a storage medium having stored thereon an image processing program that performs image processing using a real world image, and an image processing apparatus, an image processing system, and an image processing method that perform image processing using a real world image.

Description of the Background Art

Conventionally, as disclosed in, for example, Japanese Laid-Open Patent Publication No. 2006-72669 (hereinafter referred to as "Patent Literature 1"), a proposal is made for an apparatus that displays an image obtained by combining an image of the real world with an image of a virtual world. An image processing apparatus disclosed in Patent Literature 1 displays a real object that actually exists and a virtual object, by associating these objects with each another. The real object is a one-dimensional object, a two-dimensional object, or a three-dimensional object that actually exists in the real world, and corresponds to a card or the like characterized by code information represented two-dimensionally.

However, the image processing apparatus disclosed in Patent Literature 1 extracts, from an image obtained by capturing the real object, identification information of the image of the real object, and displays the virtual object associated with the identification information on the display device. That is, in the image processing apparatus disclosed in Patent Literature 1, the image to be combined with the real world is a mere virtual object, and therefore, the displayed image is monotonous.

SUMMARY OF THE INVENTION

Therefore, it is an object of the present invention to provide a storage medium having stored thereon an image processing program that generates a new image by combining a real world image with a virtual world image, and an image processing apparatus, an image processing system, and an image processing method that generate a new image by combining a real world image with a virtual world image.

To achieve the above object, the present invention may employ the following configurations.

An example of the configuration of a computer-readable storage medium having stored thereon an image processing program according to the present invention is executed by a computer of an image processing apparatus that displays an image on a display device. The image processing program causes the computer to function as captured image acquisition means, virtual world image generation means, image combination means, and display control means. The captured image acquisition means acquires a captured image captured by a real camera. The virtual world image generation means, using as a texture of an object to be placed in a virtual world an image included in a predetermined area in the captured image acquired by the captured image acquisition means, generates a virtual world image in which the object placed in the virtual world is viewed from a virtual camera, using an image included in a predetermined area in the captured image acquired by the captured image acquisition means, as a texture. The image combination means combines the captured image acquired by the captured image acquisition means with the virtual world image. The display control means displays the image combined by the image combination means on the display device.

Based on the above, it is possible to generate a new image by combining a captured image with a virtual world image, in which an object is placed that has a texture obtained from a part of the captured image.

In addition, in accordance with a position of the predetermined area in the captured image, the virtual world image generation means may generate the virtual world image by setting a positional relationship between the virtual camera and the object such that an image of the object in the virtual world image overlaps the predetermined area in the captured image.

Based on the above, it is possible to display an image as if the object placed in the virtual world is present in a real space captured by the real camera.

In addition, the virtual world image generation means may set an area having a predetermined feature in the captured image, as the predetermined area.

Based on the above, it is possible to cause an object to appear that has a texture obtained from an area having a predetermined feature in the captured image.

In addition, the virtual world image generation means may perform image analyze on the captured image, and may set an area that satisfies predetermined conditions in the captured image, as the predetermined area.

Based on the above, on the basis of the result of image analysis on the captured image, it is possible to cause an object to appear that has a texture obtained from an area included in the captured image.

In addition, the image processing program may further cause the computer to function as face recognition process means. The face recognition process means performs a face recognition process for recognizing a person's face in the captured image acquired by the captured image acquisition means. In this case, the virtual world image generation means may set at least one area in an image of the face recognized by the face recognition process means, as the predetermined area, and may set, as the texture, the image of the face set as the predetermined area.

Based on the above, it is possible to cause an object to appear that has a texture obtained from an image of a person's face in the captured image.

In addition, the image processing program may further cause the computer to function as expression determination means and object operation control means. The expression determination means determines an expression of the face recognized by the face recognition process means. The object action control means, in accordance with the expression determined by the expression determination means, causes the object placed in the virtual world to take a predetermined action.

Based on the above, it is possible to cause the object to take an action in accordance with the expression of the face recognized in the captured image, and therefore possible to achieve a new game.

In addition, the image processing program may further cause the computer to function as physical body recognition process means. The physical body recognition process means recognizes a predetermined physical body in the captured image acquired by the captured image acquisition means. In this case, the virtual world image generation means may set at least one area in an image of the physical body recognized by the physical body recognition process means, as the predetermined area, and may set, as the texture, the image of the physical body set as the predetermined area.

Based on the above, it is possible to cause an object to appear that has a texture obtained from an image of a predetermined physical body in the captured image.

In addition, the image processing program may further cause the computer to function as character recognition process means. The character recognition process means performs a character recognition process for recognizing a character in the captured image acquired by the captured image acquisition means. In this case, the virtual world image generation means may set at least one area in an image of the character recognized by the character recognition process means, as the predetermined area, and may set, as the texture, the image of the character set as the predetermined area.

Based on the above, it is possible to cause an object to appear that has a texture obtained from a character image in the captured image.

In addition, the image processing program may further cause the computer to function as color recognition process means. The color recognition process means performs a color recognition process for recognizing a predetermined color in the captured image acquired by the captured image acquisition means. In this case, the virtual world image generation means may set at least one area in an image having the color recognized by the color recognition process means, as the predetermined area, and may set, as the texture, the image set as the predetermined area.

Based on the above, it is possible to cause an object to appear that has a texture obtained from an image having a predetermined color in the captured image.

In addition, the virtual world image generation means may set an shape of the object in accordance with a shape of the predetermined area.

Based on the above, an object corresponding to the shape of a predetermined area appears. This makes it possible to display an object as if sliding out of a part of the captured image.

In addition, the captured image acquisition means repeatedly may acquire captured images of a real world captured in real time by a real camera available to the image processing apparatus. The virtual world image generation means may set, as the texture, an image included in the predetermined area in each of the captured images repeatedly acquired by the captured image acquisition means, and may generate the virtual world image at each time of the repeated acquisitions of the captured images, using the object obtained by mapping the most recently set texture. The image combination means may combine each of the captured images repeatedly acquired by the captured image acquisition means, with the virtual world image corresponding to the captured image. The display control means may repeatedly display on the display device the images obtained by combining the captured images repeatedly acquired by the captured image acquisition means, with the respective virtual world images.

Based on the above, it is possible to display an object obtained by mapping a texture obtained from the captured image captured in real time.

In addition, the captured image acquisition means may repeatedly acquire captured images of a real world captured in real time by a real camera available to the image processing apparatus. The image combination means may combine the virtual world image with each of the captured images repeatedly acquired by the captured image acquisition means. The display control means may repeatedly display on the display device the images obtained by combining the captured images repeatedly acquired by the captured image acquisition means, with the virtual world image. The image processing program may further cause the computer to function as mask process means. The mask process means, in each of the captured images repeatedly acquired by the captured image acquisition means, performs image processing so as to perform display on the display device such that a predetermined mask image covers the predetermined area set in the captured image.

Based on the above, it is possible to display the footprint after sliding out, as an object in the displayed captured image.

In addition, when the image combination means combines the captured image with the virtual world image, the mask process means may place a predetermined mask object in the virtual world such that the mask object is combined with the predetermined area in the captured image so as to cover the predetermined area. In this case, the virtual world image generation means may generate an image of the virtual world, in which the object and the mask object are viewed from the virtual camera, as the virtual world image.

Based on the above, a mask image is generated by placing a mask object in the virtual world. This facilitates a process of placing the mask image at the footprint of an image used as a texture of an object in the captured image.

In addition, the mask process means may place the predetermined mask image in the predetermined area in each of the captured images repeatedly acquired by the captured image acquisition means. The image combination means may combine the virtual world image with the captured image in which the mask image is placed by the mask process means.

Based on the above, it is possible to accurately place a mask image at the footprint of an image used as a texture of an object in the captured image.

In addition, based on an output from a sensor for detecting a motion of the real camera, the mask process means may detect the motion of the real camera, and may perform image processing so as to perform display on the display device such that the mask image is moved in a direction opposite to the motion of the real camera. It should be noted that the output from the sensor for detecting the motion of the real camera, for example, includes at least one of: data output from the sensor for detecting the angular velocities generated in the real camera, the data indicating the angular velocities; data output from the sensor for detecting the accelerations generated in the real camera, the data indicating the accelerations; and data indicating the captured image captured by the real camera, or includes data obtained at the middle stages until the motion of the real camera is calculated using the above data, or data indicating the motion of the real camera calculated using the above data.

Based on the above, a mask image is placed in accordance with the motion of the real camera. This makes it possible that even when the imaging range of the real camera has changed, the mask image is placed at the same position in the captured image after the change in the imaging range. Thus, it is possible to display the mask image as if placed in a real space represented by the captured image.

In addition, based on an output from a sensor for detecting a motion of the real camera, the mask process means may detect the motion of the real camera, and may set a position and an imaging direction of the virtual camera by imparting the same motion as the motion of the real camera to the virtual camera. The virtual world image generation means may generate an image of the virtual world, in which the object and the mask object are viewed from the virtual camera set by the mask process means, as the virtual world image.

Based on the above, the same motion as the motion of the real camera is imparted to the virtual camera. This makes it possible that even when the imaging range of the real camera has changed, the object and the mask object are placed at the same positions in the captured image after the change in the imaging range. It is possible to display the object and the mask image as if placed in a real space represented by the captured image.

In addition, the image processing program may further cause the computer to function as face recognition process means. The face recognition process means performs a face recognition process for recognizing a person's face in each of the captured images repeatedly acquired by the captured image acquisition means. In this case, the virtual world image generation means may set at least one area in an image of the face recognized by the face recognition process means, as the predetermined area. In each of the captured images repeatedly acquired by the captured image acquisition means, the mask process means may perform image processing so as to perform display on the display device such that the mask image covers the area in the image of the face set as the predetermined area in the captured image.

Based on the above, it is possible to cause an object to appear that has a texture obtained from an image of a person's face in the captured image, and thereby display a mask image at a portion of the face image used as the texture in the captured image.

In addition, the mask process means may set an image that covers the entire predetermined area by filling in the entire predetermined area with a predetermined color, as the mask image.

Based on the above, it is possible to easily determine the footprint of an image used as a texture of an object in the captured image (a mask image).

In addition, the mask process means may set, as the mask image, an image that covers the entire predetermined area by filling in the entire predetermined area with any of colors captured in a periphery adjacent to the predetermined area in the captured image in which the predetermined area is set.

Based on the above, display is performed such that the footprint of an image used as a texture of an object in the captured image is filled in with a peripheral color. This makes it possible to display an image as if the portion of the image used as the texture in the captured image has not existed since the time of the capturing.

In addition, the virtual world image generation means may include object initial placement means. The object initial placement means, when the image combination means combines the captured image with the virtual world image, sets an initial position of the object in the virtual world such that the object is combined with the predetermined area in the captured image, and places the object at the initial position.

Based on the above, it is possible to make representation as if an object slides out of a part of the captured image.

In addition, the object initial placement means may place at the initial position the object obtained by mapping the texture onto a predetermined initial stage model. The virtual world image generation means may further include morphing process means. The morphing process means places the object in the virtual world by performing a morphing process, gradually from the initial stage model to a predetermined final stage model. The virtual world image generation means may generate, as the virtual world image, an image of the virtual world, in which the object of the initial stage model placed by the object initial placement means is viewed from the virtual camera, and may subsequently generate, as the virtual world image, an image of the virtual world, in which the object subjected to the morphing process by the morphing process means is viewed from the virtual camera.

Based on the above, it is possible to display an image as if the object having slid out of a part of the captured image gradually grows into a predetermined three-dimensional state.

In addition, the virtual world image generation means may place the object at an initial position in the virtual world, and may subsequently place the object by moving the object in the virtual world by a predetermined rule.

Based on the above, it is possible to cause an object having slid out of a part of the captured image to move, and thereby represent an image as if the object of the virtual world is moving in the real world.

In addition, after the morphing process means has performed the morphing process so as to reach the final stage model, the virtual world image generation means may start moving the object in the virtual world, and, after the start of the movement, may place the object by moving the object in the virtual world by a predetermined rule.

Based on the above, it is possible to represent an image as if the object grows into a predetermined three-dimensional state when sliding out of a part of the captured image, and, after the growth, the object of the virtual world moves in the real world.

In addition, the object initial placement means may set a planar model whose main surface has a shape of the predetermined area, as the initial stage model, and may place at the initial position the object obtained by mapping the texture onto the main surface.

Based on the above, it is possible to display an object as if, when sliding out of a part of the captured image, the object is integrated with the captured image at the initial stage of the sliding out.

In addition, the captured image acquisition means may repeatedly acquire captured images of a real world captured in real time by a real camera available to the image processing apparatus. The image processing program may further cause the computer to function as face recognition process means. The face recognition process means performs a face recognition process for recognizing a person's face in each of the captured images repeatedly acquired by the captured image acquisition means. The virtual world image generation means may set at least one area in an image of the face recognized by the face recognition process means, as the predetermined area, may set, as the texture, the image of the face set as the predetermined area, and may generate the virtual world image by placing the object in the virtual world such that, when the object is displayed on the display device, at least a part of the object overlaps the image of the face recognized in the corresponding captured image by repeatedly performing the face recognition process. The image combination means may combine the virtual world image with each of the captured images repeatedly acquired by the captured image acquisition means. The display control means may repeatedly display on the display device the images obtained by combining the captured images repeatedly acquired by the captured image acquisition means, with the virtual world image.

Based on the above, in the displayed captured image, it is possible to display an object having a texture of a face image having slid out as the object, the texture set so as to follow the movement of the face image.

In addition, the virtual world image generation means may generate the virtual world image by placing in the virtual world the object obtained by texture-mapping the image of the face recognized by the face recognition process means onto a three-dimensional model.

Based on the above, it is possible to cause an object to appear that is obtained by texture-mapping a face image on a three-dimensional model.

In addition, the virtual world image generation means may place the object in the virtual world by, using the image of the face recognized in the corresponding captured image by repeatedly performing the face recognition process, updating the texture of the three-dimensional model every time the image of the face is recognized.

Based on the above, it is possible to reflect on the object a change in (e.g., a change in the expression of) the subject from which the face image has been acquired.

In addition, the present invention may be carried out in the form of an image processing apparatus and an image processing system that include the above means, and may be carried out in the form of an image processing method including operations performed by the above means.

Based on the present invention, it is possible to generate a new image by combining a captured image with a virtual world image in which an object having a texture obtained from a part of the captured image is placed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an example of a user holding the game apparatus 10 with both hands;

FIG. 24 is a diagram showing an example where display is performed on the upper LCD 22 such that a morphing process is performed on the enemy object EO;

DESCRIPTION OF THE PREFERRED EMBODIMENTS

First Embodiment

Figure 1:
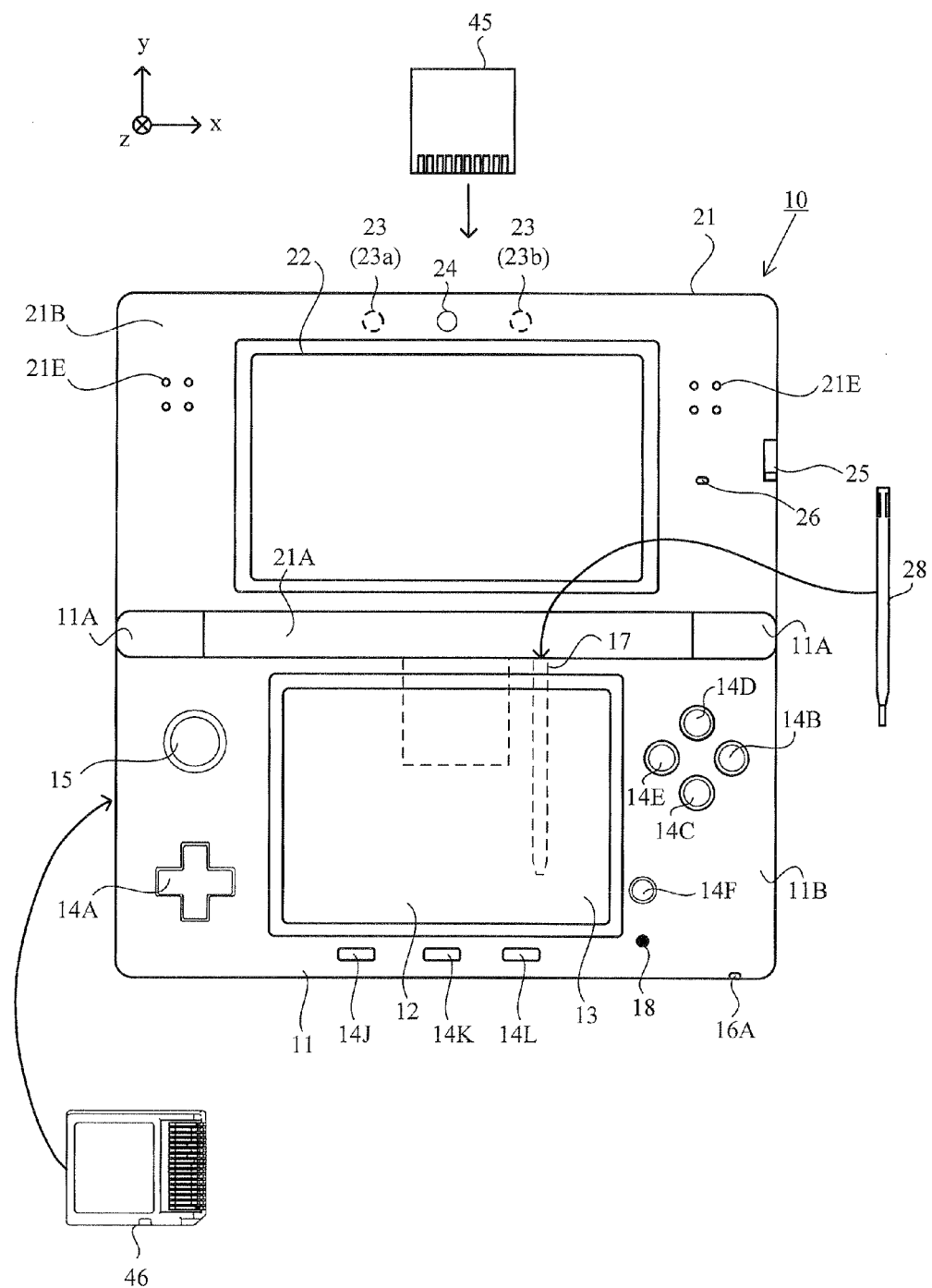
FIG. 1 is a front view showing an example of a game apparatus 10 being open.
Figure 2:
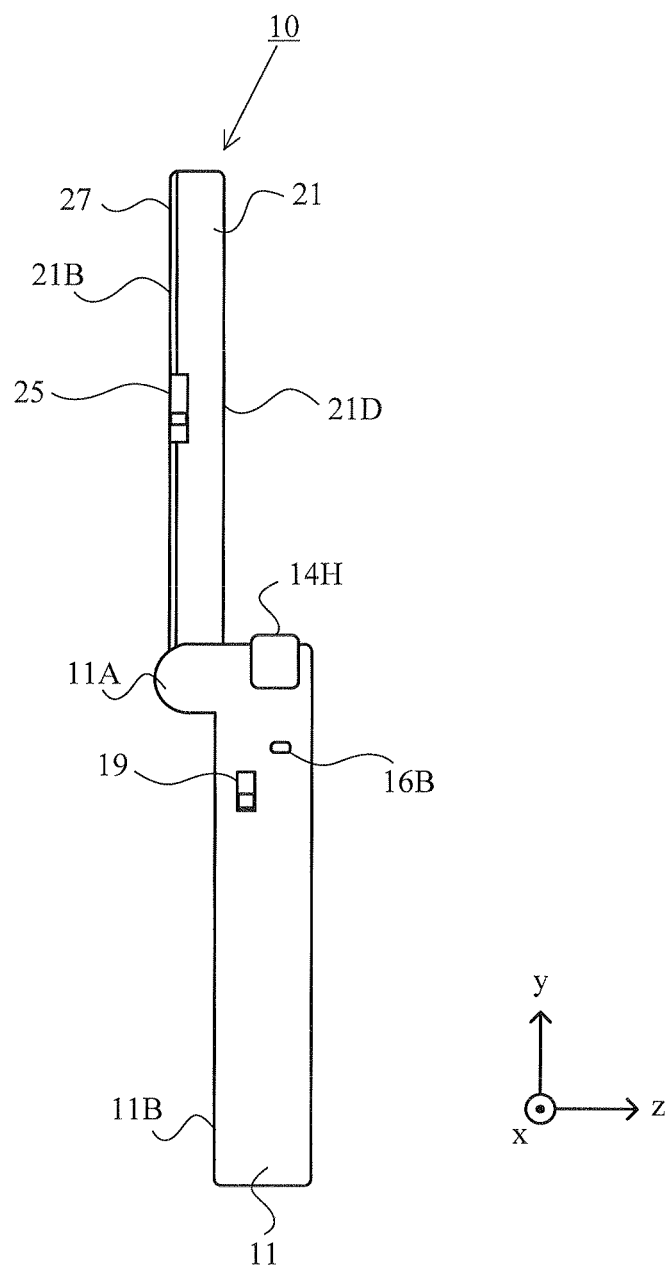
FIG. 2 is a right side view showing an example of the game apparatus 10 being open.
Figure 3:
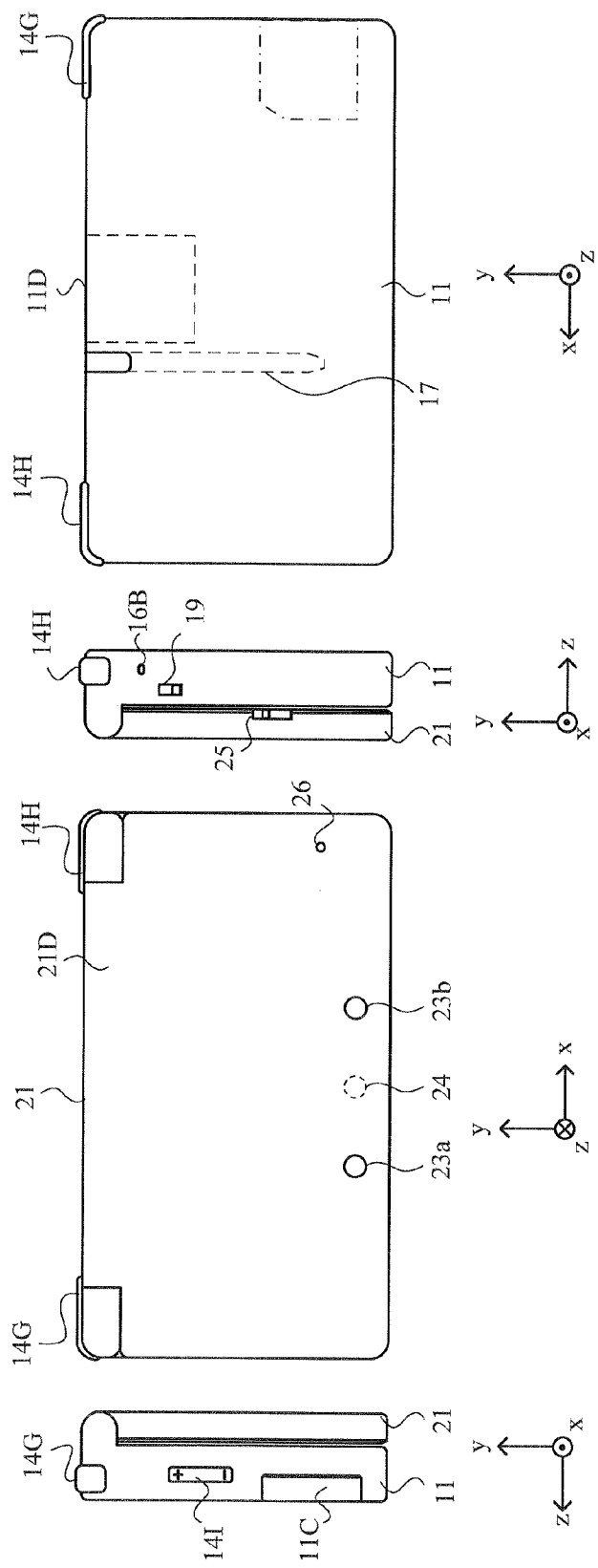
FIG. 3A is a left side view showing an example of the game apparatus 10 being closed.
FIG. 3B is a front view showing an example of the game apparatus 10 being closed.
FIG. 3C is a right side view showing an example of the game apparatus 10 being closed.
FIG. 3D is a rear view showing an example of the game apparatus 10 being closed.

With reference to the drawings, a description is given of an image processing apparatus that executes an image processing program according to a first embodiment of the present invention. The image processing program according to the present invention can be applied by being executed by any computer system. As an example of the image processing apparatus, a hand-held game apparatus 10 is taken, and the description is given using the image processing program executed by the game apparatus 10. It should be noted that FIGS. 1 through 3D are each a plan view showing an example of the outer appearance of the game apparatus 10. As an example, the game apparatus 10 is a hand-held game apparatus, and is configured to be foldable as shown in FIGS. 1 through 3D. FIG. 1 is a front view showing an example of the game apparatus 10 being open (in an open state). FIG. 2 is a right side view showing an example of the game apparatus 10 in the open state. FIG. 3A is a left side view showing an example of the game apparatus 10 being closed (in a closed state). FIG. 3B is a front view showing an example of the game apparatus 10 in the closed state. FIG. 3C is a right side view showing an example of the game apparatus 10 in the closed state. FIG. 3D is a rear view showing an example of the game apparatus 10 in the closed state. The game apparatus 10 includes imaging sections, and is capable, for example, of capturing an image with the imaging sections, displaying the captured image on a screen, and storing data of the captured image. The game apparatus 10 is capable of executing a game program stored in an exchangeable memory card, or received from a server or another game apparatus, and is also capable of displaying on the screen an image generated by computer graphics processing, such as an image captured by a virtual camera set in a virtual space.

In FIGS. 1 through 3D, the game apparatus 10 includes a lower housing 11 and an upper housing 21. The lower housing 11 and the upper housing 21 are joined to each other so as to be openable and closable in a folding manner (foldable). In the example of FIG. 1, the lower housing 11 and the upper housing 21 each has a wider-than-high rectangular plate-like shape, and are joined to each other at one of the long sides of the lower housing 11 and the corresponding one of the long sides of the upper housing 21 so as to be pivotable relative to each other. Normally, a user uses the game apparatus 10 in the open state. The user stores away the game apparatus 10 in the closed state when not using it. Further, as well as the closed state and the open state that are described above, the game apparatus 10 can maintain the lower housing 11 and the upper housing 21 at any angle formed between the game apparatus 10 in the closed state and the game apparatus 10 in the open state due, for example, to a frictional force generated at the connecting part. That is, the upper housing 21 can be maintained stationary at any angle with respect to the lower housing 11.

As shown in FIGS. 1 and 2, projections 11A are provided at the upper long side portion of the lower housing 11, each projection 11A projecting perpendicularly to an inner surface (main surface) 11B of the lower housing 11. A projection 21A is provided at the lower long side portion of the upper housing 21, the projection 21A projecting perpendicularly to the lower side surface of the upper housing 21 from the lower side surface of the upper housing 21. The joining of the projections 11A of the lower housing 11 and the projection 21A of the upper housing 21 connects the lower housing 11 and the upper housing 21 in a foldable manner.

The lower housing 11 includes a lower liquid crystal display (LCD) 12, a touch panel 13, operation buttons 14A through 14L (FIG. 1, FIGS. 3A through 3D), an analog stick 15, LEDs 16A and 16B, an insertion slot 17, and a microphone hole 18. These components are described in detail below.

As shown in FIG. 1, the lower LCD 12 is accommodated in the lower housing 11. The lower LCD 12 has a wider-than-high shape, and is placed such that the long side direction of the lower LCD 12 coincides with the long side direction of the lower housing 11. The lower LCD 12 is placed at the center of the lower housing 11. The lower LCD 12 is provided on the inner surface (main surface) of the lower housing 11, and the screen of the lower LCD 12 is exposed through an opening of the inner surface of the lower housing 11. The game apparatus 10 is in the closed state when not used, so that the screen of the lower LCD 12 is prevented from being soiled or damaged. As an example, the number of pixels of the lower LCD 12 is 256 dots×192 dots (horizontal×vertical). Unlike the upper LCD 22 described later, the lower LCD 12 is a display device that displays an image in a planar manner (not in a stereoscopically visible manner). It should be noted that although an LCD is used as a display device in the present embodiment, any other display device may be used, such as a display device using electroluminescence (EL). Further, a display device having any resolution may be used as the lower LCD 12.

As shown in FIG. 1, the game apparatus 10 includes the touch panel 13 as an input device. The touch panel 13 is mounted so as to cover the screen of the lower LCD 12. In the present embodiment, the touch panel 13 may be, but is not limited to, a resistive touch panel. The touch panel may also be a touch panel of any pressure type, such as an electrostatic capacitance type. In the present embodiment, the touch panel 13 has the same resolution (detection accuracy) as that of the lower LCD 12. The resolutions of the touch panel 13 and the lower LCD 12, however, may not necessarily need to be the same. Further, the insertion slot 17 (a dashed line shown in FIGS. 1 and 3D) is provided on the upper side surface of the lower housing 11. The insertion slot 17 can accommodate a stylus 28 that is used to perform an operation on the touch panel 13. Although an input to the touch panel 13 is normally provided using the stylus 28, an input may be provided on the touch panel 13 not only by the stylus 28 but also by a finger of the user.

The operation buttons 14A through 14L are each an input device for providing a predetermined input. As shown in FIG. 1, among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11. The cross button 14A is cross-shaped, and includes buttons for indicating up, down, left, and right directions, respectively. The button 14B, the button 14C, the button 14D, and the button 14E are placed in a cross formation. The buttons 14A through 14E, the select button 14J, the home button 14K, and the start button 14L are appropriately assigned functions, respectively, in accordance with the program executed by the game apparatus 10. The cross button 14A is used for, for example, a selection operation. The operation buttons 14B through 14E are used for, for example, a determination operation or a cancellation operation. The power button 14F is used to power on/off the game apparatus 10.

The analog stick 15 is a device for indicating a direction, and is provided to the upper left of the lower LCD 12 of the inner surface of the lower housing 11. As shown in FIG. 1, the cross button 14A is provided to the lower left of the lower LCD 12 of the lower housing 11 such that the analog stick 15 is provided above the cross button 14A. The analog stick 15 and the cross button 14A are placed so as to be operated by the thumb of a left hand holding the lower housing 11. Further, the provision of the analog stick 15 in the upper area places the analog stick 15 at the position where the thumb of a left hand holding the lower housing 11 is naturally placed, and also places the cross button 14A at the position where the thumb of the left hand is moved slightly downward from the analog stick 15. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

The four buttons placed in a cross formation, that is, the button 14B, the button 14C, the button 14D, and the button 14E, are placed where the thumb of a right hand holding the lower housing 11 is naturally placed. Further, these four buttons and the analog stick 15 are placed symmetrically to each other with respect to the lower LCD 12. This also enables, for example, a left-handed person to provide a direction indication input using these four buttons, depending on the game program.

Further, the microphone hole 18 is provided on the inner surface of the lower housing 11. Underneath the microphone hole 18, a microphone (see FIG. 6) is provided as the sound input device described later, and detects a sound from outside the game apparatus 10.

As shown in FIGS. 3B and 3D, the L button 14G and the R button 14H are provided on the upper side surface of the lower housing 11. The L button 14G is provided at the left end portion of the upper side surface of the lower housing 11, and the R button 14H is provided at the right end portion of the upper side surface of the lower housing 11. As described later, the L button 14G and the R button 14H function as shutter buttons (capturing instruction buttons) of the imaging sections. Further, as shown in FIG. 3A, the sound volume button 14I is provided on the left side surface of the lower housing 11. The sound volume button 14I is used to adjust the sound volume of a loudspeaker of the game apparatus 10.

As shown in FIG. 3A, a cover section 11C is provided on the left side surface of the lower housing 11 so as to be openable and closable. Within the cover section 11C, a connector (not shown) is provided for electrically connecting the game apparatus 10 and a data storage external memory 46. The data storage external memory 46 is detachably attached to the connector. The data storage external memory 46 is used to, for example, record (store) data of an image captured by the game apparatus 10. It should be noted that the connector and the cover section 11C may be provided on the right side surface of the lower housing 11.

As shown in FIG. 3D, on the upper side surface of the lower housing 11, an insertion slot 11D is provided, into which an external memory 45 having a game program stored thereon is to be inserted. Within the insertion slot 11D, a connector (not shown) is provided for electrically connecting the game apparatus 10 and the external memory 45 in a detachable manner. A predetermined game program is executed by connecting the external memory 45 to the game apparatus 10. It should be noted that the connector and the insertion slot 11D may be provided on another side surface (e.g., the right side surface) of the lower housing 11.

As shown in FIG. 1, on the lower side surface of the lower housing 11, the first LED 16A is provided for notifying the user of the on/off state of the power supply of the game apparatus 10. Further, as shown in FIG. 3C, on the right side surface of the lower housing 11, the second LED 16B is provided for notifying the user of the establishment state of the wireless communication of the game apparatus 10. Furthermore, the game apparatus 10 is capable of wirelessly communicating with other devices, and the second LED 16B is lit on when wireless communication is established between the game apparatus 10 and other devices. The game apparatus 10 has the function of establishing connection with a wireless LAN by, for example, a method based on the IEEE 802.11.b/g standard. On the right side surface of the lower housing 11, a wireless switch 19 is provided for enabling/disabling the function of the wireless communication (see FIG. 3C).

It should be noted that although not shown in the figures, a rechargeable battery that serves as the power supply of the game apparatus 10 is accommodated in the lower housing 11, and the battery can be charged through a terminal provided on the side surface (e.g., the upper side surface) of the lower housing 11.

The upper housing 21 includes an upper LCD 22, an outer imaging section 23 having two outer imaging sections (a left outer imaging section 23a and a right outer imaging section 23b), an inner imaging section 24, a 3D adjustment switch 25, and a 3D indicator 26. These components are described in detail below.

As shown in FIG. 1, the upper LCD 22 is accommodated in the upper housing 21. The upper LCD 22 has a wider-than-high shape, and is placed such that the long side direction of the upper LCD 22 coincides with the long side direction of the upper housing 21. The upper LCD 22 is placed at the center of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12.

The screen of the upper LCD 22 is provided on the inner surface (main surface) 21B of the upper housing 21, and is exposed through an opening of the inner surface of the upper housing 21. Further, as shown in FIG. 2, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 640 dots×200 dots (horizontal×vertical). It should be noted that although an LCD is used as the upper LCD 22 in the present embodiment, a display device using EL or the like may be used. Furthermore, a display device having any resolution may be used as the upper LCD 22.

The upper LCD 22 is a display device capable of displaying a stereoscopically visible image. The upper LCD 22 is capable of displaying a left-eye image and a right-eye image, using substantially the same display area. Specifically, the upper LCD 22 is a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the present embodiment, the upper LCD 22 is of a parallax barrier type. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The "outer imaging section 23" is the collective term of the two imaging sections (the left outer imaging section 23a and the right outer imaging section 23b) provided on an outer surface (the back surface, which is the opposite side to the main surface including the upper LCD 22) 21D of the upper housing 21. The imaging directions of the left outer imaging section 23a and the right outer imaging section 23b are each the same as the outward normal direction of the outer surface 21D. Further, the left outer imaging section 23a and the right outer imaging section 23b are each designed so as to be placed 180 degrees opposite to the normal direction of the display surface (inner surface) of the upper LCD 22. That is, the imaging direction of the left outer imaging section 23a and the imaging direction of the right outer imaging section 23b are parallel to each other. The left outer imaging section 23a and the right outer imaging section 23b can be used as a stereo camera, depending on the program executed by the game apparatus 10. Alternatively, either one of the two outer imaging sections (the left outer imaging section 23a and the right outer imaging section 23b) may be used solely, so that the outer imaging section 23 can also be used as a non-stereo camera, depending on the program. Yet alternatively, depending on the program, images captured by the two outer imaging sections (the left outer imaging section 23a and the right outer imaging section 23b) may be combined with each other, or may be used to compensate for each other, so that imaging can be performed with an extended imaging range. In the present embodiment, the outer imaging section 23 includes two imaging sections, that is, the left outer imaging section 23a and the right outer imaging section 23b. The left outer imaging section 23a and the right outer imaging section 23b each includes an imaging device (e.g., a CCD image sensor or a CMOS image sensor) having a predetermined common resolution, and a lens. The lens may have a zoom mechanism.

As indicated by dashed lines in FIG. 1 and solid lines in FIG. 3B, the left outer imaging section 23a and the right outer imaging section 23b included in the outer imaging section 23 are placed parallel to the horizontal direction of the screen of the upper LCD 22. That is, the left outer imaging section 23a and the right outer imaging section 23b are placed such that a straight line connecting between the left outer imaging section 23a and the right outer imaging section 23b is parallel to the horizontal direction of the screen of the upper LCD 22. The dashed lines 23a and 23b in FIG. 1 indicate the left outer imaging section 23a and the right outer imaging section 23b, respectively, provided on the outer surface, which is the opposite side of the inner surface of the upper housing 21. As shown in FIG. 1, when the user views the screen of the upper LCD 22 from the front thereof, the left outer imaging section 23a is placed to the left of the upper LCD 22 and the right outer imaging section 23b is placed to the right of the upper LCD 22. When a program is executed for causing the outer imaging section 23 to function as a stereo camera, the left outer imaging section 23a captures a left-eye image, which is to be viewed with the user's left eye, and the right outer imaging section 23b captures a right-eye image, which is to be viewed with the user's right eye. The distance between the left outer imaging section 23a and the right outer imaging section 23b is set to correspond to the distance between both eyes of a person, and may be set, for example, in the range from 30 mm to 70 mm. The distance between the left outer imaging section 23a and the right outer imaging section 23b, however, is not limited to this range.

It should be noted that in the present embodiment, the left outer imaging section 23a and the right outer imaging section 23b are fixed to the housing, and therefore, the imaging directions cannot be changed.

The left outer imaging section 23a and the right outer imaging section 23b are placed symmetrically to each other with respect to the center of the upper LCD 22 (the upper housing 21) in the left-right direction. That is, the left outer imaging section 23a and the right outer imaging section 23b are placed symmetrically with respect to the line dividing the upper LCD 22 into two equal left and right portions. Further, the left outer imaging section 23a and the right outer imaging section 23b are placed in the upper portion of the upper housing 21 and in the back of the portion above the upper edge of the screen of the upper LCD 22, in the state where the upper housing 21 is in the open state. That is, the left outer imaging section 23a and the right outer imaging section 23b are placed on the outer surface of the upper housing 21, and, if the upper LCD 22 is projected onto the outer surface of the upper housing 21, is placed above the upper edge of the screen of the projected upper LCD 22.

Thus, the two imaging sections (the left outer imaging section 23a and the right outer imaging section 23b) of the outer imaging section 23 are placed symmetrically with respect to the center of the upper LCD 22 in the left-right direction. This makes it possible that when the user views the upper LCD 22 from the front thereof, the imaging directions of the outer imaging section 23 coincide with the directions of the respective lines of sight of the user's right and left eyes. Further, the outer imaging section 23 is placed in the back of the portion above the upper edge of the screen of the upper LCD 22, and therefore, the outer imaging section 23 and the upper LCD 22 do not interfere with each other inside the upper housing 21. This makes it possible to reduce the upper housing 21 in thickness as compared to the case where the outer imaging section 23 is placed in the back of the screen of the upper LCD 22.

The inner imaging section 24 is provided on the inner surface (main surface) 21B of the upper housing 21, and functions as an imaging section having an imaging direction that is the same as the inward normal direction of the inner surface. The inner imaging section 24 includes an imaging device (e.g., a CCD image sensor or a CMOS image sensor) having a predetermined resolution, and a lens. The lens may have a zoom mechanism.

As shown in FIG. 1, when the upper housing 21 is in the open state, the inner imaging section 24 is placed: in the upper portion of the upper housing 21; above the upper edge of the screen of the upper LCD 22; and in the center of the upper housing 21 in the left-right direction (on the line dividing the upper housing 21 (the screen of the upper LCD 22) into two equal left and right portions). Specifically, as shown in FIGS. 1 and 3B, the inner imaging section 24 is placed on the inner surface of the upper housing 21 and in the back of the middle portion between the left outer imaging section 23a and the right outer imaging section 23b. That is, if the left outer imaging section 23a and the right outer imaging section 23b provided on the outer surface of the upper housing 21 are projected onto the inner surface of the upper housing 21, the inner imaging section 24 is placed at the middle portion between the projected left outer imaging section 23a and the projected right outer imaging section 23b. The dashed line 24 shown in FIG. 3B indicates the inner imaging section 24 provided on the inner surface of the upper housing 21.

Thus, the inner imaging section 24 captures an image in the direction opposite to that of the outer imaging section 23. The inner imaging section 24 is provided on the inner surface of the upper housing 21 and in the back of the middle portion between the two imaging sections of the outer imaging section 23. This makes it possible that when the user views the upper LCD 22 from the front thereof, the inner imaging section 24 captures the user's face from the front thereof. Further, the left outer imaging section 23a and the right outer imaging section 23b do not interfere with the inner imaging section 24 inside the upper housing 21. This makes it possible to reduce the upper housing 21 in thickness.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. As shown in FIGS. 1 through 3D, the 3D adjustment switch 25 is provided at the end portions of the inner surface and the right side surface of the upper housing 21, and is placed so as to be visible to the user when the user views the upper LCD 22 from the front thereof. The 3D adjustment switch 25 includes a slider that is slidable to any position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. As shown in FIG. 1, the 3D indicator 26 is placed on the inner surface of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even when viewing the screen of the upper LCD 22.

In addition, speaker holes 21E are provided on the inner surface of the upper housing 21. A sound from the loudspeaker 44 described later is output through the speaker holes 21E.

Figure 5:
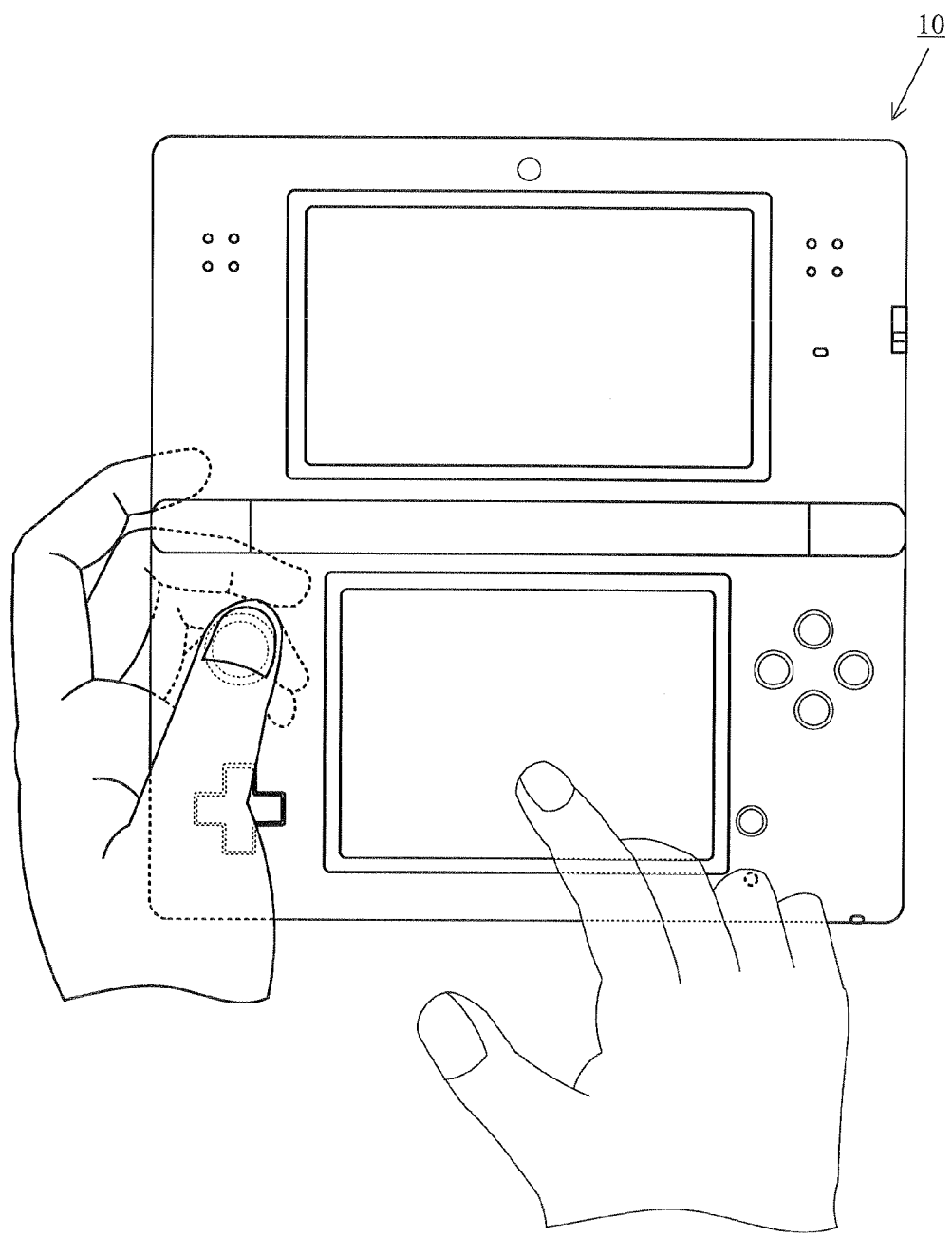
FIG. 5 is a diagram showing an example of a user holding the game apparatus 10 with one hand.

Next, with reference to FIGS. 4 and 5, an example is shown of the state of the use of the game apparatus 10. It should be noted that FIG. 4 is a diagram showing an example of a user holding the game apparatus 10 with both hands. FIG. 5 is a diagram showing an example of a user holding the game apparatus 10 with one hand.

As shown in FIG. 4, the user holds the side surfaces and the outer surface (the surface opposite to the inner surface) of the lower housing 11 with both palms, middle fingers, ring fingers, and little fingers, such that the lower LCD 12 and the upper LCD 22 face the user. Such holding enables the user to perform operations on the operation buttons 14A through 14E and the analog stick 15 with their thumbs, and to perform operations on the L button 14G and the R button 14H with their index fingers, while holding the lower housing 11. Further, as shown in FIG. 5, when an input is provided on the touch panel 13, one of the hands having held the lower housing 11 is released therefrom, and the lower housing 11 is held only with the other hand. This makes it possible to provide an input to the touch panel 13 with the one hand.

Figure 6:
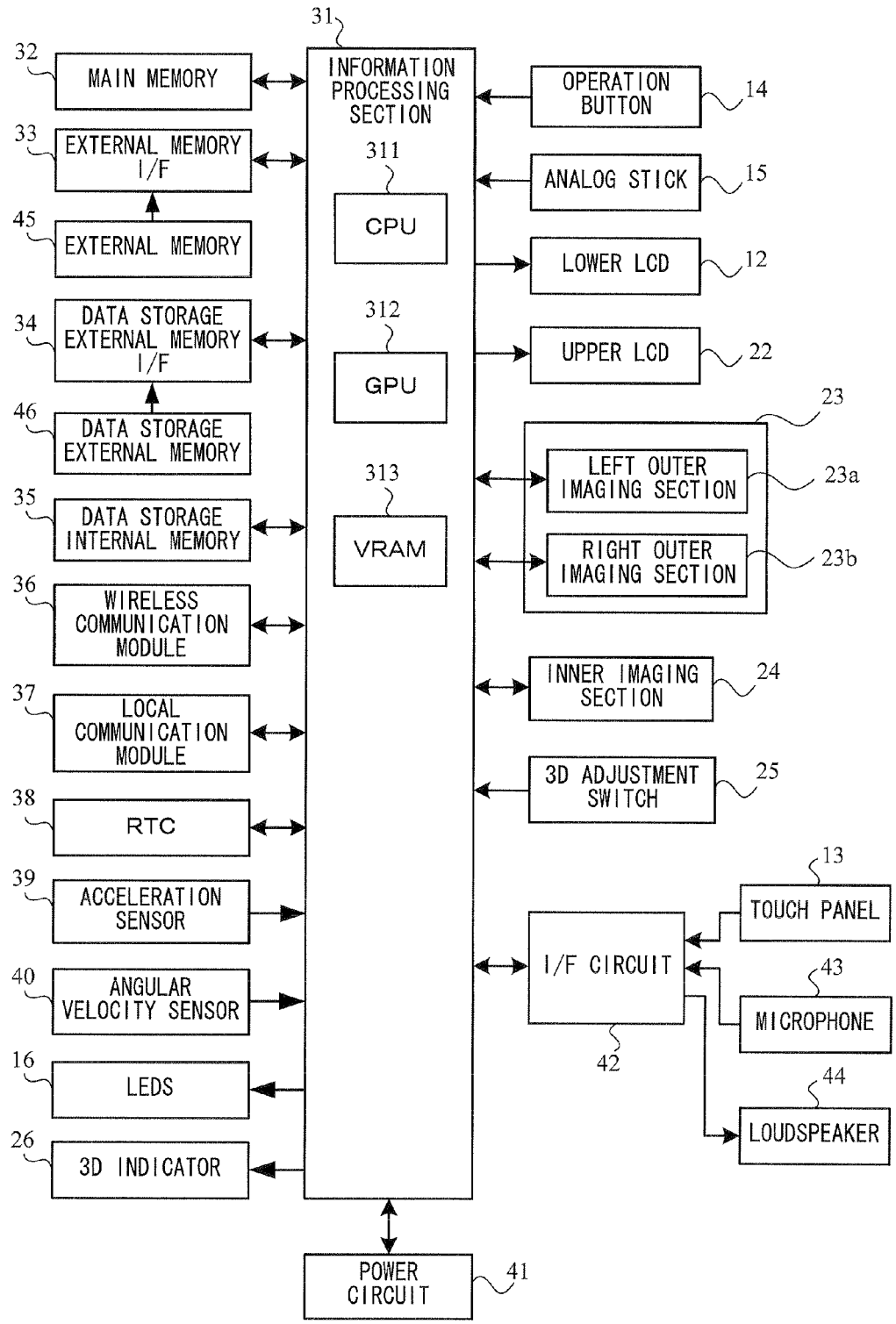
FIG. 6 is a block diagram showing an example of the internal configuration of the game apparatus 10.

Next, with reference to FIG. 6, a description is given of the internal configuration of the game apparatus 10. It should be noted that FIG. 6 is a block diagram showing an example of the internal configuration of the game apparatus 10.

Referring to FIG. 6, the game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11 (or may be accommodated in the upper housing 21).

The information processing section 31 is information processing means including a central processing unit (CPU) 311 that executes a predetermined program, a graphics processing unit (GPU) 312 that performs image processing, and the like. In the present embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs the image processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 45, another device, or the like) the game apparatus 10. In the present embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed. The data storage external memory 46 is composed of a readable/writable non-volatile memory (e.g., a NAND flash memory), and is used to store predetermined data. For example, the data storage external memory 46 stores images captured by the outer imaging section 23 and/or images captured by another device. When the data storage external memory 46 is connected to the data storage external memory I/F 34, the information processing section 31 loads an image stored in the data storage external memory 46, and the image can be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 detects the magnitudes of accelerations (linear accelerations) in the directions of straight lines along three axial (x, y, and z axes in the present embodiment) directions, respectively. The acceleration sensor 39 is provided, for example, within the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40 is connected to the information processing section 31. The angular velocity sensor 40 detects angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) based on the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects a sound from the user, and outputs a sound signal to the I/F circuit 42. The amplifier amplifies the sound signal from the I/F circuit 42, and outputs the sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal to sound data in a predetermined format. The touch panel control circuit generates touch position data in a predetermined format, based on a signal from the touch panel 13, and outputs the touch position data to the information processing section 31. The touch position data indicates the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the present embodiment, the information processing section 31 causes the lower LCD 12 to display an image for a hand-drawn image input operation, and causes the upper LCD 22 to display an image acquired from either one of the outer imaging section 23 and the inner imaging section 24. That is, for example, the information processing section 31 causes the upper LCD 22 to display a stereoscopic image (stereoscopically visible image) using a right-eye image and a left-eye image that are captured by the inner imaging section 24, or causes the upper LCD 22 to display a planar image using one of a right-eye image and a left-eye image that are captured by the outer imaging section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer imaging section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31. In the present embodiment, the information processing section 31 gives either one of the outer imaging section 23 and the inner imaging section 24 an instruction to capture an image, and the imaging section that has received the instruction captures an image, and transmits data of the captured image to the information processing section 31. Specifically, the user selects the imaging section to be used, through an operation using the touch panel 13 and the operation button 14. The information processing section 31 (the CPU 311) detects that an imaging section has been selected, and the information processing section 31 gives the selected one of the outer imaging section 23 and the inner imaging section 24 an instruction to capture an image.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

Next, before a description is given of specific processing operations performed by the image processing program executed by the game apparatus 10, a description is given, with reference to FIGS. 7 through 10, of examples of the forms of display performed on the upper LCD 22 by image processing operations. It should be noted that FIGS. 7 through 10 are diagrams showing examples of process steps where display is performed such that an enemy object EO appears from a camera image CI displayed on the upper LCD 22. It should be noted that for ease of description, an example is where a planar image (a planar view image, as opposed to the stereoscopically visible image described above) of the real world based on a camera image CI acquired from either one of the outer imaging section 23 and the inner imaging section 24 is displayed on the upper LCD 22.

Figure 7:
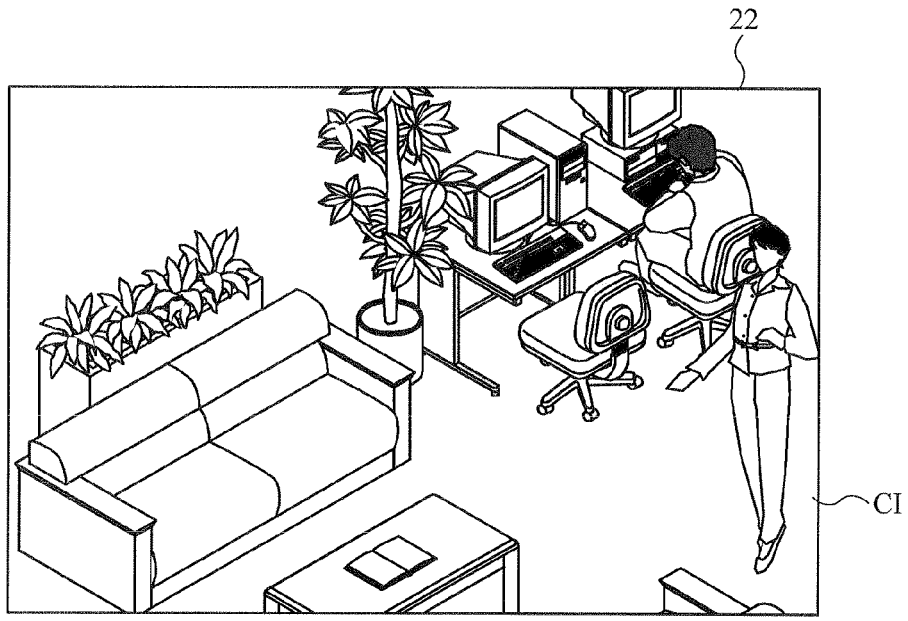
FIG. 7 is a diagram showing an example of process steps where display is performed such that an enemy object EO appears from a camera image CI displayed on an upper LCD 22.

In FIG. 7, on the upper LCD 22, a camera image CI is displayed, which is a real world image captured by a real camera built into the game apparatus 10 (e.g., the outer imaging section 23). For example, a real-time real world image (moving image) captured by the real camera built into the game apparatus 10 is displayed on the upper LCD 22.

Figure 8:
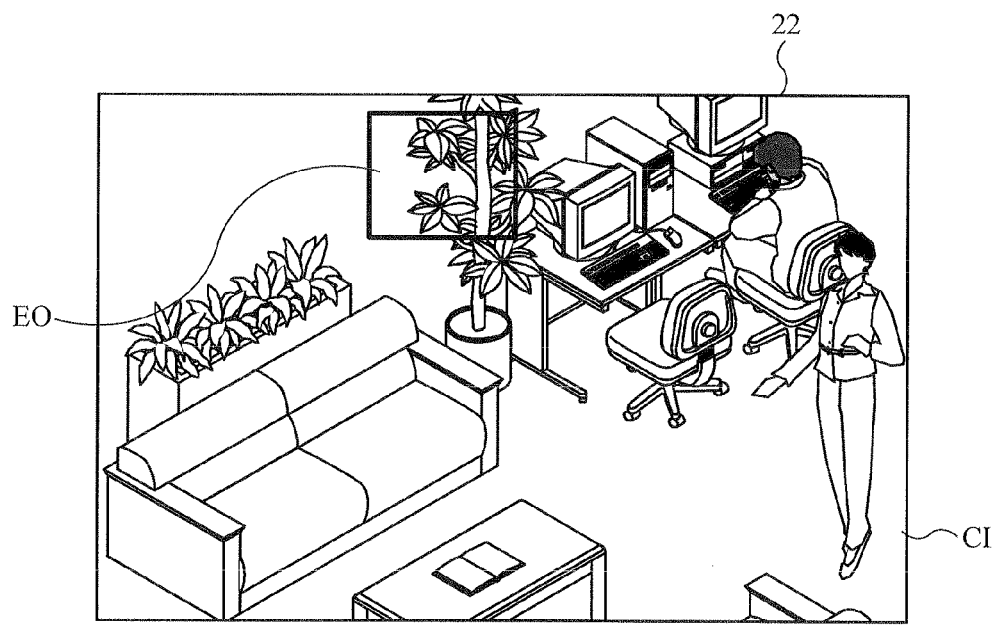
FIG. 8 is a diagram showing an example of the process steps where display is performed such that the enemy object EO appears from the camera image CI displayed on the upper LCD 22.

When conditions for the appearance of the enemy object EO are satisfied in the state where the camera image CI is displayed on the upper LCD 22, an image of a region to serve as the enemy object EO is clipped from the camera image CI displayed on the upper LCD 22 (the state of FIG. 8). In the example shown in FIG. 8, the clipping region to serve as the enemy object EO is set as a given rectangular region in the camera image CI.

Figure 9:
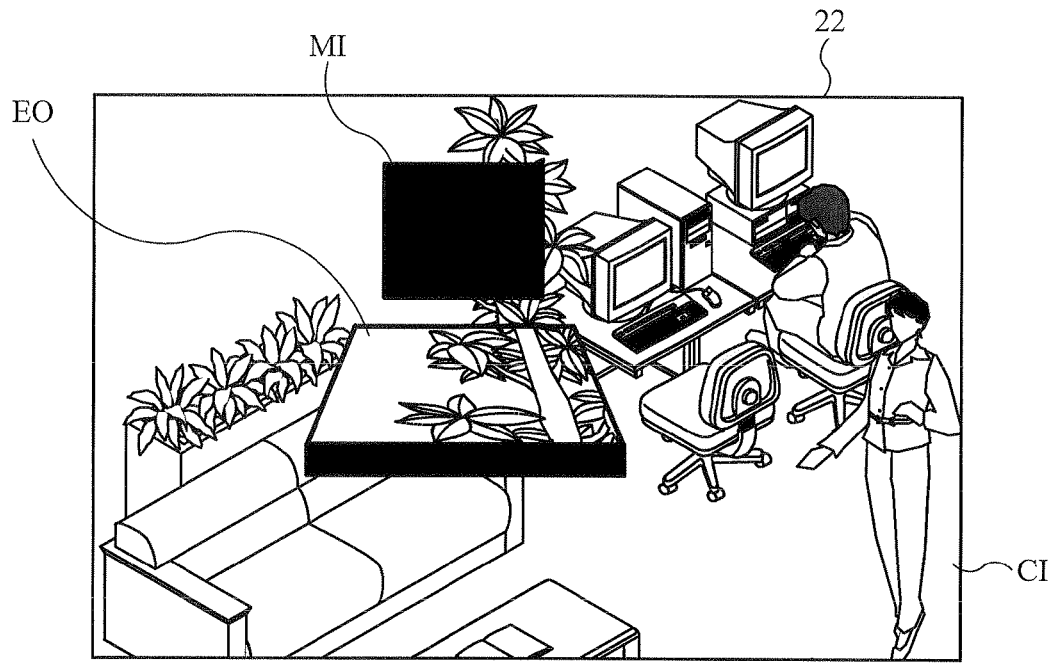
FIG. 9 is a diagram showing an example of the process steps where display is performed such that the enemy object EO appears from the camera image CI displayed on the upper LCD 22.

As shown in FIG. 9, the enemy object EO moves as a board-like physical body, to the main surface of which the image of the clipping region clipped from the camera image CI is applied. For example, the enemy object EO is displayed on the upper LCD 22 as if moving in real space, as a plate physical body that has been clipped from and slid out of the camera image CI, toward the real camera that is capturing the camera image CI, i.e., toward the user who is operating the game apparatus 10. That is, an image is displayed on the upper LCD 22, as if a predetermined region in an image of the real world captured by the user themselves comes as the enemy object EO toward the capturer, i.e., the user. For example, plate polygons on which the image of the clipping region is mapped as a texture (the enemy object EO) are placed in a virtual space, and an image of the virtual space, in which the enemy object EO is viewed from the virtual camera (e.g., a computer graphics image; hereinafter referred to as a "virtual world image"), is combined with the real world image obtained from the camera image CI. Thus, the enemy object EO is displayed on the upper LCD 22 as if placed in real space. Then, in accordance with an attack operation using the game apparatus 10 (e.g., pressing the button 14B (A button)), a bullet object BO is fired in a predetermined direction (e.g., the direction of the line of sight of the real camera that is capturing the camera image CI, and the direction of the line of sight of the virtual camera), and the enemy object EO serves as a target of attack for the user.

Further, in the camera image CI, a predetermined mask image MI is displayed in the footprint after the enemy object EO sliding out. As an example, the mask image MI is set as an image that covers the clipping region, of which the enemy object EO has slid out, by filling in the region with a predetermined color. As another example, the mask image MI is set as an image that covers the clipping region, of which the enemy object EO has slid out, by filling in the region with any of the colors displayed in the periphery adjacent to the region in the camera image CI (hereinafter occasionally referred to simply as a "peripheral color"). For example, a planar polygon (a mask object MO), which is filled in with the predetermined color or the peripheral color, is placed at the position in the virtual space corresponding to the position of the clipping region, and an image of the virtual space, in which the mask object MO is viewed from the virtual camera (a virtual world image), is combined with the real world image obtained from the camera image CI. Thus, display is performed on the upper LCD 22 such that the mask image MI is placed so as to cover the clipping region.

In the following descriptions, an example is where the mask image MI is displayed so as to cover the clipping region, by combining the virtual world image in which the mask object MO is placed, with the real world image. Alternatively, the mask image MI may be displayed so as to cover the clipping region, by another method. For example, the mask image MI may be displayed by filling in the clipping region in the real world image obtained from the camera image CI, with a predetermined color or a peripheral color. As will be described in detail later, the real world image is generated by, as an example, generating a planar polygon on which the camera image is mapped as a texture, and rendering the planar polygon with a parallel projection from the virtual camera. In this case, it is possible to generate the real world image in which the clipping region is replaced with the mask image MI, by filling in the clipping region in the camera image with a predetermined color or a peripheral color to thereby set the texture, or by mapping the texture and subsequently applying an image obtained by filling in the clipping region with a predetermined color or a peripheral color.

Figure 10:
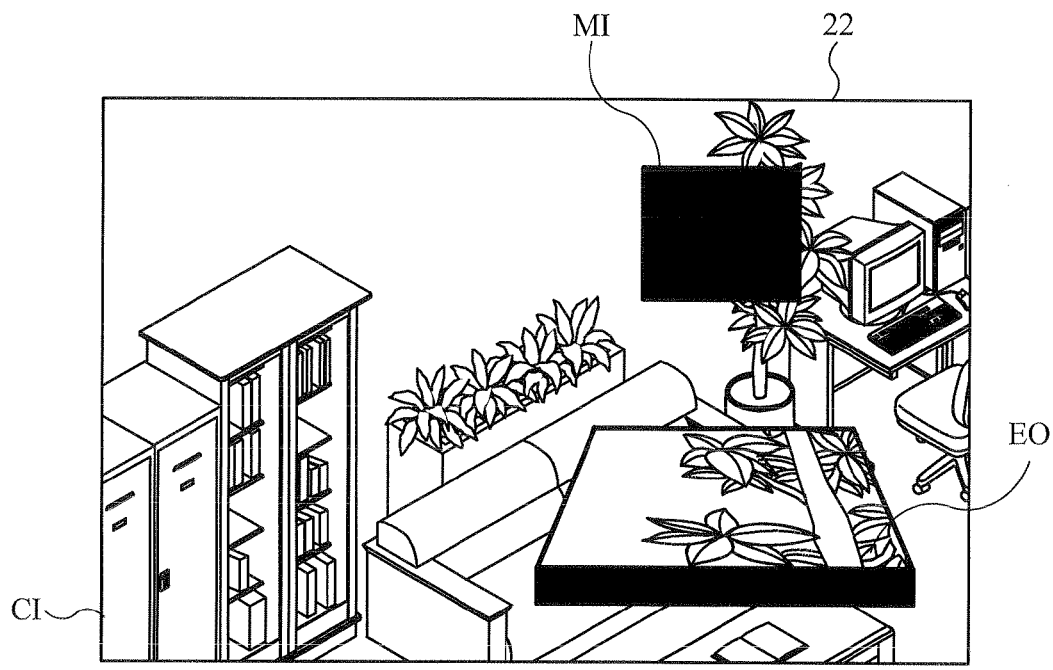
FIG. 10 is a diagram showing an example of the process steps where display is performed such that the enemy object EO appears from the camera image CI displayed on the upper LCD 22.

Here, as described above, on the upper LCD 22, the real-time real world image captured by the real camera built into the game apparatus 10 is displayed. Accordingly, changes in the direction and the position of the game apparatus 10 in real space also change the imaging range captured by the game apparatus 10, and therefore also change the camera image CI displayed on the upper LCD 22. In this case, the game apparatus 10 changes the position and the direction of the virtual camera in the virtual space in accordance with the motion of the game apparatus 10 in real space. With this, the enemy object EO and the mask image MI displayed as if placed in real space are displayed as if placed at the same positions in real space even when the direction and the position of the game apparatus 10 have changed in real space. For example, it is assumed that the camera image CI is captured as shown in FIG. 10 by turning left the imaging direction of the real camera of the game apparatus 10 from the state where the camera image CI is captured as shown in FIG. 9. In this case, the display positions of the enemy object EO and the mask image MI displayed on the upper LCD 22 move in the direction opposite to the turn in the imaging direction of the real camera (in the right direction), that is, the direction of the virtual camera in the virtual space, where the enemy object EO and the mask object MO are placed, moves to the left as does that of the real camera. Thus, even when changes in the direction and the position of the game apparatus 10 also change the imaging range of the real camera, the enemy object EO and the mask image MI are displayed on the upper LCD 22 as if placed in a real space represented by the camera image CI.

Figure 11:
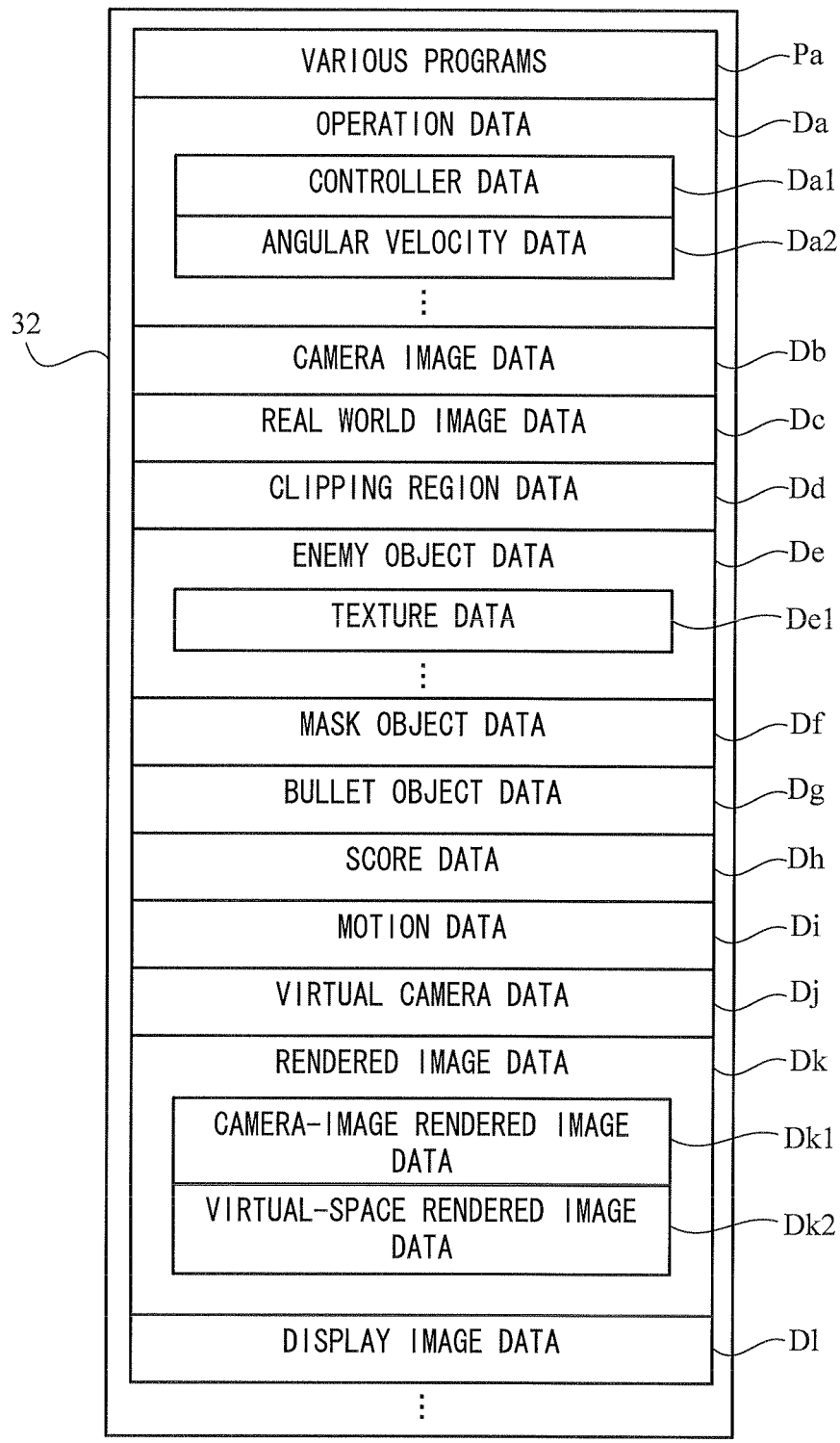
FIG. 11 is a diagram showing an example of various data stored in a main memory 32 in accordance with the execution of an image processing program to be executed by the game apparatus 10 of FIG. 1.
Figure 12:
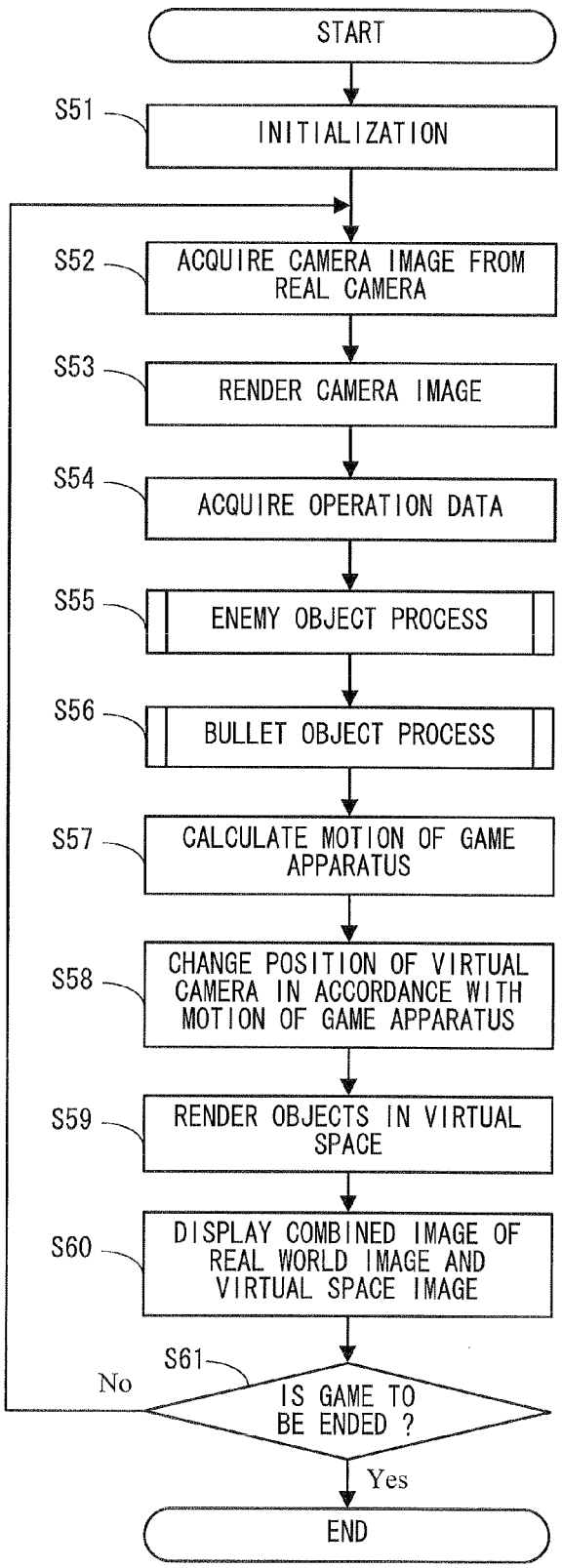
FIG. 12 is a flow chart showing an example of the operation of image processing performed by the game apparatus 10 in accordance with the execution of the image processing program to be executed by the game apparatus 10 of FIG. 1.
Figure 13:
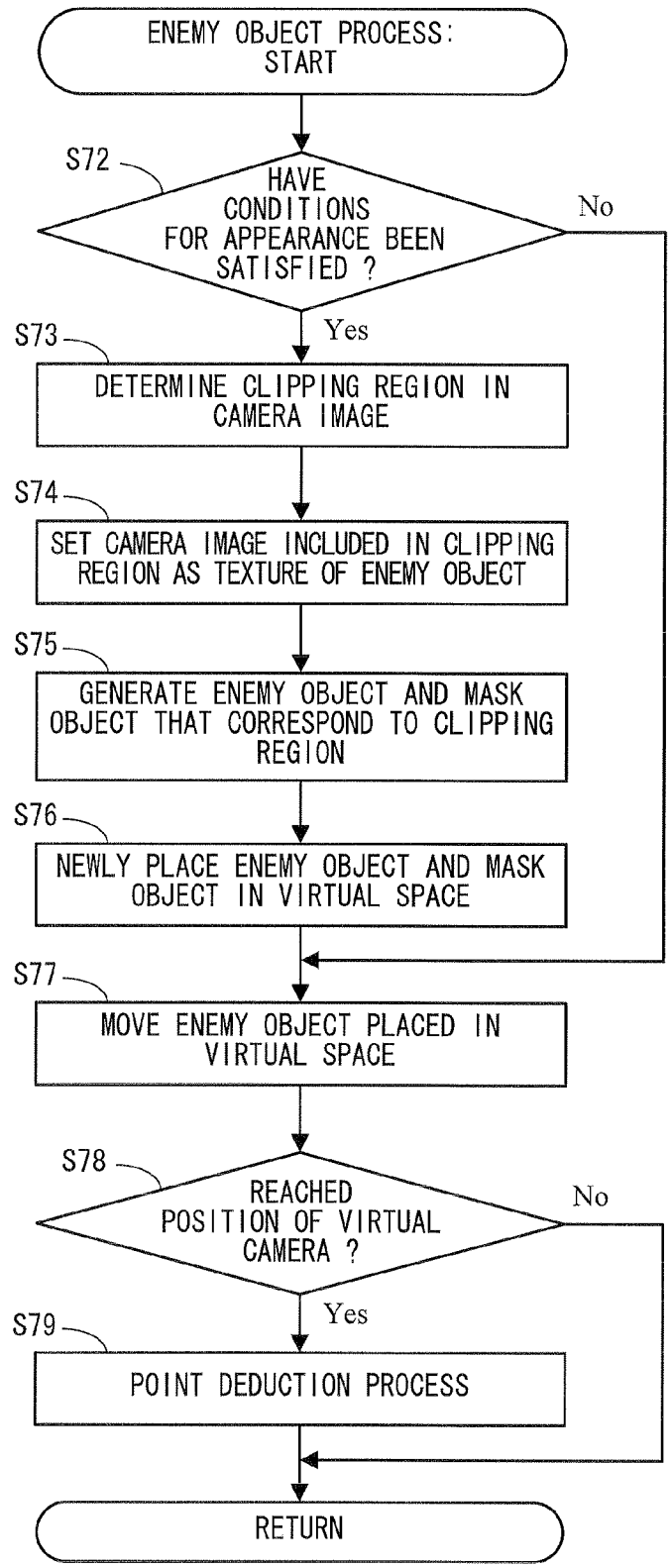
FIG. 13 is a subroutine flow chart showing an example of a detailed operation of an enemy object process performed in step 55 of FIG. 12.

Next, with reference to FIGS. 11 through 14, a description is given of the specific processing operations performed by the image processing program executed by the game apparatus 10. It should be noted that FIG. 11 is a diagram showing an example of various data stored in the main memory 32 in accordance with the execution of the image processing program. FIG. 12 is a flow chart showing an example of the operation of image processing performed by the game apparatus 10 in accordance with the execution of the image processing program. FIG. 13 is a subroutine flow chart showing an example of a detailed operation of an enemy object process performed in step 55 of FIG. 12. FIG.

14 is a subroutine flow chart showing an example of a detailed operation of a bullet object process performed in step 56 of FIG. 12. It should be noted that programs for performing these processes are included in a memory built into the game apparatus 10 (e.g., the data storage internal memory 35), or included in the external memory 45 or the data storage external memory 46, and the programs are: loaded from the built-in memory, or loaded from the external memory 45 through the external memory I/F 33 or from the data storage external memory 46 through the data storage external memory I/F 34, into the main memory 32 when the game apparatus 10 is turned on; and executed by the CPU 311.

Referring to FIG. 11, the main memory 32 stores the programs loaded from the built-in memory, the external memory 45, or the data storage external memory 46, and temporary data generated in the image processing. Referring to FIG. 11, the following are stored in a data storage area of the main memory 32: operation data Da; camera image data Db; real world image data Dc; clipping region data Dd; enemy object data De; mask object data Df; bullet object data Dg; score data Dh; motion data Di; virtual camera data Dj; rendered image data Dk; display image data Dl; and the like. Further, in a program storage area of the main memory 32, a group of various programs Pa are stored that configure the image processing program.

The operation data Da indicates operation information of an operation of the user on the game apparatus 10. The operation data Da includes controller data Da1 and angular velocity data Da2. The controller data Da1 indicates that the user has operated a controller, such as the operation button 14 or the analog stick 15, of the game apparatus 10. The angular velocity data Da2 indicates the angular velocities detected by the angular velocity sensor 40. For example, the angular velocity data Da2 includes x-axis angular velocity data indicating an angular velocity about the x-axis, y-axis angular velocity data indicating an angular velocity about the y-axis, and z-axis angular velocity data indicating an angular velocity about the z-axis, the angular velocities detected by the angular velocity sensor 40. For example, the operation data from the operation button 14 or the analog stick 15 and the angular velocity data from the angular velocity sensor 40 are acquired per unit of time in which the game apparatus 10 performs processing (e.g., 1/60 seconds), and are stored in the controller data Da1 and the angular velocity data Da2, respectively, in accordance with the acquisition, to thereby be updated.

It should be noted that a process flow will be described later using an example where the controller data Da1 and the angular velocity data Da2 are each updated every one-frame period, which corresponds to the processing cycle. Alternatively, the controller data Da1 and the angular velocity data Da2 may be updated in another processing cycle. For example, the controller data Da1 may be updated in each cycle of detecting the operation of the user on a controller, such as an operation button 14 of an analog stick 15, and the updated controller data Da1 may be used in each processing cycle. In this case, the cycles of updating the controller data Da1 and the angular velocity data Da2 differ from the processing cycle.

The camera image data Db indicates a camera image captured by either one of the outer imaging section 23 and the inner imaging section 24. In the following descriptions of processing, in the step of acquiring a camera image, the camera image data Db is updated using a camera image captured by either one of the outer imaging section 23 and the inner imaging section 24. It should be noted that the cycle of updating the camera image data Db using the camera image captured by the outer imaging section 23 or the inner imaging section 24 may be the same as the unit of time in which the game apparatus 10 performs processing (e.g., 1/60 seconds), or may be shorter than this unit of time. When the cycle of updating the camera image data Db is shorter than the cycle of the game apparatus 10 performing processing, the camera image data Db may be updated as necessary, independently of the processing described later. In this case, in the step described later of acquiring a camera image, the process may be performed invariably using the most recent camera image indicated by the camera image data Db.

The real world image data Dc is data for generating a real world image representing a camera image captured by the real camera of the game apparatus 10 (the outer imaging section 23 or the inner imaging section 24). For example, the real world image data Dc includes: data of a planar polygon for generating the real world image; texture data of the camera image to be mapped onto the planar polygon; and data indicating the position of the planar polygon.

The clipping region data Dd indicates a region to be clipped from the camera image CI when the enemy object EO appears.

The enemy object data De is data concerning the enemy object EO, and includes texture data De1. The texture data De1 is texture data for performing mapping on a polygon corresponding to the enemy object EO, and is, for example, data indicating a still image of a region clipped from the camera image CI. Further, the enemy object data De also includes: data of the polygon (e.g., plate polygons) corresponding to the enemy object EO; data indicating the placement direction and the placement position of the polygon; data indicating the moving velocity and the moving direction of the enemy object EO; and the like.

The mask object data Df is data concerning the mask object MO. For example, the mask object data Df includes: data of a polygon (e.g., a planar polygon) corresponding to the mask object MO; texture data for performing mapping on the polygon; and data indicating the direction and the position of the polygon.

The bullet object data Dg is data concerning the bullet object BO, which is fired in accordance with an attack operation. For example, the bullet object data Dg includes: data indicating the position of the bullet object BO; and data indicating the moving velocity and the moving direction (e.g., a moving velocity vector) of the bullet object BO.

The score data Dh indicates the score of a game where the enemy object EO appears. For example, points are added to the score of the game when the enemy object EO is defeated by an attack operation, and points are deducted from the score of the game when the enemy object EO reaches the position of the user.

The motion data Di indicates the motion of the game apparatus 10 in real space. As an example, the motion of the game apparatus 10 is calculated by the angular velocities detected by the angular velocity sensor 40.

The virtual camera data Dj is data concerning the virtual camera set in the virtual space. For example, the position and the direction of the virtual camera in the virtual space change in accordance with the motion of the game apparatus 10 indicated by the motion data Di.

The rendered image data Dk includes camera-image rendered image data Dk1 and virtual-space rendered image data Dk2. The camera-image rendered image data Dk1 indicates a real world image obtained by rendering with a parallel projection a planar polygon on which a texture of a camera image is mapped. The virtual-space rendered image data Dk2 indicates a virtual world image obtained by rendering with a perspective projection the virtual space where the enemy object EO and the mask object MO are placed.

The display image data D1 indicates a display image to be displayed on the upper LCD 22. For example, the display image to be displayed on the upper LCD 22 is generated by superimposing the virtual world image on the real world image such that the virtual world image is given preference.

Next, with reference to FIG. 12, a description is given of the operation of the information processing section 31. First, when the power (the power button 14F) of the game apparatus 10 is turned on, the CPU 311 executes a boot program (not shown). This causes the programs stored in the built-in memory, the external memory 45, or the data storage external memory 46, to be loaded into the main memory 32. In accordance with the execution of the loaded programs by the information processing section 31 (the CPU 311), the steps (abbreviated as "S" in FIGS. 12 through 14) shown in FIG. 12 are performed. It should be noted that in FIGS. 12 through 14, processes not directly related to the present invention are not described.

Referring to FIG. 12, the information processing section 31 performs the initialization of the image processing (step 51), and proceeds to the subsequent step. For example, the information processing section 31 sets the initial position and the initial direction of the virtual camera for generating a virtual world image, and sets the coordinate axes (e.g., X, Y, and Z axes) of the virtual space where the virtual camera is placed.

Next, the information processing section 31 acquires a camera image from the real camera of the game apparatus 10 (step 52), and proceeds to the subsequent step. For example, the information processing section 31 updates the camera image data Db using a camera image captured by the currently selected imaging section (the outer imaging section 23 or the inner imaging section 24).

Figure 15:
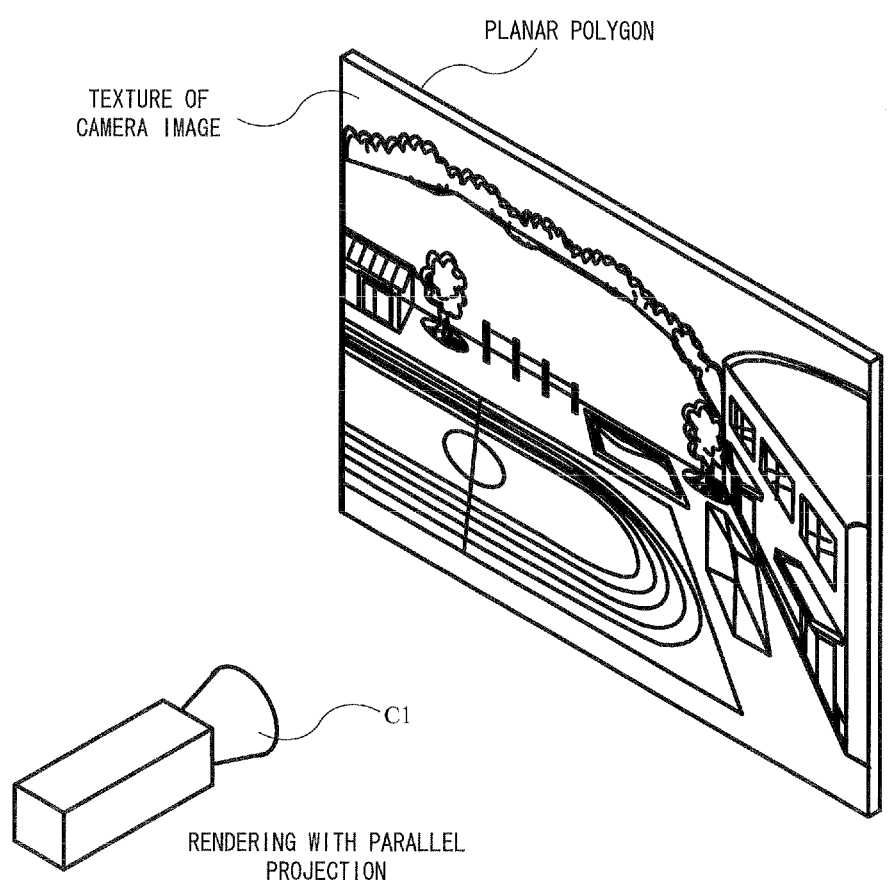
FIG. 15 is a diagram illustrating an example of a process of rendering a camera image.
Figure 16:
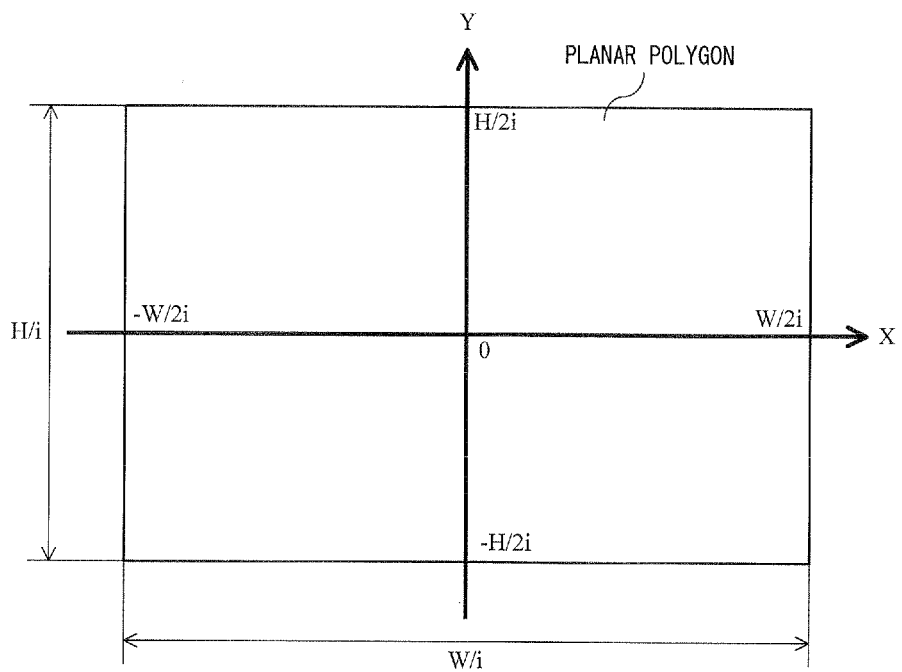
FIG. 16 is a diagram illustrating an example of a coordinate system used to render the camera image.

Next, the information processing section 31 performs a process of rendering the camera image acquired in step 52 described above (step 53), and proceeds to the subsequent step. For example, the information processing section 31 updates the real world image data Dc using the camera image acquired in step 52 described above, and updates the camera-image rendered image data Dk1 using a rendered image. With reference to FIGS. 15 and 16, a description is given below of an example of the process of rendering the camera image.

In the present embodiment, as shown in FIG. 15, a camera image obtained from the real camera of the game apparatus 10 is set as a texture, and a planar polygon is generated, on which the texture is mapped. Then, an image obtained by rendering the planar polygon with a parallel projection from a virtual camera C1 is set as a real world image. Here, a description is given of an example of the method of generating a real world image in the case where the virtual camera C1 is placed at the center of the display screen of the upper LCD 22, and the entire camera image obtained from the real camera of the game apparatus 10 is displayed on the entire display screen of the upper LCD 22.

First, a planar polygon is considered, on which a texture having i pixels is mapped in 1 unit of a coordinate system of the virtual space where the planar polygon is placed. In this case, a texture having i pixels×i pixels is mapped onto an area of 1 unit×1 unit of the coordinate system. The display screen of the upper LCD 22 has horizontal W dots×vertical H dots. To place the planar polygon such that the entire texture of the camera image corresponds to the entire display screen having W dots×H dots, and 1 pixel in the texture corresponds to 1 dot on the display screen, the coordinate system may be defined as shown in FIG. 16. That is, an XY coordinate system of the virtual space where the planar polygon is placed is set such that the width of the planar polygon, on the entire main surface of which the texture of the camera image is mapped, corresponds to W/i units of the coordinate system, and the height of the planar polygon corresponds to H/i units of the coordinate system. The planar polygon is placed such that when the center of the main surface of the planar polygon, on which the texture is mapped, coincides with the origin of the XY coordinate system of the virtual space, the horizontal direction of the planar polygon corresponds to the X-axis direction (the right direction is the X-axis positive direction), and the vertical direction of the planar polygon corresponds to the Y-axis direction (the up direction is the Y-axis positive direction). In this case, in the main surface of the planar polygon, on which the texture is mapped: the top right corner position is placed at (X, Y)=(W/2i, H/2i); the bottom right corner position is placed at (X, Y)=(W/2i, −H/2i); the top left corner position is placed at (X, Y)=(−W/2i, H/2i); and the bottom left corner position is placed at (X, Y)=(−W/2i, −H/2i). As described above, the planar polygon placed in the coordinate system of the virtual space is rendered with a parallel projection such that 1 pixel on the camera image (texture) corresponds to 1 dot on the display screen. Thus, a real world image is generated that corresponds to the camera image obtained from the real camera of the game apparatus 10.

Referring back to FIG. 12, the information processing section 31 acquires operation data (step 54), and proceeds to the subsequent step. For example, the information processing section 31 acquires data indicating that the operation button 14 or the analog stick 15 has been operated, to thereby update the controller data Da1. Further, the information processing section 31 acquires angular velocity data indicating the angular velocities detected by the angular velocity sensor 40, to thereby update the angular velocity data Da2.

Next, the information processing section 31 performs a process related to the enemy object (step 55), and proceeds to the subsequent step. With reference to FIG. 13, an enemy object process is described below.

Referring to FIG. 13, the information processing section 31 determines whether or not the conditions for the appearance of the enemy object EO have been satisfied (step 72). For example, the conditions for the appearance of the enemy object EO may be: that the enemy object EO appears at predetermined time intervals; that in accordance with the disappearance of the enemy object EO from the virtual world, a new enemy object EO appears; that when a predetermined physical body has been recognized in the camera image, the enemy object EO appears; or that the enemy object EO appears at a random time. When the conditions for the appearance of the enemy object EO have been satisfied, the information processing section 31 proceeds to the subsequent step 73. On the other hand, when the conditions for the appearance of the enemy object EO have not been satisfied, the information processing section 31 proceeds to the subsequent step 77.

In step 73, the information processing section 31 determines a clipping region in the camera image acquired in step 52 described above, and proceeds to the subsequent step. For example, the information processing section 31 sets a given region (e.g., a rectangular region) in the camera image stored in the camera image data Db, as a clipping region, to thereby update the clipping region data Dd using data indicating a camera image included in the clipping region.

It should be noted that when the clipping region is determined in step 73 described above, the clipping region may be set along a boundary extracted from the camera image acquired in step 52 described above. For example, image analysis is performed on the camera image, and a boundary between colors, a boundary across which the difference in density is equal to or greater than a threshold, or the like is extracted from the image. Thus, the clipping region is set using at least a part of the extracted boundary.

Next, the information processing section 31 sets the camera image included in the clipping region determined in step 73 described above, as a texture of the enemy object EO (step 74), and proceeds to the subsequent step. For example, the information processing section 31 sets the camera image included in the clipping region indicated by the clipping region data Dd, as a texture of the enemy object EO, to thereby update the texture data De1 using the set texture.

Next, the information processing section 31 sets the enemy object EO and the mask object MO that correspond to the clipping region determined in step 73 described above (step 75), and proceeds to the subsequent step. For example, in accordance with the clipping region indicated by the clipping region data Dd, the information processing section 31 sets the size and the shape of plate polygons corresponding to the enemy object EO, to thereby update the enemy object data De using the set parameters. Further, in accordance with the clipping region indicated by the clipping region data Dd, the information processing section 31 sets the size and the shape of a planar polygon corresponding to the mask object MO, and sets a color with which the planar polygon is to be filled in, either as a predetermined color (e.g., black) or the color of the periphery adjacent to the clipping region in the camera image acquired in step 52 described above, to thereby update the mask object data Df using the set parameters.

It should be noted that the polygon corresponding to the enemy object EO may be three-dimensional polygons having a shape other than that of the plate polygons. For example, the polygon corresponding to the enemy object EO may be plate polygons having a predetermined thickness, or may be polygons having a predetermined shape (e.g., polygons having the shape of a weapon such as a missile). Alternatively, the polygon corresponding to the enemy object EO may be polygons having a curved surface, such as a sphere.

Figure 17:
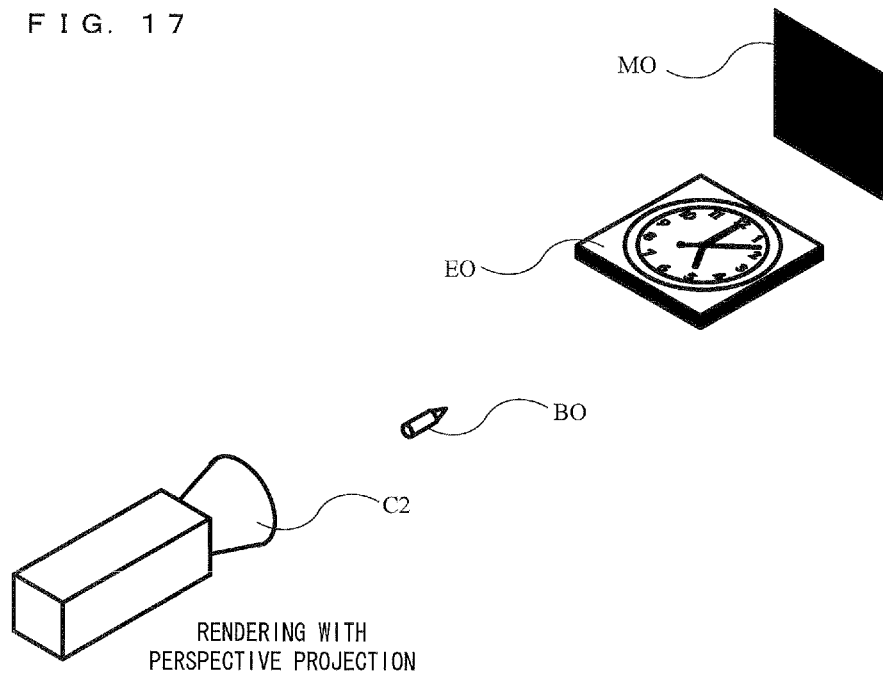
FIG. 17 is a diagram illustrating an example of a process of rendering the enemy object EO, a mask object MO, and a bullet object BO.
Figure 18:
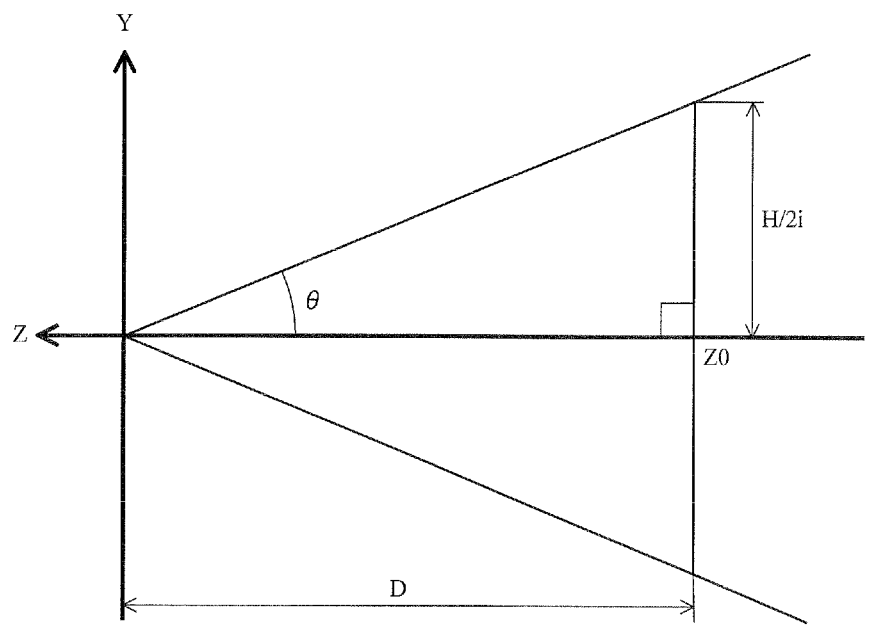
FIG. 18 is a diagram showing an example of a coordinate system used to render the enemy object EO, the mask object MO, and the bullet object BO.

Next, the information processing section 31 newly places the enemy object EO and the mask object MO in the virtual space (step 76), and proceeds to the subsequent step 77. For example, the information processing section 31 places the enemy object EO and the mask object MO at the position on which a perspective projection is performed such that the enemy object EO and the mask object MO overlap the clipping region in the planar polygon, on the entire main surface of which the texture of the camera image is mapped (see FIG. 16), to thereby update the enemy object data De and the mask object data Df using the placement positions. With reference to FIGS. 17 and 18, a description is given below of an example where the enemy object EO and the mask object MO are placed in the virtual space.

In the present embodiment, as shown in FIG. 17, an image obtained by rendering the enemy object EO and the mask object MO with a perspective projection from a virtual camera C2 is generated as a virtual world image. Here, to make representation such that the enemy object EO slides out of the camera image displayed on the upper LCD 22 and to apply the mask object MO to the footprint after the enemy object EO sliding out, it is necessary to perform a perspective projection such that the enemy object EO and the mask object MO overlap the clipping region in the planar polygon, on the entire main surface of which the texture of the camera image is mapped (see FIG. 16).

The case is considered where the enemy object EO and the mask object MO are subjected to a perspective projection in the direction of (X, Y, Z)=(0, 0, −1) from the origin. In this case, if an object is placed at the position of Z=Z0 shown in FIG. 18, the size of the object in the display screen per pixel in the texture corresponds to 1 dot on the display screen. Here, the position of Z=Z0 is the position where, when the angle of view in the Y-axis direction of the virtual camera C2 that performs a perspective projection on the enemy object EO and the mask object MO is θ, the length between the fixation point of the virtual camera C2 and the display range in the Y-axis positive direction is H/2i. It should be noted that as described above, "H" is the number of vertical dots on the display screen of the upper LCD 22, and "i" is the number of pixels in the texture to be mapped onto 1 unit of the coordinate system of the virtual space. Then, if the distance between the center of the virtual camera C2 and the position of the Z=Z0 is D (D>0), the following formula is obtained.

$$\tan \theta = (H/2i)/D = H/2Di$$

Thus, when a virtual world image is generated by performing a perspective projection on the enemy object EO and the mask object MO, the settings of the virtual camera C2 for generating the virtual world image are as follows:

The angle of view θ in the Y-axis direction=$\tan^{-1}(H/2Di)$

The aspect ratio=$W:H$

Then, when planar polygons each having a size of w×h that represent the mask object MO and the enemy object EO at the time of sliding out of the camera image displayed on the upper LCD 22, are placed at the view coordinates from the virtual camera C2 (X0, Y0, Z0), the planar polygons each having a size of w×h are displayed so as to be placed at the position (X0, Y0) on the coordinate system shown in FIG. 16. It should be noted that if the placement of the mask object MO and the enemy object EO at the same position in the perspective direction makes the display of the objects unstable, the perspective position of the enemy object EO may be set closer (to the virtual camera C2) than the perspective position of the mask object MO.

Referring back to FIG. 13, in step 77, the information processing section 31 moves the enemy object EO placed in the virtual space, and proceeds to the subsequent step. As an example, the information processing section 31 updates the position of the enemy object EO indicated by the enemy object data De by bringing the position closer to the virtual camera C2 by a predetermined distance, to thereby update the enemy object data De using the updated position of the enemy object EQ. As another example, based on a moving direction and a moving velocity that have been defined for the enemy object EO, the information processing section 31 updates the position of the enemy object EO indicated by the enemy object data De, to thereby update the enemy object data De using the updated position of the enemy object EO. Further, the information processing section 31 updates the placement direction of the enemy object EO indicated by the enemy object data De by a predetermined angle in a predetermined direction, to thereby update the enemy object data De using the updated placement angle of the enemy object EQ.

Next, the information processing section 31 determines whether or not the enemy object EO has reached the position of the virtual camera (step 78). For example, the information processing section 31 determines, using the position of the enemy object EO indicated by the enemy object data De, whether or not the position of the enemy object EO has reached the position of the virtual camera C2, which performs a perspective projection on the enemy object EO. When the enemy object EO has reached the position of the virtual camera, the information processing section 31 proceeds to the subsequent step 79. On the other hand, when the enemy object EO has not reached the position of the virtual camera, the information processing section 31 ends the process of this subroutine.

In step 79, the information processing section 31 performs a point deduction process, and ends the process of the subroutine. For example, in the point deduction process, the information processing section 31 deducts predetermined points from the score of the game indicated by the score data Dh, to thereby update the score data Dh using the score after the deduction. Further, in the point deduction process, the information processing section 31 performs a process of causing the enemy object EO having reached the position of the virtual camera, to disappear from the virtual space (e.g., initializing the enemy object data De concerning the enemy object EO having reached the position of the virtual camera, such that the enemy object EO is not present in the virtual space). It should be noted that in the point deduction process, the mask object MO applied to the position from which the enemy object EO having reached the position of the virtual camera had appeared, may remain placed in the virtual space, or may be caused to disappear simultaneously when the enemy object EO is caused to disappear. Alternatively, after display has been performed such that the enemy object EO moves back to the position of the mask object MO, the mask object MO may be caused to disappear.

Figure 14:
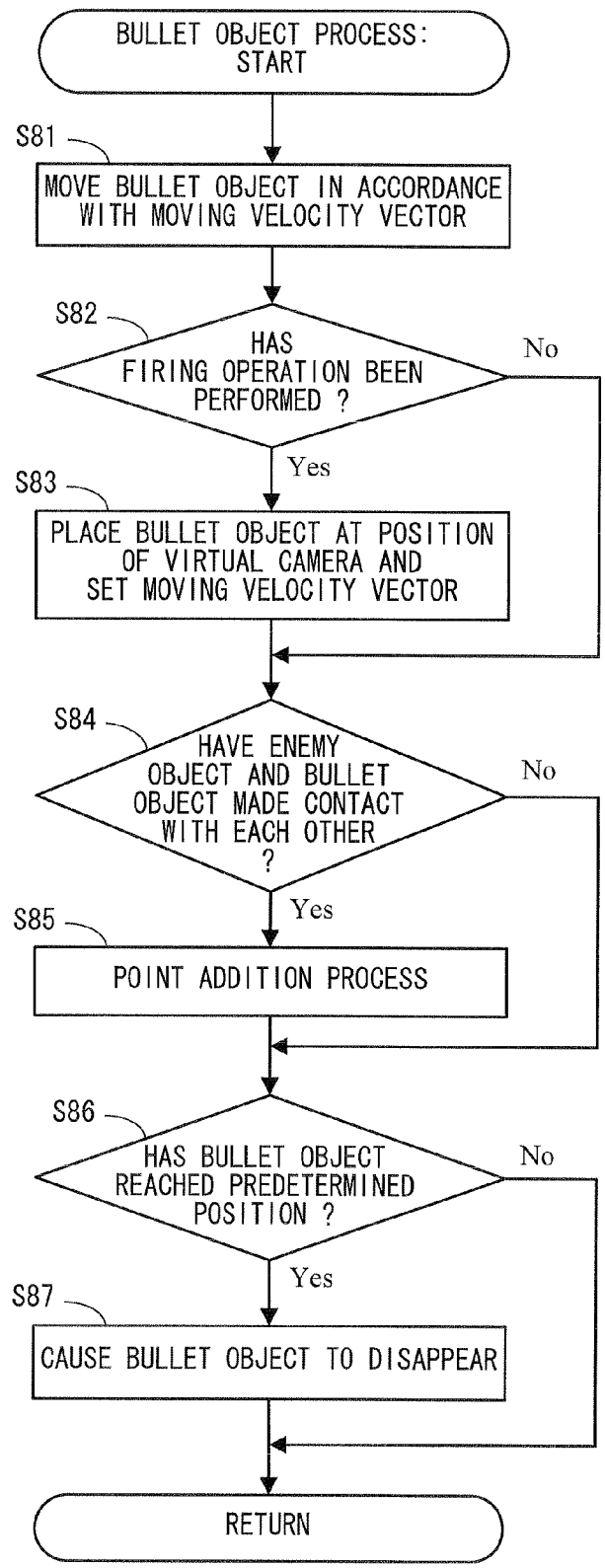
FIG. 14 is a subroutine flow chart showing an example of a detailed operation of a bullet object process performed in step 56 of FIG. 12.

Referring back to FIG. 12, after the process related to the enemy object in step 55 described above, the information processing section 31 performs a process related to the bullet object (step 56), and proceeds to the subsequent step. With reference to FIG. 14, a bullet object process is described below.

Referring to FIG. 14, the information processing section 31 moves the bullet object BO in the virtual space in accordance with a moving velocity vector that is set (step 81), and proceeds to the subsequent step. For example, in accordance with the position and the moving velocity vector of the bullet object BO that are set in the bullet object data Dg, the information processing section 31 moves the position of the bullet object BO in the virtual space at the velocity indicated by the moving velocity vector and in the direction indicated by the moving velocity vector. Then, the information processing section 31 updates the bullet object data Dg using the moved position of the bullet object BO.

Next, the information processing section 31 determines whether or not the user of the game apparatus 10 has performed a firing operation (step 82). For example, with reference to the controller data Da1, the information processing section 31 determines whether or not the user has performed a predetermined firing operation (e.g., pressing the button 14B (A button)). When the firing operation has been performed, the information processing section 31 proceeds to the subsequent step 83. On the other hand, when the firing operation has not been performed, the information processing section 31 proceeds to the subsequent step 84.

In step 83, in accordance with the firing operation, the information processing section 31 places the bullet object BO at the position of the virtual camera in the virtual space, sets the moving velocity vector of the bullet object BO, and proceeds to the subsequent step 84. For example, the information processing section 31 newly places the bullet object BO at the position of the virtual camera that performs a perspective projection on the enemy object EO and the mask object MO, to thereby update the bullet object data Dg using the position of the placed bullet object BO. Further, the information processing section 31 sets a vector of a predetermined size in the direction from the position of the virtual camera to the fixation point of the virtual camera, to thereby update the bullet object data Dg such that the set vector is the moving velocity vector of the newly placed bullet object BO.

In step 84, the information processing section 31 determines whether or not the enemy object EO and the bullet object BO have made contact with each other in the virtual space. For example, using the position of the enemy object EO indicated by the enemy object data De and the position of the bullet object BO indicated by the bullet object data Dg, the information processing section 31 determines whether or not the enemy object BO and the bullet object BO have made contact with each other in the virtual space. When the enemy object EO and the bullet object BO have made contact with each other, the information processing section 31 proceeds to the subsequent step 85. On the other hand, when the enemy object EO and the bullet object BO have not made contact with each other, the information processing section 31 proceeds to the subsequent step 86.

In step 85, the information processing section 31 performs a point addition process, and proceeds to the subsequent step 86. For example, in the point addition process, the information processing section 31 adds predetermined points to the score of the game indicated by the score data Dh, to thereby update the score data Dh using the score after the addition. Further, in the point addition process, the information processing section 31 performs a process of causing both objects having made contact with each other based on the determination in step 84 described above (i.e., the enemy object EO and the bullet object BO), to disappear from the virtual space (e.g., initializing the enemy object data De concerning the enemy object EO having made contact with the bullet object BO and the bullet object data Dg concerning the bullet object BO having made contact with the enemy object EO, such that the enemy object EO and the bullet object BO are not present in the virtual space). It should be noted that in the point addition process, the mask object MO applied to the position from which the enemy object EO having made contact with the bullet object BO had appeared, may remain placed in the virtual space, or may be caused to disappear simultaneously when the enemy object EO is caused to disappear.

In step 86, the information processing section 31 determines whether or not the bullet object BO has reached a predetermined position in the virtual space. For example, the information processing section 31 determines whether or not the position of the bullet object BO indicated by the bullet object data Dg has reached the position of Z=Z0 described above, as viewed from the virtual camera. When the bullet object BO has reached the predetermined position, the information processing section 31 proceeds to the subsequent step 87. On the other hand, when the bullet object BO has not reached the predetermined position, the information processing section 31 ends the process of this subroutine.

In step 87, the information processing section 31 performs a process of causing the bullet object BO having reached the predetermined position based on the determination in step 86 described above, to disappear from the virtual space, and ends the process of the subroutine. For example, the information processing section 31 performs a process of causing the bullet object BO having reached the predetermined position based on the determination in step 86 described above, to disappear from the virtual space (e.g., initializing the bullet object data Dg concerning the bullet object BO such that the bullet object BO is not present in the virtual space).

Referring back to FIG. 12, after the process related to the bullet object in step 56 described above, the information processing section 31 calculates the motion of the game apparatus 10 (step 57), and proceeds to the subsequent step. As an example, the information processing section 31 calculates the motion of the game apparatus 10 (e.g., a change in the imaging direction of the real camera provided in the game apparatus 10) using the angular velocities indicated by the angular velocity data Da2, to thereby update the motion data Di using the calculated motion. Specifically, when the user has changed in real space the imaging direction of the real camera provided in the game apparatus 10, the orientation of the entire game apparatus 10 also changes, and therefore, angular velocities corresponding to the change are generated in the game apparatus 10. Then, the angular velocity sensor 40 detects the angular velocities generated in the game apparatus 10, whereby data indicating the angular velocities is stored in the angular velocity data Da2. Thus, using the angular velocities indicated by the angular velocity data Da2, the information processing section 31 can calculate the direction and the amount (angle) that have changed in the imaging direction of the real camera provided in the game apparatus 10, as the motion of the game apparatus 10.

Next, in accordance with the motion of the game apparatus 10, the information processing section 31 changes the position and the direction of the virtual camera in the virtual space (step 58), and proceeds to the subsequent step. For example, the information processing section 31 imparts the same changes as those in the imaging direction of the real camera of the game apparatus 10 in real space, to the virtual camera in the virtual space, to thereby update the virtual camera data Dj using the position and the direction of the virtual camera after the changes. As an example, if the imaging direction of the real camera of the game apparatus 10 in real space has turned left by A° (a change where the game apparatus 10 has moved such that the x-axis and the z-axis rotate to the left by A° about the y-axis, as viewed in the y-axis negative direction), the direction of the virtual camera in the virtual space also turns left by A° (a change in the direction of the virtual camera such that in the view coordinates from the virtual camera, the X-axis and the Z-axis rotate to the left by A° about the Y-axis, as viewed in the Y-axis negative direction). With this, the enemy object EO and the mask image MI displayed as if placed in real space are displayed as if placed at the same positions in real space even when the direction and the position of the game apparatus 10 have changed in real space (see FIGS. 9 and 10).

Next, the information processing section 31 performs a process of rendering the virtual space (step 59), and proceeds to the subsequent step. For example, the information processing section 31 updates the virtual-space rendered image data Dk2 using an image obtained by rendering the virtual space where the enemy object EO, the mask object MO, and the bullet object BO are placed. For example, as shown in FIG. 17, in the virtual space, the enemy object EO, the mask object MO, and the bullet object BO are placed in accordance with the positions and the directions indicated by the enemy object data De, the mask object data Df, and the bullet object data Dg, respectively. Further, in the virtual space, the virtual camera C2 for rendering the virtual space is placed in accordance with the position and the direction indicated by the virtual camera data Dj. Here, as described above, the enemy object EO is plate polygons on which a part of the camera image obtained from the real camera of the game apparatus 10 (the texture set in step 74) is mapped as a texture. The mask object MO is a planar polygon placed so as to be applied to the footprint after the enemy object EO sliding out of the camera image displayed in the upper LCD 22. Then, a virtual world image is generated by rendering with a perspective projection from the virtual camera C2 the enemy object HO, the mask object MO, and the bullet object BO that are placed in the virtual space, to thereby update the virtual-space rendered image data Dk2.

Next, the information processing section 31 generates a display image obtained by combining the real world image with the virtual world image, displays the display image on the upper LCD 22 (step 60), and proceeds to the subsequent step. For example, the information processing section 31 acquires the real world image indicated by the camera-image rendered image data Dk1 and the virtual world image indicated by the virtual-space rendered image data Dk2, and generates a display image by superimposing the virtual world image on the real world image such that the virtual world image is given preference, to thereby update the display image data D1 using the display image. Further, the CPU 311 of the information processing section 31 stores the display image indicated by the display image data D1 in the VRAM 313. Then, the GPU 312 of the information processing section 31 outputs the display image drawn in the VRAM 313 to the upper LCD 22, whereby the display image is displayed on the upper LCD 22. It should be noted that when a virtual world image is not stored in the virtual-space rendered image data Dk2, the information processing section 31 may use the real world image indicated by the camera-image rendered image data Dk1 as it is as the display image.

Next, the information processing section 31 determines whether or not the game is to be ended (step 61). Conditions for ending the game may be, for example: that particular conditions have been satisfied so that the game is over; or that the user has performed an operation for ending the game. When the game is not to be ended, the information processing section 31 proceeds to step 52 described above, and repeats the same process. On the other hand, when the game is to be ended, the information processing section 31 ends the process of the flow chart.

As described above, based on the image processing according to the above embodiment, display is performed such that on a real world image obtained from a real camera, a virtual world image showing an object represented as if sliding out of the real world image is superimposed. This makes it possible to display a new image as if the object is present in real space.

Second Embodiment

Next, a description is given of an image processing apparatus that executes an image processing program according to a second embodiment of the present invention.

In the first embodiment described above, a given region is clipped from a camera image obtained from the real camera of the game apparatus 10, and the enemy object EO that has slid out of the region moves. In the second embodiment, a predetermined physical body recognized in the camera image is clipped so as to serve as the enemy object EO. It should be noted that the hardware configuration of the image processing apparatus that executes the image processing program according to the second embodiment is similar to that used in the first embodiment, and therefore, the same components as those of the first embodiment are designated by the same numerals and are not described in detail.

Figure 19A:
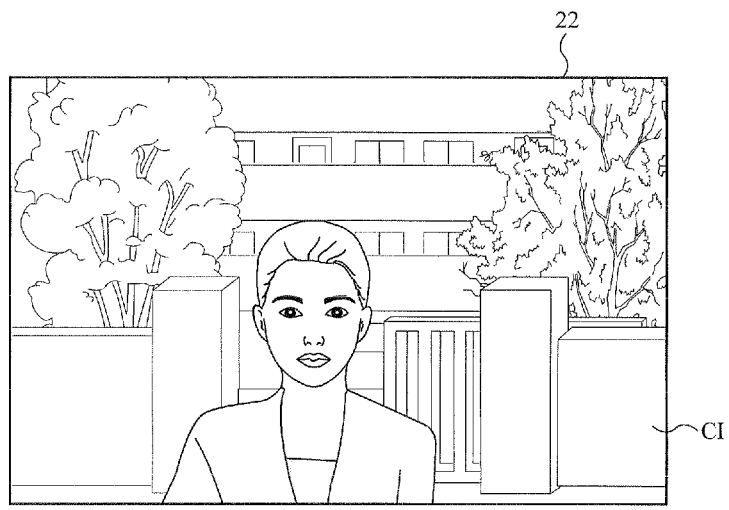
FIG. 19A is a diagram showing another example of the camera image CI displayed on the upper LCD 22 of FIG. 1.
Figure 19B:
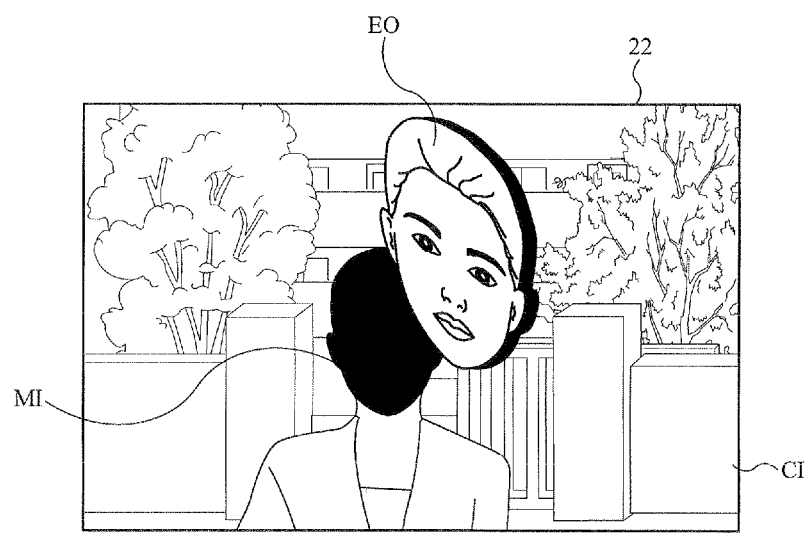
FIG. 19B is a diagram showing another example where display is performed such that the enemy object EO appears from the camera image CI displayed on the upper LCD 22 of FIG. 1.

Next, before a description is given of specific processing operations performed by the image processing program according to the present embodiment executed by the game apparatus 10, a description is given, with reference to FIGS. 19A and 19B, of examples of the forms of display performed on the upper LCD 22 by image processing operations. It should be noted that FIG. 19A is a diagram showing an example of a camera image CI displayed on the upper LCD 22. FIG. 19B is a diagram showing an example where display is performed such that an enemy object EO appears from the camera image CI displayed on the upper LCD 22. It should be noted that for ease of description, an example is where a planar image (a planar view image, as opposed to the stereoscopically visible image described above) of the real world based on a camera image CI acquired from either one of the outer imaging section 23 and the inner imaging section 24 is displayed on the upper LCD 22.

In FIG. 19A, on the upper LCD 22, a camera image CI is displayed, which is a real world image captured by a real camera built into the game apparatus 10 (e.g., the outer imaging section 23). For example, a real-time real world image (moving image) captured by the real camera built into the game apparatus 10 is displayed on the upper LCD 22.

The game apparatus 10 sequentially performs a predetermined face recognition process on the camera image CI captured by the real camera, and determines the presence or absence of a person's face in the camera image CI. When having determined in the face recognition process that a person's face is present in the camera image CI, the game apparatus 10 clips the portion recognized as a face from the camera image CI on the determination that conditions for the appearance of an enemy object EO have been satisfied.

As shown in FIG. 19B, the enemy object EO moves as a board-like physical body, to the main surface of which an image of the portion recognized as a face clipped from the camera image CI is applied. For example, the enemy object EO is displayed on the upper LCD 22 as if moving in real space, as a plate physical body of a person's face that has been clipped from and slid out of the camera image CI, toward the real camera that is capturing the camera image CI, i.e., the user who is operating the game apparatus 10. That is, an image is displayed on the upper LCD 22, as if a person's face in an image of the real world captured by the user themselves comes as the enemy object EO toward the capturer, i.e., the user. For example, plate polygons on which the image of the face recognized in the camera image CI is mapped as a texture (the enemy object EO) are placed in a virtual space, and an image of the virtual space, in which the enemy object EO is viewed from the virtual camera (a virtual world image), is combined with a real world image obtained from the camera image CI. Thus, the enemy object EO is displayed on the upper LCD 22 as if placed in real space. Then, in accordance with an attack operation using the game apparatus 10 (e.g., pressing the button 14B (A button)), a bullet object BO is fired in a predetermined direction (e.g., the direction of the line of sight of the real camera that is capturing the camera image CI, and the direction of the line of sight of the virtual camera), and the enemy object EO serves as a target of attack for the user.

Further, in the camera image CI, a predetermined mask image MI is displayed in the footprint after the enemy object EO sliding out. As a first example, the mask image MI is set as an image that covers the region of the person's face, of which the enemy object EO has slid out, by filling in the region with a predetermined color. As a second example, the mask image MI is set as an image that covers the region of the person's face, of which the enemy object EO has slid out, by filling in the region with any of the colors displayed in the periphery adjacent to the region. As a third example, the mask image MI is set as a predetermined image (e.g., an image representing a human skull), and the region of the person's face, of which the enemy object EO has slid out, is replaced with the image. For example, a planar polygon (a mask object MO), representing an image filled in with the predetermined color or the peripheral color or representing the predetermined image, is placed at the position in the virtual space corresponding to the position of the clipping region, and an image of the virtual space, in which the mask object MO is viewed from the virtual camera (a virtual world image), is combined with the real world image obtained from the camera image CI. Thus, displayed is performed on the upper LCD 22 such that the mask image MI is placed so as to cover the region of the person's face.

Here, in the first embodiment described above, the same still image is used for the set texture of the enemy object EO until the enemy object EO disappears. In contrast, in the second embodiment, when the expression and the like of the person's face captured in the camera image CI have changed, the changes are reflected on the texture of the enemy object EQ. That is, it is possible to reflect in real time the expression of the person captured by the real camera of the game apparatus 10, on the expression of the face image applied to the enemy object EQ. Also in the second embodiment, however, the face image (still image) at the time of the appearance of the enemy object EO may be used continuously (e.g., until the enemy object EO disappears). In this case, a texture image set in step 112 or step 123 described later is stored, and is used continuously in step 59. It should be noted that the continuous use of the texture image set in step 112 eliminates the need for the process of step 102. Further, the continuous use of the texture image set in step 123 eliminates the need for the process of step 102 or step 112. Furthermore, changes in the direction and the position of the game apparatus 10 in real space also change the imaging range captured by the game apparatus 10, and therefore also change the camera image CI displayed on the upper LCD 22. In this case, the game apparatus 10 changes the position and the direction of the virtual camera in the virtual space in accordance with the motion of the game apparatus 10 in real space. With this, the enemy object EO and the mask image MI displayed as if placed in real space are displayed as if placed at the same positions in real space when the direction and the position of the game apparatus 10 have changed in real space.

It should be noted that as in the first embodiment, an example is where the mask image MI is displayed so as to cover the clipping region, by combining the virtual world image in which the mask object MO is placed, with the real world image. Alternatively, the mask image MI may be displayed so as to cover the clipping region, by another method. For example, the mask image MI may be displayed by filling in the clipping region in the real world image obtained from the camera image CI, with a predetermined color or a peripheral color, or by replacing the clipping region with a predetermined image. As described above, the real world image is generated by, as an example, generating a planar polygon on which the camera image is mapped as a texture, and rendering the planar polygon with a parallel projection from the virtual camera. In this case, it is possible to generate the real world image in which the clipping region is replaced with the mask image MI, by filling in the clipping region in the camera image with a predetermined color or a peripheral color or replacing the camera image with a predetermined image to thereby set the texture, or by mapping the texture and subsequently applying an image obtained by filling in the clipping region with a predetermined color or a peripheral color or applying a predetermined image.

Figure 20:
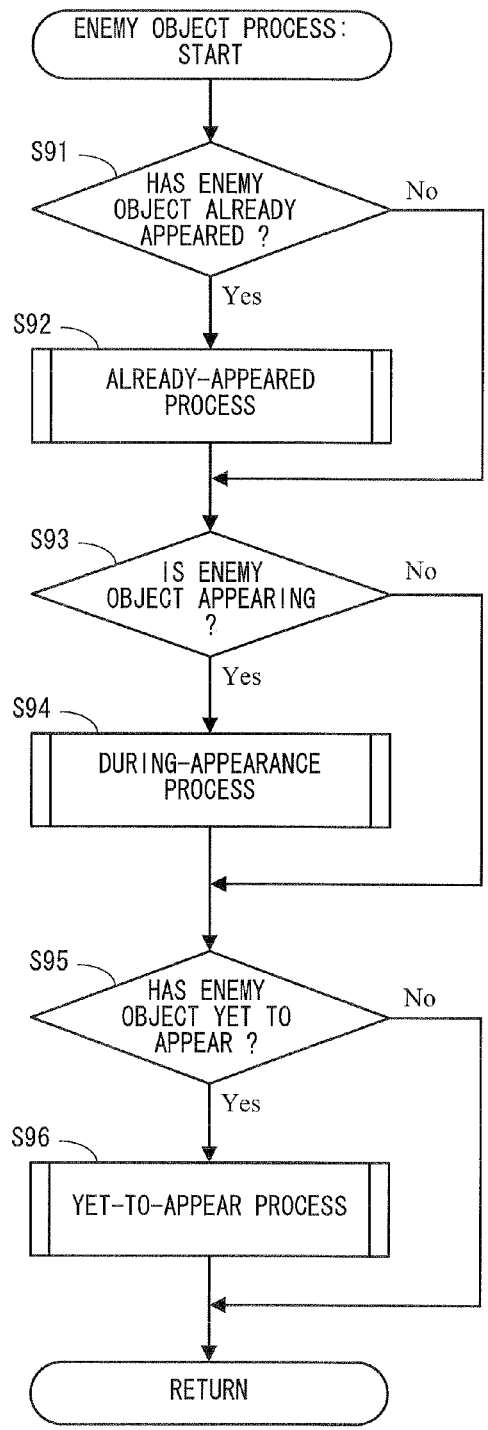
FIG. 20 is a subroutine flow chart showing another example of the detailed operation of the enemy object process performed by executing the image processing program to be executed by the game apparatus 10 of FIG. 1.
Figure 21:
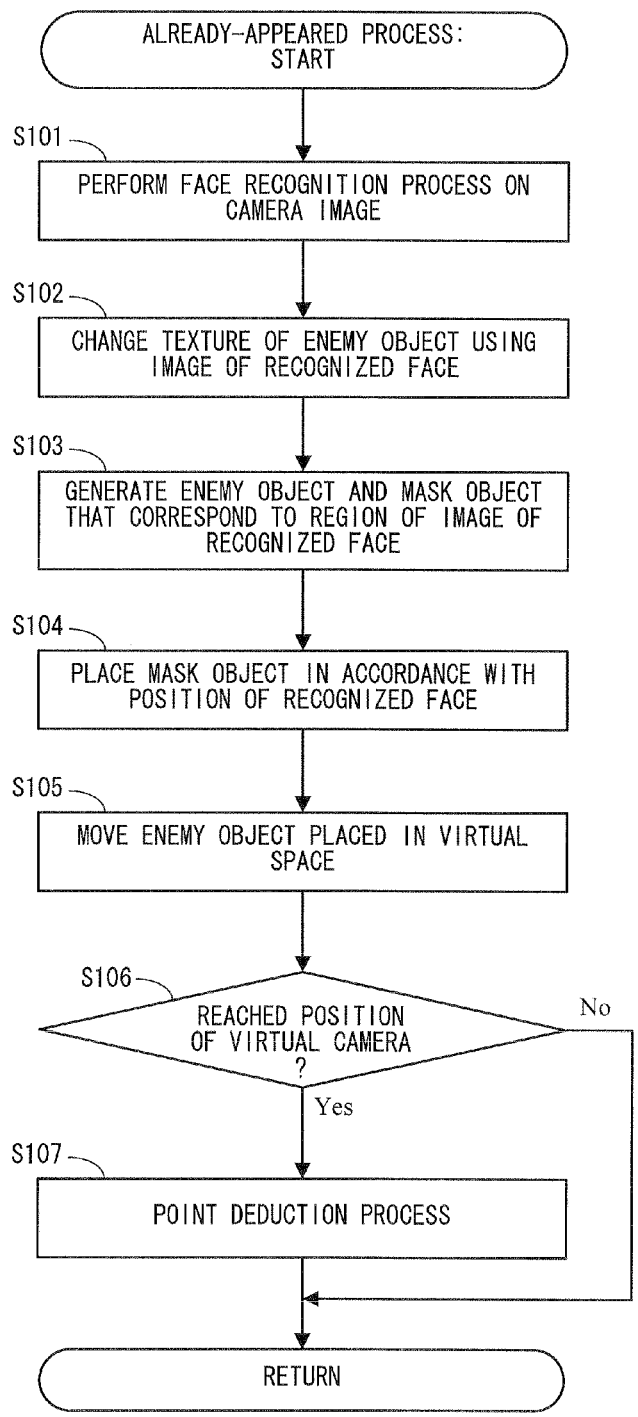
FIG. 21 is a subroutine flow chart showing an example of a detailed operation of an already-appeared process performed in step 92 of FIG. 20.
Figure 22:
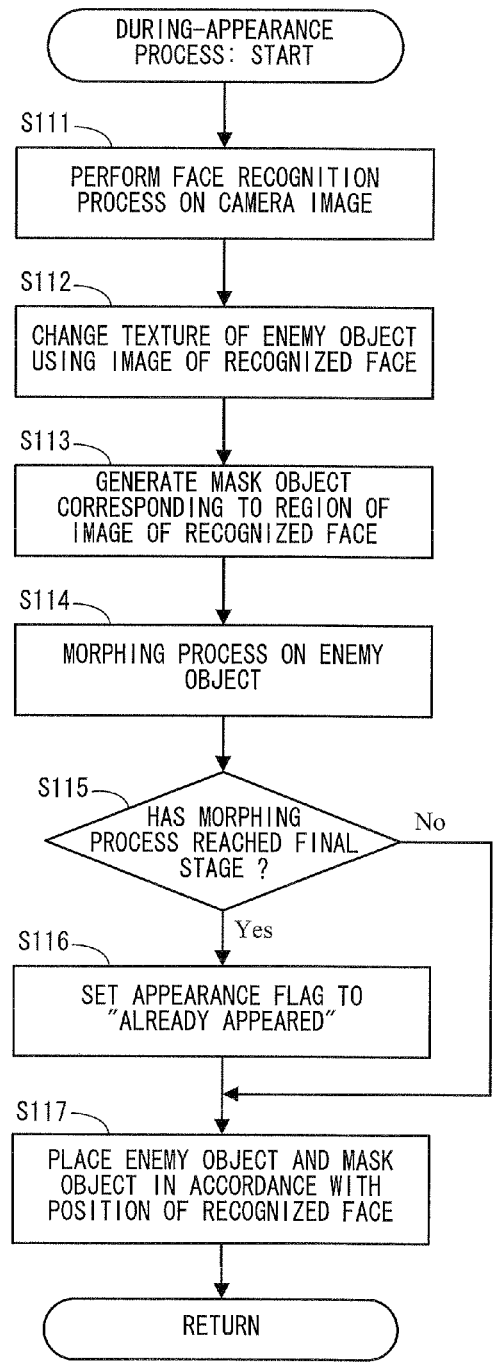
FIG. 22 is a subroutine flow chart showing an example of a detailed operation of a during-appearance process performed in step 94 of FIG. 20.
Figure 23:
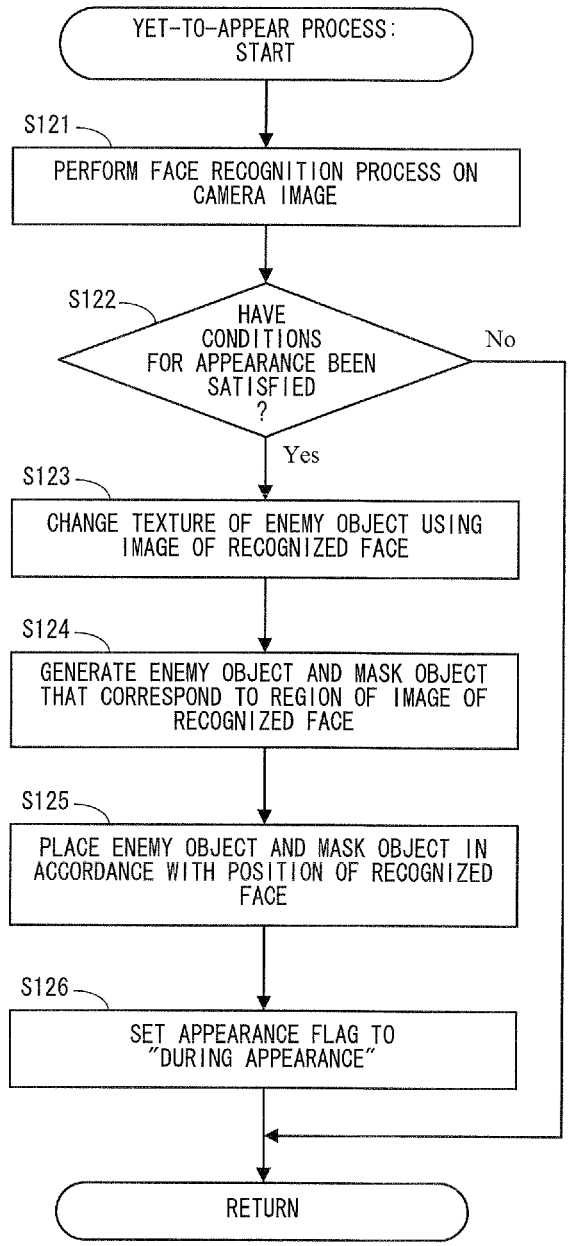
FIG. 23 is a subroutine flow chart showing an example of a detailed operation of a yet-to-appear process performed in step 96 of FIG. 20.

Next, with reference to FIGS. 20 through 23, a description is given of the specific processing operations performed by executing the image processing program according to the second embodiment. It should be noted that FIG. 20 is a subroutine flow chart showing an example of a detailed operation of an enemy object process performed by executing the image processing program (step 55 of FIG. 12). FIG. 21 is a subroutine flow chart showing an example of a detailed operation of an already-appeared process performed in step 92 of FIG. 20. FIG. 22 is a subroutine flow chart showing an example of a detailed operation of a during-appearance process performed in step 94 of FIG. 20. FIG. 23 is a subroutine flow chart showing an example of a detailed operation of a yet-to-appear process performed in step 96 of FIG. 20. It should be noted that programs for performing these processes are included in a memory built into the game apparatus 10 (e.g., the data storage internal memory 35), or included in the external memory 45 or the data storage external memory 46, and the programs are: loaded from the built-in memory, or loaded from the external memory 45 through the external memory I/F 33 or from the data storage external memory 46 through the data storage external memory I/F 34, into the main memory 32 when the game apparatus 10 is turned on; and executed by the CPU 311. It should be noted that the processing operations performed by executing the image processing program according to the second embodiment are only different in the enemy object process (in step 55 of FIG. 12) from the processing operations performed by executing the image processing program according to the first embodiment. Accordingly, in the following descriptions, only processing operations different from those of the first embodiment are described, and the other processing operations are not described in detail. Further, various data stored in the main memory 32 in accordance with the execution of the image processing program according to the second embodiment is similar to the various data stored in accordance with the execution of the image processing program according to the first embodiment, except that appearance flag data is further stored. It should be noted that the appearance flag data indicates an appearance flag indicating whether the current state of the appearance of the enemy object EO is "yet to appear", "during appearance", or "already appeared", and the appearance flag is set to "yet to appear" in the initialization in step 51 described above.

Referring to FIG. 20, the information processing section 31 determines whether or not the enemy object EO has already appeared (step 91). For example, with reference to the appearance flag data, the information processing section 31 makes a determination in step 91 described above, based on whether or not the appearance flag is set to "already appeared". When the enemy object EO has already appeared, the information processing section 31 proceeds to the subsequent step 92. On the other hand, when the enemy object EO has not already appeared, the information processing section 31 proceeds to the subsequent step 93.

In step 92, the information processing section 31 performs an already-appeared process, and proceeds to the subsequent step 93. With reference to FIG. 21, a description is given below of the already-appeared process performed by the information processing section 31 in step 92 described above.

Referring to FIG. 21, the information processing section 31 performs a predetermined face recognition process on a camera image indicated by the camera image data Db, stores the face recognition result in the main memory 32 (step 101), and proceeds to the subsequent step. Here, the face recognition process may be performed sequentially by the information processing section 31, using the camera image, independently of the processing of the flow chart shown in FIG. 21. In this case, when a person's face has been recognized in the camera image, the information processing section 31 acquires the face recognition result in step 101 described above, and stores the face recognition result in the main memory 32.

Next, the information processing section 31 sets an image of the face recognized in the face recognition process in step 101 described above (an image included in the face area in the camera image), as a texture of the enemy object EO (step 102), and proceeds to the subsequent step. For example, in the camera image indicated by the camera image data Db, the information processing section 31 sets an image included in the region of the face indicated by the face recognition result of the face recognition process in step 101 described above, as a texture of the enemy object EO, to thereby update the texture data De1 using the set texture.

Next, the information processing section 31 sets the enemy object EO and the mask object MO that correspond to the region of the image of the face recognized in the face recognition process in step 101 described above (step 103), and proceeds to the subsequent step. For example, in accordance with the region of the image of the face recognized in the face recognition process in step 101 described above, the information processing section 31 sets the shape of a polygon corresponding to the enemy object EO, to thereby update the enemy object data De using the set parameters. As an example, when the region of the image of the face recognized in the face recognition process in step 101 described above has changed from the region obtained in the previous process, the information processing section 31 changes the shape of the polygon corresponding to the enemy object EO in accordance with the shape of the region after the change. Further, in accordance with the region of the image of the face, the information processing section 31 sets the size and the shape of a planar polygon corresponding to the mask object MO, and sets a color with which the planar polygon is to be filled in, either as a predetermined color (e.g., black) or the peripheral color of the image of the face in the camera image acquired in step 52 described above, to thereby update the mask object data Df using the set parameters. As an example, when the region of the image of the face recognized in the face recognition process in step 101 described above has changed from the region obtained in the previous process, the information processing section 31 changes the shape of the planar polygon corresponding to the mask object MO in accordance with the shape of the region after the change.

Next, the information processing section 31 places the mask object MO in the virtual space (step 104), and proceeds to the subsequent step. For example, the information processing section 31 places the mask object MO at the position on which a perspective projection is performed such that the mask object MO overlaps the region of the image of the face in the planar polygon, on the entire main surface of which the texture of the camera image is mapped (see FIG. 16), to thereby update the mask object data Df using the placement position. It should be noted that an example where the mask object MO is placed in the virtual space is similar to the example of the placement described with reference to FIGS. 17 and 18, and therefore is not described in detail.

Next, the information processing section 31 moves the enemy object EO placed in the virtual space (step 105), and proceeds to the subsequent step. As an example, the information processing section 31 sets the position of the enemy object EO indicated by the enemy object data De by bringing the position closer to the virtual camera placed in the virtual space by a predetermined distance, to thereby update the enemy object data De using the set position of the enemy object EO. As another example, based on a moving direction and a moving velocity that have been defined for the enemy object EO, the information processing section 31 updates the position of the enemy object EO indicated by the enemy object data De, to thereby update the enemy object data De using the updated position of the enemy object EO. Further, the information processing section 31 updates the placement direction of the enemy object EO indicated by the enemy object data De by a predetermined angle in a predetermined direction, to thereby update the enemy object data De using the updated placement angle of the enemy object EO.

It should be noted that in the process of step 105 described above, the enemy object EO may be further moved, or the situation of the game may be changed, in accordance with the expression of the person's face recognized in step 101 described above. As a first example, when it is determined that the expression of the person's face recognized in step 101 described above is a predetermined expression (e.g., an angry expression), the enemy object EO performs an operation of making a predetermined attack against the user (i.e., against the virtual camera). As a second example, when it is determined that the expression of the person's face recognized in step 101 described above is a predetermined expression (e.g., an expression with eyes closed), the velocity of the movement of the enemy object EO to the user is changed (e.g., the moving velocity is reduced). As a third example, when it is determined that the expression of the person's face recognized in step 101 described above is a predetermined expression (e.g., a smiling expression), the endurance of the user in the game (parameters related to the length of time that the game apparatus 10 can continue the game without the game being over) is increased by a predetermined amount.

Next, the information processing section 31 determines whether or not the enemy object EO has reached the position of the virtual camera (step 106). For example, the information processing section 31 determines, using the position of the enemy object EO indicated by the enemy object data De, whether or not the position of the enemy object EO has reached the position of the virtual camera, which performs a perspective projection on the enemy object EQ. When the enemy object EO has reached the position of the virtual camera, the information processing section 31 proceeds to the subsequent step 107. On the other hand, when the enemy object EO has not reached the position of the virtual camera, the information processing section 31 ends the process of this subroutine.

In step 107, the information processing section 31 performs a point deduction process, and ends the process of the subroutine. For example, in the point deduction process, the information processing section 31 deducts predetermined points from the score of the game indicated by the score data Dh, to thereby update the score data Dh using the score after the deduction. Further, in the point deduction process, the information processing section 31 performs a process of causing the enemy object EO having reached the position of the virtual camera, to disappear from the virtual space (e.g., initializing the enemy object data De concerning the enemy object EO having reached the position of the virtual camera, such that the enemy object EO is not present in the virtual space). It should be noted that in the point deduction process, the mask object MO applied to the position from which the enemy object EO having reached the position of the virtual camera had appeared, may remain placed in the virtual space, or may be caused to disappear simultaneously when the enemy object EO is caused to disappear.

Referring back to FIG. 20, in step 93, the information processing section 31 determines whether or not the enemy object EO is appearing. For example, with reference to the appearance flag data, the information processing section 31 makes a determination in step 93 described above, based on whether or not the appearance flag is set to "during appearance". When the enemy object EO is appearing, the information processing section 31 proceeds to the subsequent step 94. On the other hand, when the enemy object EO is not appearing, the information processing section 31 proceeds to the subsequent step 95.

In step 94, the information processing section 31 performs a during-appearance process, and proceeds to the subsequent step 95. With reference to FIG. 22, a description is given below of the during-appearance process performed by the information processing section 31 in step 94 described above.

Referring to FIG. 22, the information processing section 31 performs a predetermined face recognition process on a camera image indicated by the camera image data Db, stores the face recognition result in the main memory 32 (step 111), and proceeds to the subsequent step. Here, the face recognition process may be performed sequentially by the information processing section 31, using the camera image, independently of the processing of the flow chart shown in FIG. 22. In this case, when a person's face has been recognized in the camera image, the information processing section 31 acquires the face recognition result in step 111 described above, and stores the face recognition result in the main memory 32.

Next, the information processing section 31 sets an image of the face recognized in the face recognition process in step 111 described above, as a texture of the enemy object EO (step 112), and proceeds to the subsequent step. For example, in the camera image indicated by the camera image data Db, the information processing section 31 sets an image included in the region of the face indicated by the face recognition result of the face recognition process in step 111 described above, as a texture of the enemy object EO, to thereby update the texture data De1 using the set texture.

Next, the information processing section 31 sets the mask object MO corresponding to the region of the image of the face recognized in the face recognition process in step 111 described above (step 113), and proceeds to the subsequent step. For example, in accordance with the region of the image of the face recognized in the face recognition process in step 111 described above, the information processing section 31 sets the size and the shape of a planar polygon corresponding to the mask object MO, and sets a color with which the planar polygon is to be filled in, either as a predetermined color (e.g., black) or the peripheral color of the image of the face in the camera image acquired in step 52 described above, to thereby update the mask object data Df using the set parameters.

Next, in accordance with the region of the image of the face recognized in the face recognition process in step 111 described above, the information processing section 31 sets the enemy object EO by performing a morphing process for changing a planar polygon to predetermined three-dimensional polygons (step 114), and proceeds to the subsequent step. For example, the information processing section 31 changes the size and the shape of the planar polygon of the enemy object EO indicated by the enemy object data De to those corresponding to the region of the image of the face recognized in the face recognition process in step 111 described above, and performs a morphing process for increasing the thickness of the planar polygon after the change by a predetermined amount such that the planar polygon changes to predetermined three-dimensional polygons, to thereby update the enemy object data De. As shown in FIG. 24, when the enemy object EO appears from the image of a face recognized in the real world image, the enemy object EO is represented by the morphing process so as to gradually change from planar to three-dimensional toward the point of view in the face image.

It should be noted that the three-dimensional polygons, to which the planar polygon is changed by the morphing process, include polygons of various possible shapes. As a first example, the enemy object EO is generated by performing the morphing process to change the planar polygon to plate polygons having a predetermined thickness. In this case, the image of the face recognized in the camera image in the face recognition process is mapped as a texture onto the main surface of the plate polygons. As a second example, the enemy object EO is generated by performing the morphing process to change the planar polygon to three-dimensional polygons having the shape of the head of a predetermined character. In this case, the image of the face recognized in the camera image in the face recognition process is mapped as a texture onto the facial surface of the head-shaped polygons. As a third example, the enemy object EO is generated by performing the morphing process to change the planar polygon to three-dimensional polygons having the shape of a predetermined weapon (e.g., missile-shaped polygons). In this case, the image of the face recognized in the camera image in the face recognition process is mapped as a texture onto a part of the weapon-shaped polygons (e.g., mapped onto the missile-shaped polygons at the head of the missile).

Next, the information processing section 31 determines whether or not the morphing process on the enemy object EO has reached the final stage (step 115). When the morphing process on the enemy object EO has reached the final stage, the information processing section 31 proceeds to the subsequent step 116. On the other hand, when the morphing process on the enemy object EO has not yet reached the final stage, the information processing section 31 proceeds to the subsequent step 117. For example, when the thickness of the planar polygon corresponding to the enemy object EO has reached a predetermined thickness by repeating the morphing process in step 114 described above, the information processing section 31 determines that the morphing process on the enemy object EO has reached the final stage.

In step 116, the information processing section 31 sets the appearance flag to "already appeared" to thereby update the appearance flag data, and proceeds to the subsequent step 117.

In step 117, the information processing section 31 places the enemy object EO and the mask object MO in the virtual space, and ends the process of this subroutine. For example, the information processing section 31 places the mask object MO at the position on which a perspective projection is performed such that the mask object MO overlaps the region of the image of the face in the planar polygon, on the entire main surface of which the texture of the camera image is mapped (see FIG. 16), to thereby update the mask object data Df using the placement position. Further, the information processing section 31 places the enemy object EO, subjected to the morphing process in step 114 described above, at the position on which a perspective projection is performed such that the enemy object EO is placed on the region of the image of the face so as to project toward the virtual camera from the main surface of the planar polygon, on which the texture of the camera image is mapped, to thereby update the enemy object data De using the placement position.

Referring back to FIG. 20, in step 95, the information processing section 31 determines whether or not the enemy object EO has yet to appear. For example, with reference to the appearance flag data, the information processing section 31 makes a determination in step 95 described above, based on whether or not the appearance flag is set to "yet to appear". When the enemy object EO has yet to appear, the information processing section 31 proceeds to the subsequent step 96. On the other hand, when the enemy object EO is not in the state of having yet to appear, the information processing section 31 ends the process of this subroutine.

In step 96, the information processing section 31 performs a yet-to-appear process, and ends the process of the subroutine. With reference to FIG. 23, a description is given below of the yet-to-appear process performed by the information processing section 31 in step 96 described above.

Referring to FIG. 23, the information processing section 31 performs a predetermined face recognition process on a camera image indicated by the camera image data Db, stores the face recognition result in the main memory 32 (step 121), and proceeds to the subsequent step. Here, the face recognition process may be performed sequentially by the information processing section 31, using the camera image, independently of the processing of the flow chart shown in FIG. 23. In this case, when a person's face has been recognized in the camera image, the information processing section 31 acquires the face recognition result in step 121 described above, and stores the face recognition result in the main memory 32.

Next, the information processing section 31 determines whether or not the conditions for the appearance of the enemy object EO have been satisfied (step 122). For example, the conditions for the appearance of the enemy object EO, on an essential condition that a person's face has been recognized in the camera image in step 121 described above. may be: that the enemy object EO appears at predetermined time intervals; that in accordance with the disappearance of the enemy object EO from the virtual world, a new enemy object EO appears; or that the enemy object EO appears at a random time. When the conditions for the appearance of the enemy object EO have been satisfied, the information processing section 31 proceeds to the subsequent step 123. On the other hand, when the conditions for the appearance of the enemy object EO have not been satisfied, the information processing section 31 ends the process of this subroutine.

In step 123, the information processing section 31 sets an image of the face recognized in the face recognition process in step 121 described above, as a texture of the enemy object EO, and proceeds to the subsequent step. For example, in the camera image indicated by the camera image data Db, the information processing section 31 sets an image included in the region of the face indicated by the face recognition result of the face recognition process in step 121 described above, as a texture of the enemy object EO, to thereby update the texture data De1 using the set texture.

Next, the information processing section 31 sets the enemy object EO and the mask object MO that correspond to the region of the image face recognized in the face recognition process in step 121 described above (step 124), and proceeds to the subsequent step. For example, in accordance with the region of the image face recognized in the face recognition process in step 121 described above, the information processing section 31 sets the size and the shape of plate polygons corresponding to the enemy object EO, to thereby update the enemy object data De using the set parameters. Further, in accordance with the region of the image of the face, the information processing section 31 sets the size and the shape of a planar polygon corresponding to the mask object MO, and sets a color with which the planar polygon is to be filled in, either as a predetermined color (e.g., black) or the peripheral color of the image of the face in the camera image acquired in step 52 described above, to thereby update the mask object data Df using the set parameters.

Next, the information processing section 31 newly places the enemy object EO and the mask object MO in the virtual space (step 125), and proceeds to the subsequent step. For example, the information processing section 31 places the enemy object EO and the mask object MO at the positions on which a perspective projection is performed such that the enemy object EO and the mask object MO overlap the region of the image of the face in the planar polygon, on the entire main surface of which the texture of the camera image is mapped (see FIG. 16), to thereby update the enemy object data De and the mask object data Df using the placement positions. It should be noted that an example where the enemy object EO and the mask object MO are placed in the virtual space is similar to the example of the placement described with reference to FIGS. 17 and 18, and therefore is not described in detail.

Next, the information processing section 31 sets the appearance flag to "during appearance" to thereby update the appearance flag data (step 126), and ends the process of this subroutine.

As described above, based on the image processing according to the above embodiment, display is performed such that on a real world image obtained from a real camera, a virtual world image showing an object represented as if a face image in the real world image slides out is superimposed. This makes it possible to display a new image as if the object is present in real space.

Figure 25A:
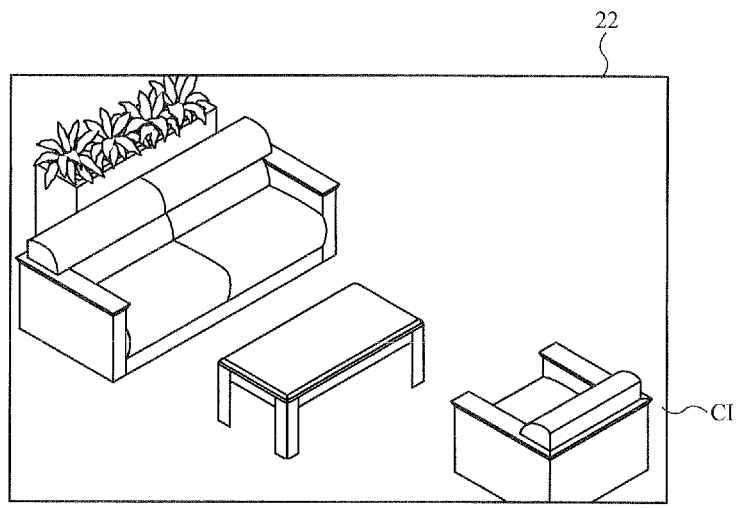
FIG. 25A is a diagram showing another example of the camera image CI displayed on the upper LCD 22 of FIG. 1.
Figure 25B:
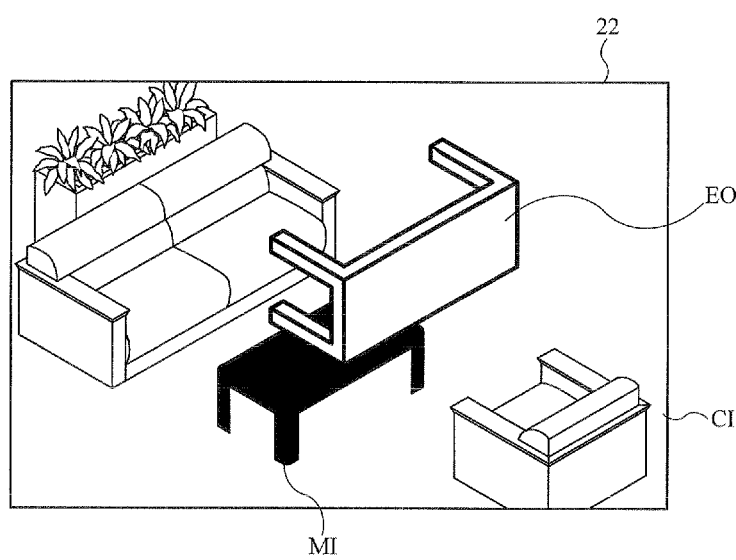
FIG. 25B is a diagram showing another example where display is performed such that the enemy object EO appears from the camera image CI displayed on the upper LCD 22 of FIG. 1.

It should be noted that in the above descriptions, a person's face is used as an example of the predetermined physical body that is recognized in the camera image captured in the real camera of the game apparatus 10 and serves as the enemy object EQ. Alternatively, the camera image may be analyzed, an area in the camera image that satisfies predetermined conditions may be recognized, and the recognized area may be set as a texture of the enemy object EO. For example, another object whose shape can be recognized by performing image analysis on the camera image so as to extract a boundary, an outline, and the like, may be recognized in the camera image, and the recognized object may be set as a texture of the enemy object EO. For example, as shown in FIG. 25A, a table captured in the camera image may be recognized and clipped, and a three-dimensional object representing the table may serve as the enemy object EO. As an example, when a brown rectangular physical body has been recognized in the camera image, and the physical body is present in the camera image, it is determined that a table has been recognized in the camera image. Then, the physical body recognized as a table is clipped from the camera image and set as the enemy object EO. In this case, as shown in FIG. 25B, the enemy object EO is set by setting, as a texture, the physical body recognized as a table in the camera image, and mapping the texture onto three-dimensional polygons having the shape of a predetermined table. Further, the mask image MI is applied to the footprint after clipping an image of the physical body recognized as a table in the camera image. Then, the table-shaped enemy object EO is moved toward the user, to thereby serve as a target of attack for the user. It should be noted that the top of the table shown in FIG. 25A may be recognized as a brown rectangle, and an image included in the area of the top in the camera image may be set as a texture, and applied to plate polygons.

There are other possible examples of the physical body that is recognized in the camera image and serves as the enemy object EQ. As a first example, when a black frame-shaped physical body has been recognized in the camera image, it is determined that the physical body is a television. Then, the physical body recognized as a television is clipped from the camera image and set as the enemy object EO, and the clipped image is set as a texture of the enemy object EQ. As a second example, when a red spherical physical body has been recognized in the camera image, it is determined that the physical body is an apple. Then, the physical body recognized as an apple is clipped from the camera image and set as the enemy object EO, and the clipped image is set as a texture of the enemy object EQ. As a third example, when a white disk-shaped physical body has been recognized in the camera image, it is determined that the physical body is a clock. Then, the physical body recognized as a clock is clipped from the camera image and set as the enemy object EO, and the clipped image is set as a texture of the enemy object EO. As described above, it is possible to recognize the shapes of various physical bodies by performing image analysis on the camera image so as to extract a boundary, an outline, and the like, and using the color and/or the shape of each physical body as a recognition target. This makes it possible to perform processing similar to the image processing described above by clipping a physical body recognized in the camera image and setting the clipped object as a texture of the enemy object EO.

As another example, character recognition may be performed on the camera image, and a character recognized in the camera image may be set as a texture of an object that appears. For example, when a character has been recognized in the camera image, the character is clipped from the camera image and set as the enemy object EO, and the clipped character is set as a texture of the enemy object EO. In this case, the color of the character used as a recognition target is not limited, and the color of the enemy object EO that appears in the shape of the character is also set as a color corresponding to the recognized color of the character.

Figure 26A:
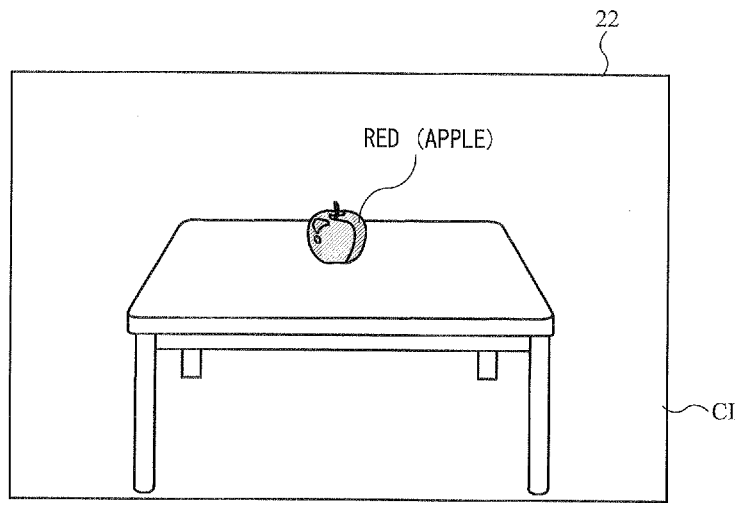
FIG. 26A is a diagram showing an example where the camera image CI in which a red apple is captured is displayed on the upper LCD 22 of FIG. 1.
Figure 26B:
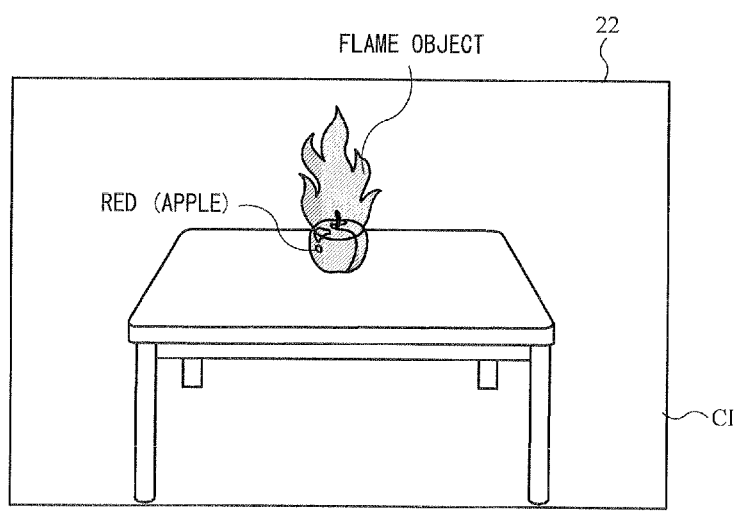
FIG. 26B is a diagram showing an example where display is performed on the upper LCD 22 of FIG. 1 such that a flame object is placed on the captured red apple.

As another example, only the color of a physical body captured in the camera image may be used as a recognition target, and an area having the color recognized in the camera image may be set as a texture of an object that appears. For example, when a physical body in a predetermined color is captured and recognized in the camera image, a three-dimensional object representing a physical body related to the predetermined color is caused to appear so as to have an image of the recognized physical body as a texture. As an example, as shown in FIG. 26A, when a red physical body (e.g., a red apple; a red image is represented as a diagonal line area in FIGS. 26A and 26B) is captured in the camera image, it is determined that the red physical body recognized in the camera image has been recognized. Then, the red physical body recognized in the camera image is set as a texture of a three-dimensional object to appear. Specifically, as shown in FIG. 26B, an image of the red physical body recognized in the camera image (e.g., an image of a red apple recognized in the camera image) is set as a texture, and the texture is mapped onto three-dimensional polygons having a predetermined shape (e.g., the shape of a flame), whereby an object (flame object) is caused to appear. In this case, the image of the red physical body recognized in the camera image may be displayed on the upper LCD 22 in the state of being captured, without being clipped (the state of FIG. 26B). Alternatively, the image of the recognized red physical body may be clipped, and the mask image MI may be applied to the footprint after clipping the image. For example, in the first case, as shown in FIG. 26B, the flame object is placed in an upper portion of the red apple recognized as the red physical body in the camera image, whereby the recognized apple is represented as if blazing with a flame in the color of the apple (red). In the second case, the flame object is placed as if ejecting toward the virtual camera from the position of the physical body recognized as the red physical body in the camera image, whereby the flame object is represented as if ejecting toward the user.

There are other possible examples of the physical body that is recognized in the camera image and serves as the enemy object EO. As a first example, when a blue physical body has been recognized in the camera image, representation is made as if a liquid in the color of the physical body (e.g., water) flows out from the position where the object has been recognized. In this case, a virtual world image is generated by mapping an image of the blue physical body recognized in the camera image as a texture onto three-dimensional polygons having the shape of a liquid moving in waves. As a second example, when a yellow physical body has been recognized in the camera image, representation is made as if light in the color of the physical body (e.g., lightning) is emitted from the position where the object has been recognized. In this case, a virtual world image is generated by mapping an image of the yellow physical body recognized in the camera image as a texture onto three-dimensional polygons having the shape of light being emitted like lightning.

Third Embodiment

Next, a description is given of an image processing apparatus that executes an image processing program according to a third embodiment of the present invention. In the first embodiment and the second embodiment described above, a given region is clipped from a camera image obtained from the real camera of the game apparatus 10 and appears as the enemy object EO, or a predetermined physical body recognized in the camera image is clipped and appears as the enemy object EO. In the third embodiment, a description is given of an example where enemy objects EO unrelated to the camera image appear, and another enemy object EO newly appears from the camera image during a game. It should be noted that the hardware configuration of the image processing apparatus that executes the image processing program according to the third embodiment is similar to those used in the first embodiment and the second embodiment, and therefore, the same components as those of the first embodiment and the second embodiment are designated by the same numerals and are not described in detail.

Figure 27:
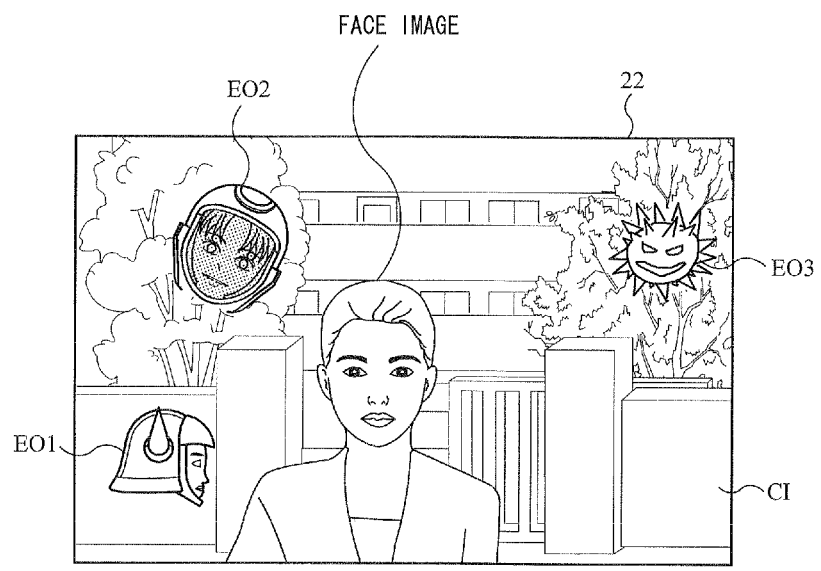
FIG. 27 is a diagram showing an example of a camera image CI and enemy objects EO1 through EO3 that are displayed on the upper LCD 22.
Figure 28:
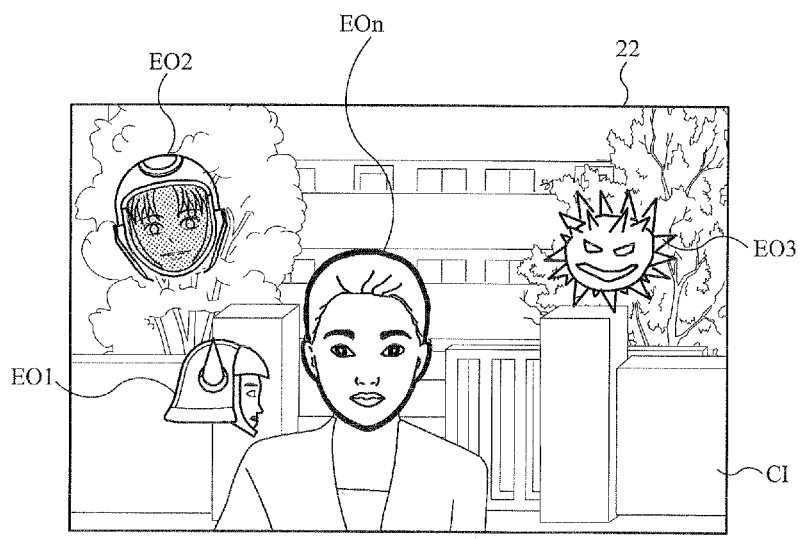
FIG. 28 is a diagram showing an example where display is performed such that an enemy object EOn newly appears from the camera image CI displayed on the upper LCD 22.
Figure 29:
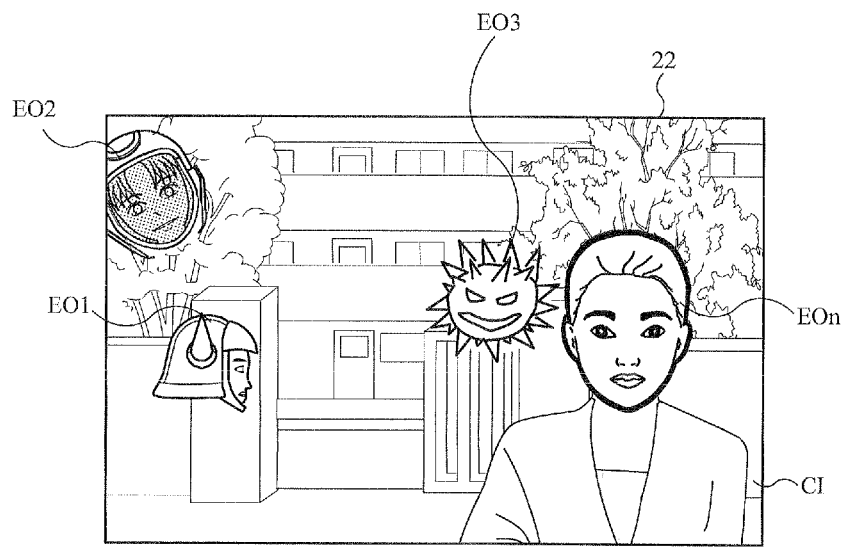
FIG. 29 is a diagram showing an example of the motion of the enemy object EOn when the imaging angle of the camera image CI displayed on the upper LCD 22 has changed or a subject in the camera image CI has moved.

Next, with reference to FIGS. 27 through 29, a description is given of examples of the forms of display performed on the upper LCD 22 by image processing operations according to the present embodiment. It should be noted that FIG. 27 is a diagram showing an example of a camera image CI and enemy objects EO1 through EO3 that are displayed on the upper LCD 22. FIG. 28 is a diagram showing an example where display is performed such that an enemy object EOn newly appears from the camera image CI displayed on the upper LCD 22. FIG. 29 is a diagram showing an example of the motion of the enemy object EOn when the imaging angle of the camera image CI displayed on the upper LCD 22 has changed or a subject in the camera image CI has moved. It should be noted that for ease of description, an example is where a planar image (a planar view image, as opposed to the stereoscopically visible image described above) of the real world based on a camera image CI acquired from either one of the outer imaging section 23 and the inner imaging section 24 is displayed on and the upper LCD 22.

In FIG. 27, on the upper LCD 22, a camera image CI is displayed, which is a real world image captured by a real camera built into the game apparatus 10 (e.g., the outer imaging section 23). For example, a real-time real world image (moving image) captured by the real camera built into the game apparatus 10 is displayed on the upper LCD 22. Further, virtual objects unrelated to the camera image CI are displayed on the upper LCD 22, so as to be combined with the camera image CI. In FIG. 27, as examples of the virtual objects, enemy objects EO1 through EO3 are displayed. Here, the enemy objects EO1 through EO3 are three-dimensional objects that serve as targets of attack for the user as in the above embodiments, and move and appear in a virtual space combined with the camera image CI, based on a predetermined algorithm.

It should be noted that the enemy objects EO1 through EO3 may each be an object obtained by applying an image of a face captured in the past to a three-dimensional model (polygons) (e.g., the enemy objects EO1 and EO2), or may be a three-dimensional object prepared in advance regardless of captured images (e.g., the enemy object EO3). For example, three-dimensional polygons representing the enemy objects EO1 through EO3 are placed in the virtual space, and an image of the virtual space, in which the enemy objects EO1 through EO3 are viewed from the virtual camera (a virtual world image), is combined with a real world image obtained from the camera image CI. Thus, the enemy objects EO1 through EO3 are displayed on the upper LCD 22 as if placed in real space. Then, in accordance with an attack operation using the game apparatus 10 (e.g., pressing the button 14B (A button)), a bullet object BO is fired in a predetermined direction (e.g., the direction of the line of sight of the real camera that is capturing the camera image CI, and the direction of the line of sight of the virtual camera), and a game is achieved where the enemy objects EO1 through EO3 serve as targets of attack for the user.

Meanwhile, during the game, the game apparatus 10 sequentially performs a predetermined face recognition process on the camera image CI captured by the real camera, and determines the presence or absence of a person's face in the camera image CI. When having determined in the face recognition process that a person's face is present in the camera image CI, the game apparatus 10 causes the enemy object EOn to appear from at least one of portions of the face recognized in the camera image CI on the determination that conditions for the new appearance of the enemy object EOn have been satisfied (the state of FIG. 28).

As shown in FIG. 28, the newly appearing enemy object EOn appears as a virtual object obtained by texture-mapping an image of the face recognized in the camera image CI onto a three-dimensional model of a human facial surface. It should be noted that when a plurality of face images have been obtained from faces recognized in the camera image CI by face recognition: one of the plurality of face images may be selected to be a target from which an enemy object EOn is caused to appear; two or more of the plurality of face images may be selected to be targets from which enemy objects EOn are caused to appear; or all of the plurality of face images may be selected to be targets from which enemy objects EOn are caused to appear. A description is given below on the assumption of the case where a face image is obtained from the face recognized in the camera image CI by face recognition, or the case where one of the plurality of face images are selected to be a target from which an enemy object EOn is caused to appear.

For example, a three-dimensional model on which an image of the face recognized in the camera image CI is texture-mapped (the enemy object EOn) is newly placed in the virtual space where the enemy objects EO1 through EO3 have already been placed. Then, an image of the virtual space, in which the enemy object EOn is viewed from the virtual camera (a virtual world image), is combined with the real world image obtained from the camera image CI. Thus, the enemy object EOn is displayed on the upper LCD 22 as if newly placed in real space. Then, the enemy object EOn also serves as a target of attack for the user. It should be noted that the enemy object EOn may be caused to appear by, as in the second embodiment, performing a morphing process for changing a planar polygon integrated with the camera image CI to the three-dimensional model (three-dimensional polygons).

Here, when a real-time real world image (moving image) captured by the real camera is displayed on the upper LCD 22 as the camera image CI, the enemy object EOn is displayed so as to follow the position of the face image obtained from the face recognized in the camera image CI (e.g., a change from the camera image CI shown in FIG. 28 to the camera image CI shown in FIG. 29). For example, the three-dimensional model (polygons) on which the face image is texture-mapped is placed at the position in the virtual space corresponding to the position of the face image obtained from the recognized face, and an image of the virtual space, in which the three-dimensional model is viewed from the virtual camera (a virtual world image), is combined with the real world image obtained from the camera image CI. Thus, display is performed on the upper LCD 22 such that the enemy object EOn is placed so as to at least partially overlap the person's face. Here, examples of "the enemy object EOn is placed so as to at least partially overlap the person's face" include: the case where the enemy object EOn is the same in shape and size as the image of the person's face, and therefore overlaps the face image in a completely coincidental manner; the case where the enemy object EOn is larger in size than the image of the person's face, and therefore overlaps the face image so as to completely include the face image; and the case where the enemy object EOn is smaller in size than or the same in size as the image of the person's face, and therefore overlaps a part of the face image. As described above, display is performed on the upper LCD 22 such that the person's face in the camera image CI of the real world captured by the user themselves newly appears as the enemy object EOn, and the enemy object EOn overlaps the position of the face in the camera image CI.

For example, when a real-time real world image captured by the real camera built into the game apparatus 10 is displayed on the upper LCD 22, changes in the direction and the position of the game apparatus 10 in real space (i.e., the imaging angle and the imaging position in real space) also change the real-time real world image captured by the game apparatus 10. Accordingly, when the imaging position and the imaging angle for capturing the camera image CI have changed, the positions and the sizes of the subjects in the camera image CI displayed on the upper LCD 22 also change. Further, the movements in real space of the subject from which the face image has been obtained and the other subjects also change the positions and the sizes of the subjects in the camera image CI displayed on the upper LCD 22. Even when the positions and the sizes of the subjects in the camera image CI have changed, the game apparatus 10 sequentially performs a face recognition process on the camera image CI after the changes. This makes it possible to acquire the position and the size of the face image after the changes. Then, in accordance with the position and the size of the face image after the above movements, the game apparatus 10 adjusts in the virtual space the position and the size of the three-dimensional model to which the face image is applied. This makes it possible to display the enemy object EOn on the upper LCD 22 so as to overlap the face image. It should be noted that the enemy objects EO1 through EO3 may be displayed on the upper LCD 22 such that, as in the first embodiment and the second embodiment, the display positions of the enemy objects are moved in accordance with the motion of the game apparatus 10 by, for example, changing the imaging direction of the virtual camera in accordance with the motion of the game apparatus 10.

Further, the expression of the person (subject) whose face has been recognized in the camera image CI may possibly change in real space. In this case, the enemy object EOn may be placed in the virtual space, using the first face image that has been obtained from the face recognized in the camera image CI and has been used as the enemy object EOn may be used continuously. Alternatively, the enemy object EOn may be placed in the virtual space by updating the texture of the enemy object EOn, using face images obtained from faces recognized sequentially in the camera image CI obtained in real time. In the first case, the face image applied to the enemy object EOn remains the same as when the enemy object EOn has appeared, until disappearing from the virtual space. In the second case, when the face image obtained from the face recognized in the camera image CI has changed (e.g., the expression of the subject has changed), the face image applied to the enemy object EOn is also updated sequentially in accordance with the change.

As described above, based on the image processing according to the above embodiment, a three-dimensional object to which a face image captured in real time in a real world image is applied, appears and is combined with the real world image. Accordingly, display is performed such that on a real world image obtained from a real camera, a virtual world image showing a three-dimensional object represented as if a face image in the real world image slides out is superimposed. This makes it possible to display a new image as if the three-dimensional object is present in real space. Further, the three-dimensional object that has appeared is combined with the real world image so as to follow the motion and the change of the subject from which the face image to be applied has been obtained. This makes it possible to make a more realistic representation as if the three-dimensional object is present in real space. Furthermore, while a game is played where, with a camera image CI as a background, an attack is made against enemy objects EO unrelated to the camera image CI, a new enemy object EOn appears as if sliding out of the camera image CI. This makes it possible to give a surprise to the user who is playing the game. In addition, it is also possible to add a new purpose to the game that an object having slid out from the camera image CI is caused to newly appear during the game.

In the above descriptions, as an example, the angular velocities generated in the game apparatus 10 are detected, and the motion of the game apparatus 10 in real space is calculated using the angular velocities. Alternatively, the motion of the game apparatus 10 may be calculated using another method. As a first example, the motion of the game apparatus 10 may be calculated using the accelerations detected by the acceleration sensor 39 built into the game apparatus 10. As an example, when the computer performs processing on the assumption that the game apparatus 10 having the acceleration sensor 39 is in a static state (i.e., performs processing on the assumption that the acceleration detected by the acceleration sensor 39 is the gravitational acceleration only), if the game apparatus 10 is actually in a static state, it is possible to determine, based on the detected acceleration, whether or not the game apparatus 10 is tilted relative to the direction of gravity, and also possible to determine to what degree the game apparatus 10 is tilted. As another example, when it is assumed that the game apparatus 10 having the acceleration sensor 39 is in a dynamic state, the acceleration sensor 39 detects the acceleration corresponding to the motion of the acceleration sensor 39 in addition to a component of the gravitational acceleration. This makes it possible to determine the motion direction and the like of the game apparatus 10 by removing the component of the gravitational acceleration by a predetermined process. Specifically, when the game apparatus 10 having the acceleration sensor 39 is moved by being dynamically accelerated with the user's hand, it is possible to calculate various motions and/or positions of the game apparatus 10 by processing the acceleration signals generated by the acceleration sensor 39. It should be noted that even when it is assumed that the acceleration sensor 39 is in a dynamic state, it is possible to determine the tilt of the game apparatus 10 relative to the direction of gravity by removing the acceleration corresponding to the motion of the acceleration sensor 39 by a predetermined process.

As a second example, the motion of the game apparatus 10 may be calculated using the amount of movement of a camera image captured in real time by the real camera built into the game apparatus 10 (the outer imaging section 23 or the inner imaging section 24). For example, when the motion of the game apparatus 10 has changed the imaging direction and the imaging position of the real camera, the camera image captured by the real camera also changes. Accordingly, it is possible to calculate the angle of change in the imaging direction of the real camera, the amount of movement of the imaging position, and the like, using changes in the camera image captured by the real camera built into the game apparatus 10. As an example, a predetermined physical body is recognized in a camera image captured by the real camera built into the game apparatus 10, and the imaging angles and the imaging positions of the physical body are chronologically compared to one another. This makes it possible to calculate the angle of change in the imaging direction of the real camera, the amount of movement of the imaging position, and the like, from the amounts of changes in the imaging angle and the imaging position. As another example, the entire camera images captured by the real camera built into the game apparatus 10 are chronologically compared to one another. This makes it possible to calculate the angle of change in the imaging direction of the real camera, the amount of movement of the imaging position, and the like, from the amounts of changes in the imaging direction and the imaging range in the entire image.

As a third example, the motion of the game apparatus 10 may be calculated by combining at least two of: the angular velocities generated in the game apparatus 10; the accelerations generated in the game apparatus 10; and a camera image captured by the game apparatus 10. This makes it possible that in the state where it is difficult to estimate the motion of the game apparatus 10 in order to calculate the motion from one parameter, the motion of the game apparatus 10 is calculated by combining this parameter with another parameter, whereby the motion of the game apparatus 10 is calculated so as to compensate for such a state. As an example, to calculate the motion of the game apparatus 10 in the second example described above, if the captured camera image has moved chronologically in a horizontal direction, it may be difficult to accurately determine whether the imaging angle of the game apparatus 10 has rotated about the vertical axis, or the game apparatus 10 has moved horizontally. In this case, it is possible to easily determine, using the angular velocities generated in the game apparatus 10, whether the game apparatus 10 has moved so as to rotate or moved horizontally.

In addition, as a fourth example, the motion of the game apparatus 10 may be calculated using so-called AR (augmented reality) technology.

In addition, in the above descriptions, as an example, a planar image (a planar view image, as opposed to the stereoscopically visible image described above) of the real world based on a camera image CI acquired from either one of the outer imaging section 23 and the inner imaging section 24 is displayed on the upper LCD 22. Alternatively, an image stereoscopically visible with the naked eye (a stereoscopic image) may be displayed on the upper LCD 22. For example, as described above, the game apparatus 10 can display on the upper LCD 22 a stereoscopically visible image (stereoscopic image) using camera images acquired from the left outer imaging section 23a and the right outer imaging section 23b. In this case, an enemy object EO and another object are drawn as if sliding out of the stereoscopic image displayed on the upper LCD 22.

For example, to draw the enemy object EO as if sliding out of the stereoscopic image, the image processing described above is performed using a left-eye image obtained from the left outer imaging section 23a and a right-eye image obtained from the right outer imaging section 23b. Specifically, in the image processing shown in FIG. 12, either one of the left-eye image and the right-eye image is used as the camera image, a part of which is set as a texture of an object, and the enemy object EO obtained by mapping the texture obtained from the one of the images is set in the virtual space. Further, a perspective transformation is performed from two virtual cameras (a stereo camera), on the enemy object EO, a mask object MO, and a bullet object BO that are placed in the virtual space, whereby a left-eye virtual world image and a right-eye virtual world image are obtained. Then, a left-eye display image is generated by combining a left-eye real world image (an image obtained by rendering a left-eye image in step 53 described above) with the left-eye virtual world image, and a right-eye display image is generated by combining a right-eye real world image (an image obtained by rendering a right-eye image in step 53 described above) with the right-eye virtual world image. Then, the left-eye display image and the right-eye display image are output to the upper LCD 22.

In addition, in the above descriptions, a real-time moving image captured by the real camera built into the game apparatus 10 is displayed on the upper LCD 22, and display is performed such that an object appears, on which a part of the moving image (camera image) captured by the real camera is set as a texture. In the present invention, however, the images to be displayed on the upper LCD 22 have various possible variations. As a first example, a moving image recorded in advance, or a moving image or the like obtained from television broadcast or another device, is displayed on the upper LCD 22. In this case, the moving image is displayed on the upper LCD 22, and from the moving image, an object appears, on which a part of the moving image is set as a texture. As a second example, a still image obtained from the real camera built into the game apparatus 10 or another real camera is displayed on the upper LCD 22. In this case, the still image obtained from the real camera is displayed on the upper LCD 22, and from the still image, an object appears, on which a part of the still image is set as a texture. Here, the still image obtained from the real camera may be a still image of the real world captured in real time by the real camera built into the game apparatus 10, or may be a still image of the real world captured in advance by the real camera or another real camera, or may be a still image obtained from television broadcast or another device.

In addition, in the above embodiments, the upper LCD 22 is a parallax barrier type liquid crystal display device, and therefore is capable of switching between stereoscopic display and planar display by controlling the on/off states of the parallax barrier. In another embodiment, for example, the upper LCD 22 may be a lenticular type liquid crystal display device, and therefore may be capable of displaying a stereoscopic image and a planar image. Also in the case of the lenticular type, an image is displayed stereoscopically by dividing two images captured by the outer imaging section 23, each into vertical strips, and alternately arranging the divided vertical strips. Also in the case of the lenticular type, an image can be displayed in a planar manner by causing the user's right and left eyes to view one image captured by the inner imaging section 24. That is, even the lenticular type liquid crystal display device is capable of causing the user's left and right eyes to view the same image by dividing one image into vertical strips, and alternately arranging the divided vertical strips. This makes it possible to display an image, captured by the inner imaging section 24, as a planar image.

In addition, in the above embodiments, as an example of a liquid crystal display section including two screens, the descriptions are given of the case where the lower LCD 12 and the upper LCD 22, physically separated from each other, are placed above and below each other (the case where the two screens correspond to upper and lower screens). The structure of a display screen including two screens, however, may be another structure. For example, the lower LCD 12 and the upper LCD 22 may be placed on the left and right of a main surface of the lower housing 11. Alternatively, a higher-than-wide LCD that is the same in width as and twice the height of the lower LCD 12 (i.e., physically one LCD having a display size of two screens in the vertical direction) may be provided on a main surface of the lower housing 11, and two images (e.g., a captured image and an image indicating an operation instruction screen) may be displayed on the upper and lower portions of the main surface (i.e., displayed adjacent to each other without a boundary portion between the upper and lower portions. Yet alternatively, an LCD that is the same in width as and twice the width of the lower LCD 12 may be provided on a main surface of the lower housing 11, and two images may be displayed on the left and right portions of the main surface (i.e., displayed adjacent to each other without a boundary portion between the left and right portions). In other words, two images may be displayed using two divided portions in what is physically a single screen. Further, when two images are displayed using two divided portions in what is physically a single screen, the touch panel 13 may be provided on the entire screen.

In addition, in the above descriptions, the touch panel 13 is integrated with the game apparatus 10. It is needless to say, however, that the present invention can also be achieved with the structure where a game apparatus and a touch panel are separated from each other. Further, the touch panel 13 may be provided on the surface of the upper LCD 22, and the display image displayed on the lower LCD 12 in the above descriptions may be displayed on the upper LCD 22.

In addition, in the above embodiments, the descriptions are given using the hand-held game apparatus 10 and a stationary game apparatus. The present invention, however, may be achieved by causing an information processing apparatus, such as a general personal computer, to execute the image processing program according to the present invention. Alternatively, in another embodiment, not only a game apparatus but also any hand-held electronic device may be used, such as a personal digital assistant (PDA), a mobile phone, a personal computer, or a camera. For example, a mobile phone may include two display sections and a real camera on the main surface of a housing.

In addition, in the above descriptions, the image processing is performed by the game apparatus 10. Alternatively, at least some of the process steps in the image processing may be performed by another device. For example, when the game apparatus 10 is configured to communicate with another device (e.g., a server or another game apparatus), the process steps in the image processing may be performed by the cooperation of the game apparatus 10 and said another device. As an example, the case is considered where: another device performs a process of setting a real world image, an enemy object EO, and a mask object MO; and the game apparatus 10 acquires data concerning the real world image, the enemy object EO, and the mask object MO, and performs the processes of steps 56 through 61. Thus, when at least some of the process steps in the image processing is performed by another device, it is possible to perform processing similar to the image processing described above. Thus, the image processing described above can be performed by a processor or by the cooperation of a plurality of processors, the processor and the plurality of processors included in an information processing system that includes at least one information processing apparatus. Further, in the above embodiments, the processing of the flow chart described above is performed in accordance with the execution of a predetermined program by the information processing section 31 of the game apparatus 10. Alternatively, some or all of the processing may be performed by a dedicated circuit provided in the game apparatus 10.

It should be noted that the shape of the game apparatus 10, and the shapes, the number, the placement, or the like of the various buttons of the operation button 14, the analog stick 15, and the touch panel 13 that are provided in the game apparatus 10 are merely illustrative, and the present invention can be achieved with other shapes, numbers, placements, and the like. Further, the processing orders, the setting values, the criterion values, and the like that are used in the image processing described above are also merely illustrative, and it is needless to say that the present invention can be achieved with other orders and values.

It should be noted that the image processing program (game program) described above may be supplied to the game apparatus 10 not only from an external storage medium, such as the external memory 45 or the data storage external memory 46, but also via a wireless or wired communication link. Further, the program may be stored in advance in a non-volatile storage device of the game apparatus 10. It should be noted that examples of the information storage medium having stored thereon the program may include a CD-ROM, a DVD, and any other optical disk storage medium similar to these, a flexible disk, a hard disk, a magnetic optical disk, and a magnetic tape, as well as a non-volatile memory. Furthermore, the information storage medium for storing the program may be a volatile memory that temporarily stores the program.

While the invention has been described in detail, the foregoing description is in all aspects illustrative and not restrictive. It is understood that numerous other modifications and variations can be devised without departing from the scope of the invention. It is understood that the scope of the invention should be interpreted only by the appended claims. Further, throughout the specification, it should be understood that terms in singular form include the concept of plurality unless otherwise specified. Thus, it should be understood that articles or adjectives indicating the singular form (e.g., "a", "an", "the", and the like in English) include the concept of plurality unless otherwise specified. It is also understood that one skilled in the art can implement the invention in the equivalent range based on the description of the invention and common technical knowledge, from the description of the specific embodiments of the invention. Furthermore, it should be understood that terms used in the present specification have meanings generally used in the art unless otherwise specified. Therefore, unless otherwise defined, all the jargons and technical terms have the same meanings as those generally understood by one skilled in the art of the invention. In the event of any contradiction, the present specification (including meanings defined herein) has priority.

A storage medium having stored thereon an image processing program, an image processing apparatus, an image processing system, and an image processing method, according to the present invention can generate a new image by combining a real world image with a virtual world image, and therefore are suitable for use as an image processing program, an image processing apparatus, an image processing system, an image processing method, and the like that perform a process of displaying various images on a display device.

What is claimed is:

1. A non-transitory computer-readable storage medium having stored thereon an image processing program to be executed by a computer of an image processing apparatus that displays an image on a display device, the image processing program causing the computer to function as:
    captured image acquisition unit acquiring a captured image captured by a real camera;
    virtual world image generation unit, using as a texture of an object to be placed in a virtual world an image included in a predetermined area in the captured image acquired by the captured image acquisition unit, generating a virtual world image in which the object placed in the virtual world is viewed from a virtual camera, wherein
        the virtual world image generation changes a direction of viewing from the virtual camera the texture of the object to be placed in the virtual world in accordance with a direction of the virtual camera relative to the object;
    image combination unit combining the captured image acquired by the captured image acquisition unit with the virtual world image; and
    display control unit for displaying the image combined by the image combination unit on the display device.

2. The computer-readable storage medium having stored thereon the image processing program according to claim 1, wherein
    in accordance with a position of the predetermined area in the captured image, the virtual world image generation unit generates the virtual world image by setting a positional relationship between the virtual camera and the object such that an image of the object in the virtual world image overlaps the predetermined area in the captured image.

3. The computer-readable storage medium having stored thereon the image processing program according to claim 1, wherein
    the virtual world image generation unit performs image analyze on the captured image, and sets an area that satisfies predetermined conditions in the captured image, as the predetermined area.

4. The computer-readable storage medium having stored thereon the image processing program according to claim 3, further causing the computer to function as:
    face recognition process unit performing a face recognition process for recognizing a person's face in the captured image acquired by the captured image acquisition unit, wherein
    the virtual world image generation unit sets at least one area in an image of the face recognized by the face recognition process unit, as the predetermined area, and sets, as the texture, the image of the face set as the predetermined area.

5. The computer-readable storage medium having stored thereon the image processing program according to claim 4, further causing the computer to function as:
    expression determination unit determining an expression of the face recognized by the face recognition process unit; and
    object action control unit, in accordance with the expression determined by the expression determination unit, causing the object placed in the virtual world to take a predetermined action.

6. The computer-readable storage medium having stored thereon the image processing program according to claim 3, further causing the computer to function as:

physical body recognition process unit recognizing a predetermined physical body in the captured image acquired by the captured image acquisition unit, wherein the virtual world image generation unit sets at least one area in an image of the physical body recognized by the physical body recognition process unit, as the predetermined area, and sets, as the texture, the image of the physical body set as the predetermined area.

7. The computer-readable storage medium having stored thereon the image processing program according to claim 3, further causing the computer to function as:

character recognition process unit performing a character recognition process for recognizing a character in the captured image acquired by the captured image acquisition unit, wherein the virtual world image generation unit sets at least one area in an image of the character recognized by the character recognition process unit, as the predetermined area, and sets, as the texture, the image of the character set as the predetermined area.

8. The computer-readable storage medium having stored thereon the image processing program according to claim 3, further causing the computer to function as:

color recognition process unit performing a color recognition process for recognizing a predetermined color in the captured image acquired by the captured image acquisition unit, wherein the virtual world image generation unit sets at least one area in an image having the color recognized by the color recognition process unit, as the predetermined area, and sets, as the texture, the image set as the predetermined area.

9. The computer-readable storage medium having stored thereon the image processing program according to claim 3, wherein the virtual world image generation unit sets an shape of the object in accordance with a shape of the predetermined area.

10. The computer-readable storage medium having stored thereon the image processing program according to claim 1, wherein the captured image acquisition unit repeatedly acquires captured images of a real world captured in real time by a real camera available to the image processing apparatus, the virtual world image generation unit sets, as the texture, an image included in the predetermined area in each of the captured images repeatedly acquired by the captured image acquisition unit, and generates the virtual world image at each time of the repeated acquisitions of the captured images, using the object obtained by mapping the most recently set texture, the image combination unit combines each of the captured images repeatedly acquired by the captured image acquisition unit, with the virtual world image corresponding to the captured image, and the display control unit repeatedly displays on the display device the images obtained by combining the captured images repeatedly acquired by the captured image acquisition unit, with the respective virtual world images.

11. The computer-readable storage medium having stored thereon the image processing program according to claim 1, wherein the virtual world image generation unit includes:
object initial placement unit for, when the image combination unit combines the captured image with the virtual world image, setting an initial position of the object in the virtual world such that the object is combined with the predetermined area in the captured image, and placing the object at the initial position.

12. The computer-readable storage medium having stored thereon the image processing program according to claim 11, wherein the object initial placement unit places at the initial position the object obtained by mapping the texture onto a predetermined initial stage model, the virtual world image generation unit further includes:
morphing process unit for placing the object in the virtual world by performing a morphing process, gradually from the initial stage model to a predetermined final stage model, and the virtual world image generation unit generates, as the virtual world image, an image of the virtual world, in which the object of the initial stage model placed by the object initial placement unit is viewed from the virtual camera, and subsequently generates, as the virtual world image, an image of the virtual world, in which the object subjected to the morphing process by the morphing process unit is viewed from the virtual camera.

13. The computer-readable storage medium having stored thereon the image processing program according to claim 1, wherein the virtual world image generation unit places the object at an initial position in the virtual world, and subsequently places the object by moving the object in the virtual world by a predetermined rule.

14. The computer-readable storage medium having stored thereon the image processing program according to claim 12, wherein after the morphing process unit has performed the morphing process so as to reach the final stage model, the virtual world image generation unit starts moving the object in the virtual world, and, after the start of the movement, places the object by moving the object in the virtual world by a predetermined rule.

15. The computer-readable storage medium having stored thereon the image processing program according to claim 12, wherein the object initial placement unit sets a planar model whose main surface has a shape of the predetermined area, as the initial stage model, and places at the initial position the object obtained by mapping the texture onto the main surface.

16. The computer-readable storage medium having stored thereon the image processing program according to claim 1, wherein the captured image acquisition unit repeatedly acquires captured images of a real world captured in real time by a real camera available to the image processing apparatus, the image processing program further causing the computer to function as:
face recognition process unit for performing a face recognition process for recognizing a person's face in each of the captured images repeatedly acquired by the captured image acquisition unit, the virtual world image generation unit sets at least one area in an image of the face recognized by the face recognition process unit, as the predetermined area, sets, as the texture, the image of the face set as the predetermined area, and generates the virtual world image by placing the object in the virtual world such that, when the object is displayed on the display device, at least a part of the object overlaps the image of the face recognized in the corresponding captured image by repeatedly performing the face recognition process, the image combination unit combines the virtual world image with each of the captured images repeatedly acquired by the captured image acquisition unit, and the display control unit repeatedly displays on the display device the images obtained by combining the captured images repeatedly acquired by the captured image acquisition unit, with the virtual world image.

17. The computer-readable storage medium having stored thereon the image processing program according to claim 16, wherein the virtual world image generation unit generates the virtual world image by placing in the virtual world the object obtained by texture-mapping the image of the face recognized by the face recognition process unit onto a three-dimensional model.

18. The computer-readable storage medium having stored thereon the image processing program according to claim 17, wherein the virtual world image generation unit places the object in the virtual world by, using the image of the face recognized in the corresponding captured image by repeatedly performing the face recognition process, updating the texture of the three-dimensional model every time the image of the face is recognized.

19. A non-transitory computer-readable storage medium having stored thereon an image processing program to be executed by a computer of an image processing apparatus that displays an image on a display device, the image processing program causing the computer to function as:

captured image acquisition unit acquiring a captured image captured by a real camera;

virtual world image generation unit, using as a texture of an object to be placed in a virtual world an image included in a predetermined area in the captured image acquired by the captured image acquisition unit, generating a virtual world image in which the object placed in the virtual world is viewed from a virtual camera, wherein the virtual world image generation changes a direction of viewing from the virtual camera the texture of the object to be placed in the virtual world in accordance with a direction of the virtual camera relative to the object;

image combination unit combining the captured image acquired by the captured image acquisition unit with the virtual world image; and display control unit for displaying the image combined by the image combination unit on the display device, the captured image acquisition unit repeatedly acquires captured images of a real world captured in real time by a real camera available to the image processing apparatus, the image combination unit combines the virtual world image with each of the captured images repeatedly acquired by the captured image acquisition unit, and the display control unit repeatedly displays on the display device the images obtained by combining the captured images repeatedly acquired by the captured image acquisition unit, with the virtual world image, the image processing program further causing the computer to function as:

mask process unit, in each of the captured images repeatedly acquired by the captured image acquisition unit, performing image processing so as to perform display on the display device such that a predetermined mask image covers the predetermined area set in the captured image.

20. The computer-readable storage medium having stored thereon the image processing program according to claim 19, wherein when the image combination unit combines the captured image with the virtual world image, the mask process unit places a predetermined mask object in the virtual world such that the mask object is combined with the predetermined area in the captured image so as to cover the predetermined area, and the virtual world image generation unit generates an image of the virtual world, in which the object and the mask object are viewed from the virtual camera, as the virtual world image.

21. The computer-readable storage medium having stored thereon the image processing program according to claim 20, wherein based on an output from a sensor for detecting a motion of the real camera, the mask process unit detects the motion of the real camera, and sets a position and an imaging direction of the virtual camera by imparting the same motion as the motion of the real camera to the virtual camera, and the virtual world image generation unit generates an image of the virtual world, in which the object and the mask object are viewed from the virtual camera set by the mask process unit, as the virtual world image.

22. The computer-readable storage medium having stored thereon the image processing program according to claim 19, wherein the mask process unit places the predetermined mask image in the predetermined area in each of the captured images repeatedly acquired by the captured image acquisition unit, and the image combination unit combines the virtual world image with the captured image in which the mask image is placed by the mask process unit.

23. The computer-readable storage medium having stored thereon the image processing program according to claim 19, wherein based on an output from a sensor for detecting a motion of the real camera, the mask process unit detects the motion of the real camera, and performs image processing so as to perform display on the display device such that the mask image is moved in a direction opposite to the motion of the real camera.

24. The computer-readable storage medium having stored thereon the image processing program according to claim 19, further causing the computer to function as:

face recognition process unit for performing a face recognition process for recognizing a person's face in each of the captured images repeatedly acquired by the captured image acquisition unit, wherein the virtual world image generation unit sets at least one area in an image of the face recognized by the face recognition process unit, as the predetermined area, and in each of the captured images repeatedly acquired by the captured image acquisition unit, the mask process unit performs image processing so as to perform display on the display device such that the mask image covers the area in the image of the face set as the predetermined area in the captured image.

25. The computer-readable storage medium having stored thereon the image processing program according to claim 19, wherein
the mask process unit sets an image that covers the entire predetermined area by filling in the entire predetermined area with a predetermined color, as the mask image.

26. The computer-readable storage medium having stored thereon the image processing program according to claim 19, wherein
the mask process unit sets, as the mask image, an image that covers the entire predetermined area by filling in the entire predetermined area with any of colors captured in a periphery adjacent to the predetermined area in the captured image in which the predetermined area is set.

27. An image processing apparatus that displays an image on a display device, the image processing apparatus comprising:
a captured image acquirer structured to acquire a captured image captured by a real camera;
a virtual world image generator, using as a texture of an object to be placed in a virtual world an image included in a predetermined area in the captured image acquired by the captured image acquirer, generating a virtual world image in which the object placed in the virtual world is viewed from a virtual camera, wherein
the virtual world image generator changes a direction of viewing from the virtual camera the texture of the object to be placed in the virtual world in accordance with a direction of the virtual camera relative to the object;
an image combiner structured to combine the captured image acquired by the captured image acquirer with the virtual world image; and
a display controller structured to display the image combined by the image combination unit on the display device.

28. An image processing system, including a plurality of apparatuses configured to communicate with each other, that displays an image on a display device, the image processing system comprising:
a captured image acquirer acquiring a captured image captured by a real camera;
a virtual world image generator using as a texture of an object to be placed in a virtual world an image included in a predetermined area in the captured image acquired by the captured image acquirer, generating a virtual world image in which the object placed in the virtual world is viewed from a virtual camera, wherein
the virtual world image generator changes a direction of viewing from the virtual camera the texture of the object to be placed in the virtual world in accordance with a direction of the virtual camera relative to the object;
an image combiner combining the captured image acquired by the captured image acquirer with the virtual world image; and
a display controller displaying the image combined by the image combination unit on the display device.

29. An image processing method performed by a processor or a cooperation of a plurality of processors, the processor and the plurality of processors included in an image processing system including at least one information processing apparatus capable of performing image processing for displaying an image on a display device, the image processing method comprising:
acquiring a captured image captured by a real camera;
using as a texture of an object to be placed in a virtual world an image included in a predetermined area in the captured image acquired by the captured image acquisition, generating a virtual world image in which the object placed in the virtual world is viewed from a virtual camera, wherein
the virtual world image generation changes a direction of viewing from the virtual camera the texture of the object to be placed in the virtual world in accordance with a direction of the virtual camera relative to the object;
combining the captured image acquired in the captured image acquisition step with the virtual world image; and
displaying the image combined in the image combination step on the display device.

* * * * *